US012674279B2

(12) United States Patent
Dichiara et al.

(10) Patent No.: US 12,674,279 B2
(45) Date of Patent: Jul. 7, 2026

(54) ELECTRICALLY CONDUCTIVE SMART PAPERS

(71) Applicant: University of Washington, Seattle, WA (US)

(72) Inventors: Anthony B. Dichiara, Seattle, WA (US); Sheila M. Goodman, Seattle, WA (US)

(73) Assignee: University of Washington, Seattle, WA (US)

( * ) Notice: Subject to any disclaimer, the term of this patent is extended or adjusted under 35 U.S.C. 154(b) by 374 days.

(21) Appl. No.: 18/251,858

(22) PCT Filed: Oct. 28, 2021

(86) PCT No.: PCT/US2021/057057
§ 371 (c)(1),
(2) Date: May 4, 2023

(87) PCT Pub. No.: WO2022/098556
PCT Pub. Date: May 12, 2022

(65) Prior Publication Data
US 2023/0407570 A1      Dec. 21, 2023

Related U.S. Application Data

(60) Provisional application No. 63/109,695, filed on Nov. 4, 2020.

(51) Int. Cl.
| | |
|---|---|
| *D21H 11/18* | (2006.01) |
| *C01B 32/158* | (2017.01) |
| *D21H 11/04* | (2006.01) |
| *D21H 13/50* | (2006.01) |
| *D21H 15/10* | (2006.01) |
| *D21H 23/46* | (2006.01) |

(52) U.S. Cl.
CPC ........... *D21H 11/18* (2013.01); *C01B 32/158* (2017.08); *D21H 11/04* (2013.01); *D21H 13/50* (2013.01); *D21H 15/10* (2013.01); *D21H 23/46* (2013.01)

(58) Field of Classification Search
CPC ........ D21H 11/18; D21H 11/04; D21H 13/50; D21H 15/10; D21H 23/46; D21H 15/02; C01B 32/158; C01B 32/168
See application file for complete search history.

(56) References Cited

U.S. PATENT DOCUMENTS

| | | | |
|---|---|---|---|
| 8,349,131 B1 | 1/2013 | Agarwal et al. | |
| 2012/0132381 A1* | 5/2012 | Hentze ................... | D21H 17/63 162/149 |

| | | | | |
|---|---|---|---|---|
| 2017/0027168 A1 | 2/2017 | Heath | | |
| 2019/0047864 A1* | 2/2019 | Jayasinghe | ........... | B32B 15/043 |
| 2019/0060619 A1 | 2/2019 | Moeller | | |
| 2021/0207325 A1* | 7/2021 | Pereira Damásio | ..... | D21H 1/00 |
| 2023/0407570 A1* | 12/2023 | Dichiara | ................ | D21H 23/46 |

FOREIGN PATENT DOCUMENTS

| | | | | | |
|---|---|---|---|---|---|
| CN | 104955849 B | * | 6/2019 | ............... | D21C 3/04 |
| EP | 3 493 222 | | 6/2019 | | |
| KR | 102041102 | | 7/2017 | | |
| KR | 102041102 B1 | * | 11/2019 | ................ | C08L 1/02 |
| WO | WO-2020087075 A1 | * | 4/2020 | ............ | D21H 13/50 |
| WO | WO-2022098556 A1 | * | 5/2022 | ........... | C01B 32/158 |

OTHER PUBLICATIONS

J. Phillips in "Current and Potential Use of Highly Fibrillated Cellulose in the Paper and Board Industry." 17th Fundamental Research Symposium, Cambridge, Aug./Sep. 2022, pp. 249-268 (Year: 2022).*

Taurbekov et al., in "Nanocellulose and carbon nanotube composites: A universal solution for environmental and energy challenges," Journal of Environmental Chemical Engineering, pp. 1-23 (Year: 2024).*

International Search Report and Written Opinion for International Application No. PCT/US2021/57057, mailed Jan. 31, 2022, (8 pages).

Dichiara et al., "Smart papers comprising carbon nanotubes and cellulose microfibers for multifunctional sensing applications," J. Mater. Chem. A, 2017, 5, 20161 (2017), (10 pages).

Goodman, et al., "Development of carbon nanotube: cellulose composites using a simple papermaking process for multifunctional sensing applications," Proc. SPIE 10165, Behavior and Mechanics of Multifunctional Materials and Composites (2017) (9 pages).

International Preliminary Report on Patentability for International Application No. PCT/US2021/57057, mailed May 19, 2023 (7 pages).

* cited by examiner

*Primary Examiner* — Jose A Fortuna
(74) *Attorney, Agent, or Firm* — CHRISTENSEN O'CONNOR JOHNSON KINDNESS PLLC

(57) ABSTRACT

The present disclosure describes a method for preparing a paper nanocomposite, including: continuously providing a first suspension that includes lignocellulosic pulp fibers, cellulose nanofibrils, carbon nanotubes, and a cationic surfactant; continuously adding a second suspension to the first suspension to provide a slurry, the second suspension includes lignocellulosic pulp fibers, cellulose nanofibrils, carbon nanotubes, and an anionic surfactant; depositing the slurry comprising the first and second suspensions onto the substrate; and dewatering the slurry to form the paper nanocomposite.

18 Claims, 40 Drawing Sheets

ELECTRICALLY CONDUCTIVE SMART PAPERS

CROSS-REFERENCES TO RELATED APPLICATIONS

This application is a National Stage of International Application No. PCT/US2021/057057. filed Oct. 28, 2021, which claims the benefit of U.S. Patent Application No. 63/109,695, filed Nov. 4, 2020, the disclosures of which are incorporated herein by reference in [its] their entirety.

STATEMENT OF GOVERNMENT LICENSE RIGHTS

This invention was made with Government support under Grant No. 1927623, awarded by the National Science Foundation. The Government has certain rights in the invention.

BACKGROUND

While a fifth of the world population lacks safe water, leaky pipes and wasteful irrigation systems are major contributors to water scarcity on the planet. The American Society of Civil Engineers indicates that about a quarter-million water line breaks occur each year in the U.S., representing more than 26 billion liters lost each day due to leaky pipes and costing public water utilities up to $2.8 billion annually. In addition, 37% of U.S. homeowners are reported to have suffered losses from water damage, costing another $2.5 billion annually to insurance companies. Worldwide, the World Bank estimates that global non-revenue water, which refers to the cost of water lost to leaks and billing errors approaches $14 billion. Although existing systems can detect and quantify the extent of water losses, they typically attempt to infer leak location via flow rate variations, a process which is time-consuming and requires human intervention to confirm. An ideal leak monitoring system would consist of a low cost array of optimally spaced remote sensors to minimize the reaction time to patch a leak and power off sensitive instruments when necessary. However, sensing liquid water in a reliable and affordable way poses a major challenge. Existing technologies remain expensive and either have weak or slow responses to water due to the non-polar nature of the materials employed, or is partially soluble in water, like most polymer-based systems, which produce inconsistent signals due to material degradation in aqueous environments.

Given its bio-renewable and hygroscopic nature, cellulosic paper provides an excellent platform for building sustainable and affordable water sensors with superior performance. To date, most research has focused on hosting various types of electrodes onto the surface of paper using pencil drawing, inkjet printing, sputtering, and other forms of coating techniques. These methods, however, are characterized by the low accuracy and non-uniformity of the electrode films formed on the paper surface, which adversely affect device performance and reliability, besides making the fabrication process at large scale very challenging.

There is a need for methods that allow formation of paper-based nanocomposites that have sufficient stability and durability for sensing applications. The present disclosure fulfills these needs and provides further advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a method for preparing a paper nanocomposite, including: continuously providing a first liquid suspension including lignocellulosic pulp fibers, cellulose nanofibrils, carbon nanotubes, and a cationic surfactant; continuously adding a second liquid suspension to the first liquid suspension to provide a slurry, the second liquid suspension including lignocellulosic pulp fibers, cellulose nanofibrils, carbon nanotubes, and an anionic surfactant; filtering the slurry comprising the first and second liquid suspensions on a membrane to provide a filtered mat, and removing the liquid from the filtered mat to form the paper nanocomposite.

In another aspect, the present disclosure features a paper nanocomposite formed by the methods described herein.

In yet another aspect, the present disclosure features a paper nanocomposite, including lignocellulosic pulp fibers, cellulose nanofibrils, carbon nanotubes, an anionic surfactant, and a cationic surfactant.

In a further aspect, the present disclosure features a sensor including the paper nanocomposites formed by the methods described herein, wherein the sensor produces a measurable response upon exposure to an analyte or a stimulus.

DESCRIPTION OF THE DRAWINGS

The foregoing aspects and many of the attendant advantages of this invention will become more readily appreciated as the same become better understood by reference to the following detailed description, when taken in conjunction with the accompanying drawi-2021ngs, wherein.

DETAILED DESCRIPTION

Figure 1A:
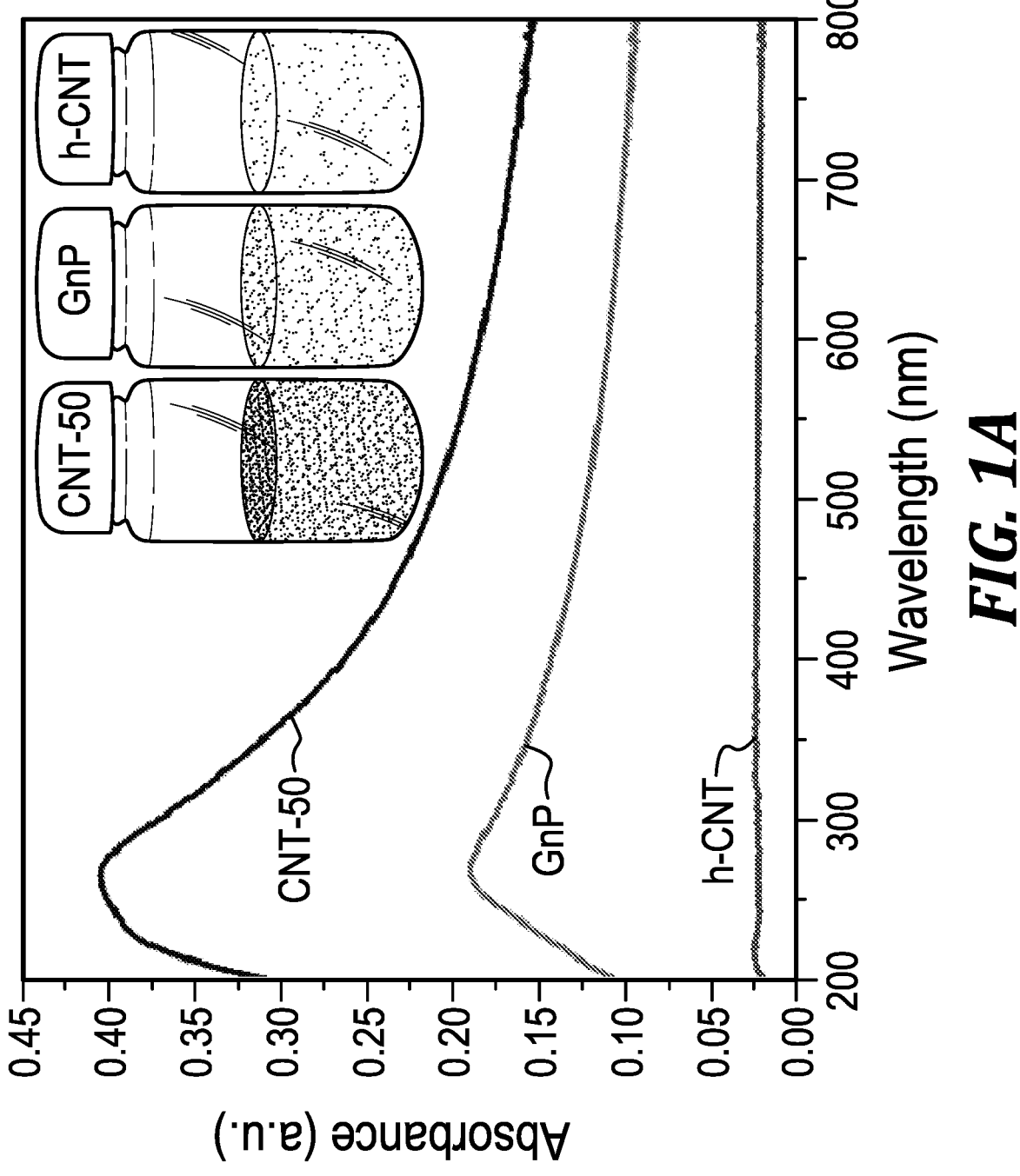
FIG. 1A shows the optical absorption spectra of aqueous suspensions (1 wt %) of different conductive carbon nano-material fillers dispersed by CNF in a 2:1 ratio Carbon:CNF. UV-vis spectroscopy is commonly employed to evaluate CNT dispersion quality as individual CNTs are active in the UV-vis range, displaying characteristic absorption bands, while CNT aggregates diminish this photoluminescent effect. As bundles of CNTs do not absorb light in the UV-vis range, the degree of individualization of CNTs in solution is correlated to the intensity of the absorbance spectra.

The present disclosure describes the fabrication of electroconductive nanocomposite papers by an easy-scale-up process involving the continuous-flow filtration of liquid (e.g., aqueous) suspensions of wood pulp pre-adsorbed with cellulose nanofibrils and carbon nanotubes to form hierarchically structured fibrous mats, which are dewatered (i.e., the liquid, such as water, is removed) by subsequent pressing and drying. A key element includes a unique binding chemistry that ensures a strong adhesion between the nanoparticles and the pulp fibers even at high nanoparticle (e.g., carbon nanotube) loading (i.e., up to 20 wt. % or higher). This allows the manufacturing of paper nanocomposites under industrial papermaking conditions with minimal nanoparticle loss.

Thus, in one aspect, the present disclosure describes a method for preparing a paper nanocomposite, including continuously providing a first liquid (e.g., aqueous) suspension including lignocellulosic pulp fibers, cellulose nanofibrils, carbon nanotubes, and a cationic surfactant; continuously adding a second liquid (e.g., aqueous) suspension to the first liquid suspension to provide a slurry, the second liquid suspension including lignocellulosic pulp fibers, cellulose nanofibrils, carbon nanotubes, and an anionic surfactant; filtering the slurry including the first and second liquid suspensions on a membrane to provide a filtered mat; and removing the liquid (e.g., water) from the filtered mat to form the paper nanocomposite.

Definitions

At various places in the present specification, groups or ranges are described. It is specifically intended that the disclosure include each and every individual sub-combination of the members of such groups and ranges.

The verb "comprise" and its conjugations, are used in the open and non-limiting sense to mean that items following the word are included, but items not specifically mentioned are not excluded.

"About" in reference to a numerical value refers to the range of values somewhat less or greater than the stated value, as understood by one of skill in the art. For example, the term "about" could mean a value ranging from plus or minus a percentage (e.g., ±1%, ±2%, ±5%, or ±10%) of the stated value. Furthermore, since all numbers, values, and expressions referring to quantities used herein are subject to the various uncertainties of measurement encountered in the art, unless otherwise indicated, all presented values may be understood as modified by the term "about."

As used herein, the articles "a," "an," and "the" may include plural referents unless otherwise expressly limited to one-referent, or if it would be obvious to a skilled artisan from the context of the sentence that the article referred to a singular referent.

Where a numerical range is disclosed herein, such a range is continuous, inclusive of both the minimum and maximum values of the range, as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all subranges subsumed therein. For example, a stated range of from "1 to 10" should be considered to include 1 and 10, and any and all subranges between the minimum value of 1 and the maximum value of 10. Exemplary subranges of the range "1 to 10" include, but are not limited to, e.g., 1 to 6.1, 3.5 to 7.8, and 5.5 to 10.

It is further appreciated that certain features of the disclosure, which are, for clarity, described in the context of separate embodiments, can also be provided in combination in a single embodiment. Conversely, various features of the disclosure which are, for brevity, described in the context of a single embodiment, can also be provided separately or in any suitable sub-combination.

Furthermore, the particular arrangements shown in the FIGURES should not be viewed as limiting. It should be understood that other embodiments may include more or less of each element shown in a given FIGURE. Further, some of the illustrated elements may be combined or omitted. Yet further, an example embodiment may include elements that are not illustrated in the FIGURES.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The terms "paper nanocomposite," "cellulose nanocomposite," and "modified pulp fibers" are used interchangeably herein.

Method of Making Paper Nanocomposite

As discussed above, the present disclosure describes a method for preparing a paper nanocomposite, including continuously providing a first liquid (e.g., aqueous) suspension including lignocellulosic pulp fibers, cellulose nanofibrils, carbon nanotubes, and a cationic surfactant; continuously adding a second liquid (e.g., aqueous) suspension to the first liquid suspension to provide a slurry, the second liquid suspension including lignocellulosic pulp fibers, cellulose nanofibrils, carbon nanotubes, and an anionic surfactant; filtering the slurry including the first and second liquid suspensions on a membrane to provide a filtered mat; and removing the liquid (e.g., water) from the filtered mat to form the paper nanocomposite. In some embodiments, filtering the slurry on the membrane can be repeated two or more times, or three or more times, prior to the liquid removal.

In some embodiments, a paper nanocomposite can be made by providing a slurry of lignocellulosic pulp fibers pre-adsorbed with carbon nanotubes (CNTs) by contacting an aqueous suspension of wood pulp fibers with an aqueous suspension of carbon nanotubes (CNTs) and cellulose nanofibrils (CNFs) for a time sufficient to adsorb CNTs and CNFs to the fibers; and removing water from the slurry to form the paper nanocomposite.

In some embodiments, a paper nanocomposite can be made by contacting an aqueous mixture of lignocellulosic pulp fibers with carbon nanotubes (CNTs) and a cationic surfactant for a time sufficient to adsorb CNTs to the fibers to provide a first liquid suspension of lignocellulosic pulp fibers pre-adsorbed with carbon nanotubes (CNTs); contacting the first liquid suspension with a second liquid suspension including carbon nanotubes (CNTs) and an anionic surfactant for a time sufficient to adsorb CNTs to the fibers to provide a slurry of lignocellulosic pulp fibers pre-adsorbed with carbon nanotubes (CNTs); and removing liquid from the slurry to form the nanocomposite. In some embodiments, the sequence of the two contacting steps can be repeated two, three or more times prior to the dewatering step.

Removing liquid (e.g., water) from the slurry can be done by any suitable technique, such as, for example, by continuous-flow filtration of liquid (e.g., aqueous) suspensions comprising wood pulp pre-adsorbed with carbon nanotubes (CNTs) and cellulose nanofibrils (CNFs), followed by subsequent pressing and drying. In some embodiments, removing liquid from the slurry includes pressing and drying.

In some embodiments, the first liquid suspension and/or the second liquid suspension includes carbon nanotubes adsorbed to the lignocellulosic pulp fibers via the cellulose nanofibrils. The slurry can include carbon nanotubes adsorbed to the lignocellulosic pulp fibers via the cellulose nanofibrils.

Multi-wall and/or single-wall CNTs can be used in the methods of the disclosure. In some embodiments, the CNTs are functionalized with a group that can form hydrogen bonds with cellulose and/or CNFs. In some embodiments, the CNTs are functionalized with carboxylic acid groups. In some embodiments, the CNTs are hydroxyl functionalized multi-walled carbon nanotubes (CNT-OH). In some embodiments, the CNTs have a functional group content of about 1% to about 10%. e.g., about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, or about 10% relative to the total CNT mass. In some embodiments, the CNTs have a length of from 10 $\mu$m (e.g., from 12 $\mu$m, from 15 $\mu$m, or from 18 $\mu$m) to 20 $\mu$m (e.g., to 18 $\mu$m, to 15 $\mu$m, or to 12 $\mu$m). In some embodiments, the CNTs have a mean diameter of 8 nm or more (e.g., 10 nm or more, 20 nm or more, 30 nm or more, 40 nm or more, 50 nm or more, 60 nm or more, 70 nm or more, 80 nm or more, or 90 nm or more) and/or 100 nm or less (e.g., 90 nm or less, 80 nm or less, 70 nm or less, 60 nm or less, 50 nm or less, 40 nm or less, 30 nm or less, 20 nm or less, or 10 nm or less).

The carbon nanotubes can be functionalized with a group capable of forming hydrogen bonds with the lignocellulosic pulp fibers and/or the cellulose nanofibrils. For example, the carbon nanotubes can include multi-walled carbon nanotubes functionalized with a hydroxy or a carboxy group. In some embodiments, the carbon nanotubes have a length of from 10 $\mu$m to 20 $\mu$m and/or a mean diameter of from 20 nm to 100 nm.

Any types of lignocellulosic pulp fibers can be used in the methods of making the nanocomposites of the disclosure. Non-limiting examples of suitable lignocellulosic pulps include wood pulp and agricultural fibers such as bagasse and wheat straw. In some embodiments, the lignocellulosic pulp is wood pulp. In some embodiments, the lignocellulosic pulp is Kraft wood pulp. In some embodiments, the lignocellulosic pulp is bleached Kraft softwood (SW) pulp, bleached Kraft hardwood (HW) pulp, or a combination thereof.

Any suitable cellulose nanofibrils (CNFs) can be used in the methods of the disclosure. In some embodiments, the cellulose nanofibrils are those synthesized by a TEMPO-mediated oxidation of wood pulp.

In some embodiments, the carbon nanotubes:cellulose nanofibrils ratio in the first and second liquid suspensions can independently be from about 1:1 to about 10:1 by weight (e.g., about 1:1 to about 5:1, or about 1:1 to about 3:1). In some embodiments, the liquid suspension of carbon nanotubes (CNTs) and cellulose nanofibrils (CNFs) have at least the same quantity of CNTs or more than CNFs.

In some embodiments, the method further includes collecting free (i.e., unbound, referring to cellulose nanofibrils and/or carbon nanotubes that are not bound to the lignocellulosic pulp fibers) cellulose nanofibrils and/or carbon nanotubes after filtering the slurry on the membrane. The collected free cellulose nanofibrils and/or carbon nanotubes can be added to the first or second liquid suspensions, or a combination thereof.

In some embodiments, the anionic surfactant includes alkali lignin (AL), sodium dodecyl sulfate (SDS), sodium dodecylbenzene sulfonate (SDBS), alkylphenol ethoxylates (APEO), or any combination thereof. The cationic surfactant can include cetyl-trimethylammonium bromide (CTAB), cetylpyridinium chloride (CPC), dodecyltrimethylammonium bromide (DTAB), cationic polycarboxylate (C-PCE), or a combination thereof.

In some embodiments, the range of CNT content used in the liquid suspension(s) is 0.05 wt % or more (e.g., 0.1 wt % more, 0.5 wt % or more, 1 wt % or more, 2 wt % or more, 3 wt % or more, 4 wt % or more, 5 wt % or more, 6 wt % or more, 7 wt % or more, 8 wt % or more, 9 wt % or more, 10 wt % or more, 12 wt % or more, 14 wt % or more, 16 wt % or more, or 18 wt % or more) and/or 20 wt % or less (e.g., 18 wt % or less, 16 wt % or less, 14 wt % or less, 12 wt % or less, 10 wt % or less, 9 wt/o or less, 8 wt % or less, 7 wt % or less, 6 wt % or less, 5 wt % or less, 4 wt % or less, 3 wt % or less, 2 wt % or less, 1 w % or less, 0.5 wt % or less, or 0.1 wt % or less) relative to the weight of the liquid suspension(s). In some embodiments, without wishing to be bound by theory, it is believed that at low CNT content, e.g., below 0.05 wt %, CNT retention during processing can be reduced due to the degree of CNT individualization in the aqueous dispersion, resulting in loss of electrical conductivity. In some embodiments, without wishing to be bound by theory, it is believed that at above about 10 wt %, the viscosity of CNT aqueous dispersion can become high, and the mixing of phases with incompatible viscosities (e.g., CNT and pulp solutions, slurries, or liquid suspensions) can result in non-uniform sheet formation and conductivity of final paper nanocomposite. In some embodiments, the first liquid suspension and/or second liquid suspension can have a CNT content of 5 wt % at a 2:1 CNT:surfactant weight ratio.

The paper nanocomposite formed by the methods herein can include lignocellulosic pulp fibers, cellulose nanofibrils, carbon nanotubes, an anionic surfactant, and a cationic surfactant. The carbon nanotubes can be bound (e.g., by hydrogen bonding, and/or electrostatic interactions) to lignocellulosic pulp fibers via the cellulose nanofibrils. In some embodiments, the cellulose nanofibrils and/or the carbon nanotubes are further associated with the cationic surfactant, the anionic surfactant, or both the cationic surfactant and the anionic surfactant.

In some embodiments, the paper nanocomposite is a single-ply paper nanocomposite with a paper grammage of 40 g/m$^2$ or more (e.g., 50 g/m$^2$ or more, 75 g/m$^2$ or more, 100 g/m$^2$ or more, 125 g/m$^2$ or more, 150 g/m$^2$ or more, or 175 g/m$^2$ or more) and/or 200 g/m$^2$ or less (e.g., 175 g/m$^2$ or less, 150 g/m$^2$ or less, 125 g/m$^2$ or less, 100 g/m$^2$ or less, 75 g/m$^2$ or less, or 50 g/m$^2$ or less). The paper nanocomposite can include a carbon nanotube loading of 1 wt % or more (e.g., 2 wt % or more, 5 wt % or more, 7 wt % or more, 10 wt % or more, 12 wt % or more, 15 wt % or more, or 18 wt % or more) and/or 20 wt % or less (e.g., 18 wt % or less, 15 wt/o or less, 12 wt % or less, 10 wt % or less, 7 wt % or less, 5 wt % or less, or 2 wt % or less), relative to the weight of the paper composite. In some embodiments, several sheets of the paper nanocomposite prepared by the methods described above can be combined into laminated structures with multiple layers, for example, for incorporation into a sensor.

In some embodiments, less than 3% by weight (e.g., less than 2% by weight, or less than 1% by weight) of the carbon nanotubes leaches from the paper nanocomposite when the paper nanocomposite is submerged into water (i.e., immersed in water) for a period of 48 hours. In some embodiments, the paper nanocomposites of the disclosure are stable to CNT leaching when submerged into water, for example, according to the aqueous leaching test described below in the Example. In some embodiments, less than about 0.1%, less than about 2%, less than about 5%, or less than about 10% of CNTs become detached from the composite upon immersion in water (with or without agitation).

In some embodiments, less than 2% of an initial electrical conductivity (for each peeling cycle) is lost when the paper nanocomposite is subjected to a dry leaching test (i.e., a tape peeling test). A dry leaching test can be conducted as follows: an adhesive tape can be hand-pressed onto a paper nanocomposite surface with evenly applied pressure, and then rapidly peeled off at a consistent angle. This can be repeated for multiple peeling cycles. The electrical resistance and nanocomposite thickness are measured after each cycle. For example, paper nanocomposite samples can be cut into 4 cm×4 cm square sections and adhered at one end to a flat surface. A 4 cm×4 cm section of 3M Scotch adhesive tape was then evenly hand-pressed onto the paper surface. After three minutes the tape was quickly ripped off at an approximately 300 angle to the paper at a constant speed. Each sample was subject to five peeling cycles to determine the progression of the interfacial properties after repeated applied stresses.

In some embodiments, the carbon nanotubes are aligned (e.g., substantially aligned) in the paper nanocomposite. For example, at least 60% of the carbon nanotubes deviate by less than 45 degrees from an alignment direction along the length of the nanotubes.

The present disclosure also describes a sensor that includes the paper nanocomposite described herein, wherein the sensor produces a measurable response upon exposure to an analyte or a stimulus. The measurable response can include an electrical resistance. The sensor can be a resistive sensor. The analyte or stimulus can include water and the sensor can be a water leak detection sensor. The sensor can generate a reproducible response over at least 20 water immersion/drying cycles (e.g., at least 30 water immersion/drying cycles, at least 40 water immersion/drying cycles, or at least 50 water immersion/drying cycles). The sensor can have a resistance change of more than 120 fold (i.e., over 12,000%) between a wet and a dry state.

In some embodiments, the analyte or stimulus is a water impurity. In some embodiments, the impurity can include as an organic compound, such as an organic solvent (e.g., an aromatic organic solvent, such as toluene, benzene, or xylenes). In some embodiments, the sensor including the paper nanocomposite can be used to measure a temperature, or a temperature change, of a medium in which the sensor is placed. In some embodiments, the sensor can be used to detect the presence and/or amount of an ionic chemical species in the medium in which the sensor is placed. The ionic chemical species can include, for example, a salt (e.g., a chloride salt, a bromide salt, an iodide salt, a sodium salt, a potassium salt, sodium chloride, and/or potassium chloride). In some embodiments, the sensor can be used to detect motion in a medium in which the sensor is placed, such as waves or oscillations in an aqueous medium. In some embodiments, the sensor can be used to monitor and/or measure a water level. The paper nanocomposite and/or a sensor including the paper nanocomposite can be stable, such that the sensing response remains substantially similar (e.g., 100% similar, 95% or more similar, or 90% or more similar compared to an initial response) after storage for 6 months at 50% relative humidity and at a temperature of 23° C.

In some embodiments, the sensor is wirelessly coupled to a remote or a cellular device.

In some embodiments, the sensor is a water leak detection sensor. In some embodiments, the leak detection sensor is suitable for detection or quantification of water volumes as small as 0.25 µL. In some embodiments, the sensitivity of the sensor can depend on the sensor size. In some embodiments, the sensor can detect less than 1 mL of water per m$^2$ of paper nanocomposite, such as those nanocomposites described above.

The resistive leak detection sensor can generate reproducible sensing responses over multiple cycles. In some embodiments, resistive leak detection sensor generates reproducible sensing responses over at least 20 water immersion/drying cycles (e.g., at least 30 water immersion/drying cycles, at least 40 water immersion/drying cycles, or at least 50 water immersion/drying cycles).

In some embodiments, the paper nanocomposite is in the form of an array in the sensor. The sensor can include a plurality of paper nanocomposite, wherein one paper composite is in electrical communication with at least one other paper composite.

The following examples are provided to illustrate certain particular features and/or embodiments of the disclosure. The examples should not be construed to limit the disclosure to the particular features or embodiments described.

EXAMPLES

Example 1. Scalable Manufacturing of Fibrous Nanocomposites for Multifunctional Liquid Sensing Cellulose-based paper electronics is an attractive technology to meet the growing demands for naturally abundant, biocompatible, biodegradable, flexible, inexpensive, lightweight and highly miniaturizable sensory materials. The price reduction of industrial carbon nanotube (CNT) grades offers opportunities to manufacture electrically conductive papers whose resistivity is responsive to environmental stimuli, such as the presence of water or organic solvents. Here, a highly sensitive paper nanocomposite was developed by integrating CNTs into a hierarchical network of pulp fibers and nanofibrillated cellulose. The aqueous-phase dynamic web forming process enables the scalable production of sensory paper nanocomposites with minimal nanoparticle loss due to the tailored interfacial bonding between CNT and cellulose components. The resulting materials are applied as multifunctional liquid sensors, such as leak detection and wave monitoring. The sensitivity to liquid water spans an outstanding four orders of magnitude even after 30 cycles and 6-month natural aging, due to the hydroexpansion of the hierarchical cellulose network, which alters the intertube distance between neighboring CNTs. The re-organization of percolated CNTs modifies the electron transport in wet areas of the sheet, which can be predicted by an equivalent circuit of resistors for the rapid detection and quantification of various liquids over large surfaces.

Described herein is the fabrication of electro-conductive papers by an easy-scale-up process involving the continuous-flow filtration of aqueous suspensions of wood pulp pre-adsorbed with cellulose nanofibrils (CNFs) and carbon nanotubes (CNTs) to form hierarchically structured fibrous mats, which are further dewatered by subsequent pressing and drying. A key element of the approach is a unique binding chemistry ensuring a strong adhesion between the nanoparticles and the pulp fibers even at high loading (i.e., up to 15 wt %). This allows the manufacturing of paper nanocomposites using a pilot-scale web former mimicking industrial papermaking conditions with minimal nanoparticle loss.

Results and Discussion

Characterization of Paper Nanocomposites

Figure 1B:
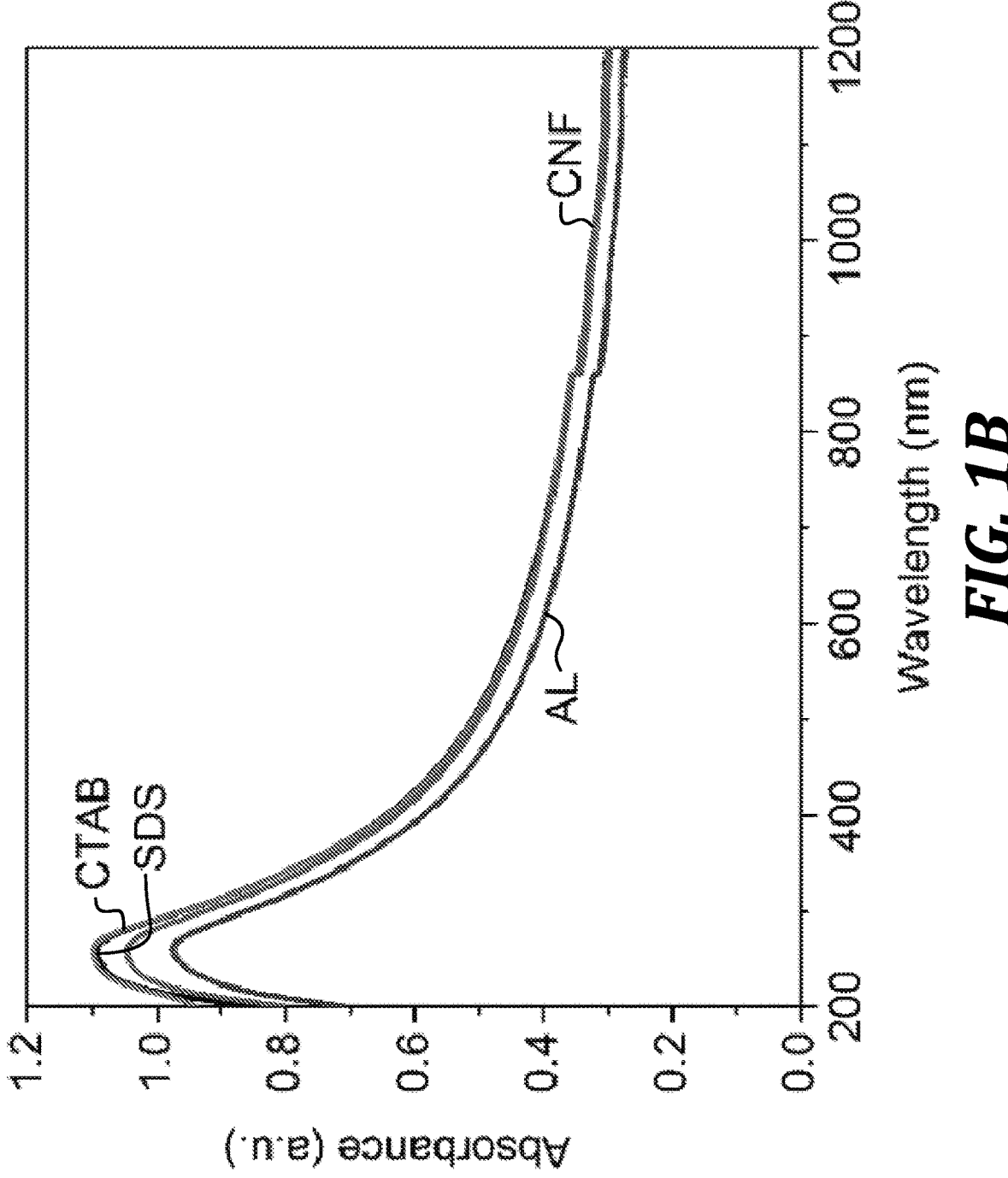
FIG. 1B shows the optical absorption spectra of aqueous CNT suspensions (1 wt %) using different dispersants, SDS, CTAB, AL, and CNF in a 2:1 ratio CNT:dispersant. Both CNF and alkali lignin (AL) help to promote excellent dispersion quality of CNTs in water, comparable to typical petrochemical surfactants (i.e., SDS and CTAB). Results indicate that both CNF and alkali lignin (AL) helps to promote excellent dispersion quality of CNTs in water, comparable to typical petrochemical surfactants (i.e., SDS and CTAB). This ensures a good distribution of CNTs in paper composites.
Figure 2:
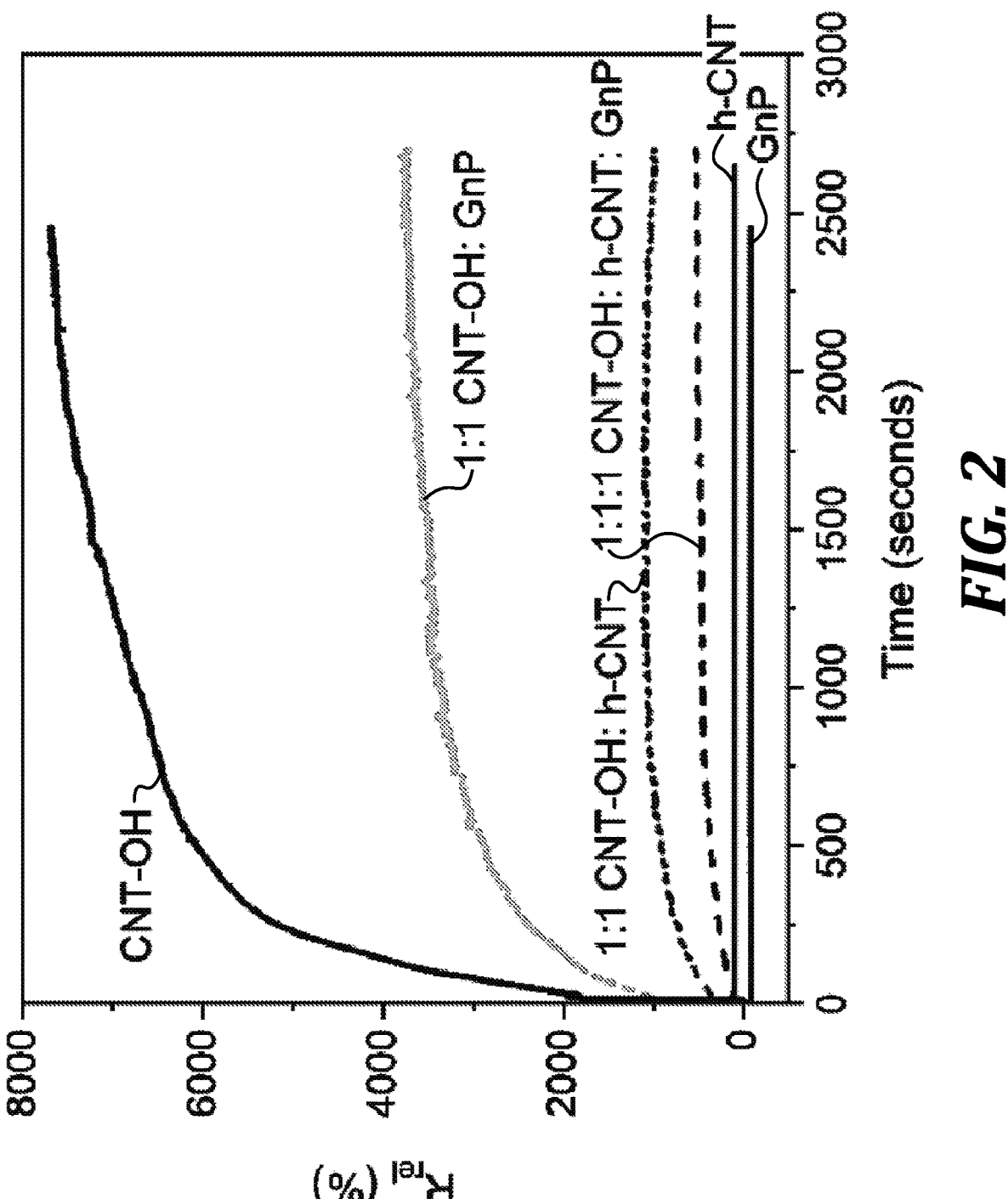
FIG. 2 is a graph showing the relative resistance response ($R^{rel}$) of embodiments of cellulose nanocomposites prepared with varying ratios of conductive nanofillers. All composites were prepared at a 15 wt % conductive filler loading with a 2:1 filler:CNF ratio at 60 g·m$^2$.

Prior to pilot scale experiments, handsheets were prepared based on a previously reported procedure, as described in A. B. Dichiara, el al., Smart papers comprising carbon nanotubes and cellulose microfibers for multifunctional sensing applications, J. Mater. Chem. A. 5 (2017) 20161-20169, incorporated herein by reference in its entirety. For comparison purposes, handsheets were prepared using different electrically conductive nanoparticles and their combinations. Industrial grade hydroxyl-functionalized CNTs were selected over alternative fillers, such as helical CNTs (h-CNTs) and graphene nanoplatelets (GnPs), due to their relatively low cost (Table 1) and superior dispersion quality in aqueous CNF (FIGS. 1A and 1B), contributing to more uniform sheet formation and enhanced sensing performance (FIG. 2).

TABLE 1

| Comparison of sensory papers prepared at a grammage of 60 g · m$^2$ and filler content of 15 wt. % using different electrically conductive nanoparticles. | | | | | |
|---|---|---|---|---|---|
| Filler | Longest dimension (µm) | SSA* (m$^2$/g) | Cost* ($/g) | Dispersion quality in H$_2$0 | Rrel$_{max}$ (%) | Resistance of a dried 16-cm diameter sheet (kΩ) |
| CNT-OH | 10-20 | 90 | 0.2 | +++ | 7,685 | 47 |
| GnP | 2-8 | 700 | 0.5 | ++ | −100 | 2 · 10$^8$ |
| h-CNT | 1-10 | 30 | 12 | + | 99 | 8 · 10$^{11}$ |

Figure 3:
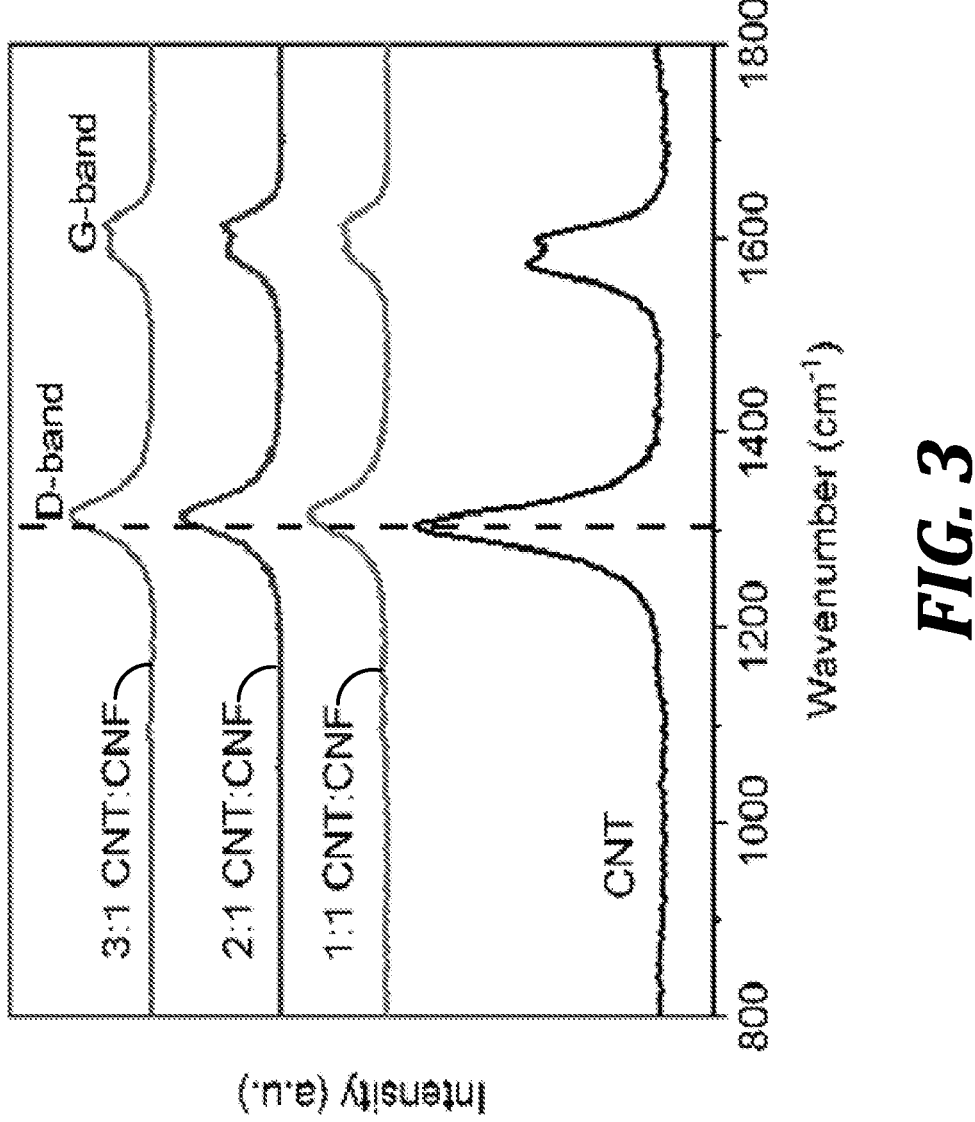
FIG. 3 shows the Raman spectra of embodiments of paper nanocomposites with 15 wt % CNT.
Figure 4:
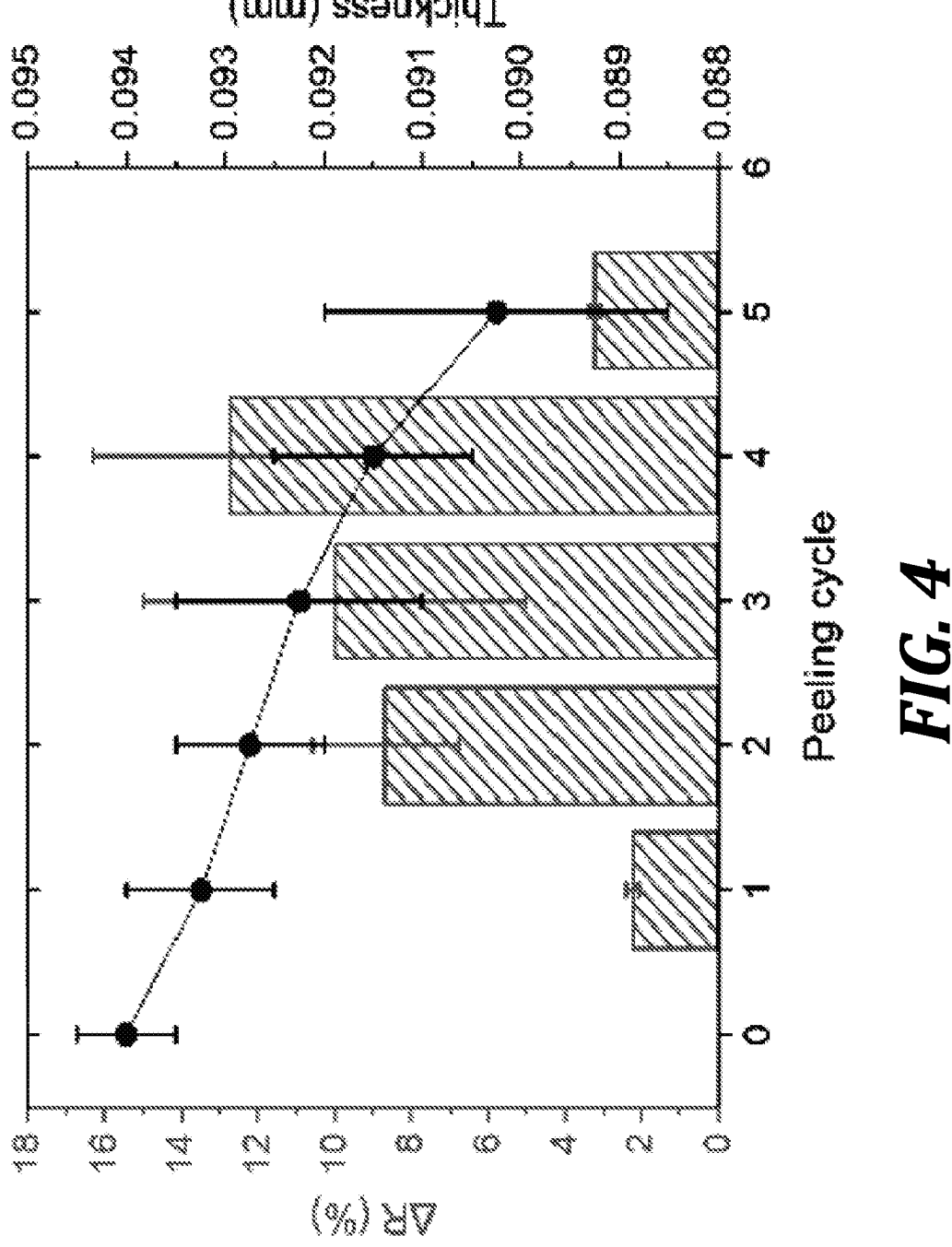
FIG. 4 is a bar graph showing the evolution in sheet resistance and paper thickness as a function of tape peeling cycle of paper nanocomposites with 15 wt % CNT.
Figure 5:
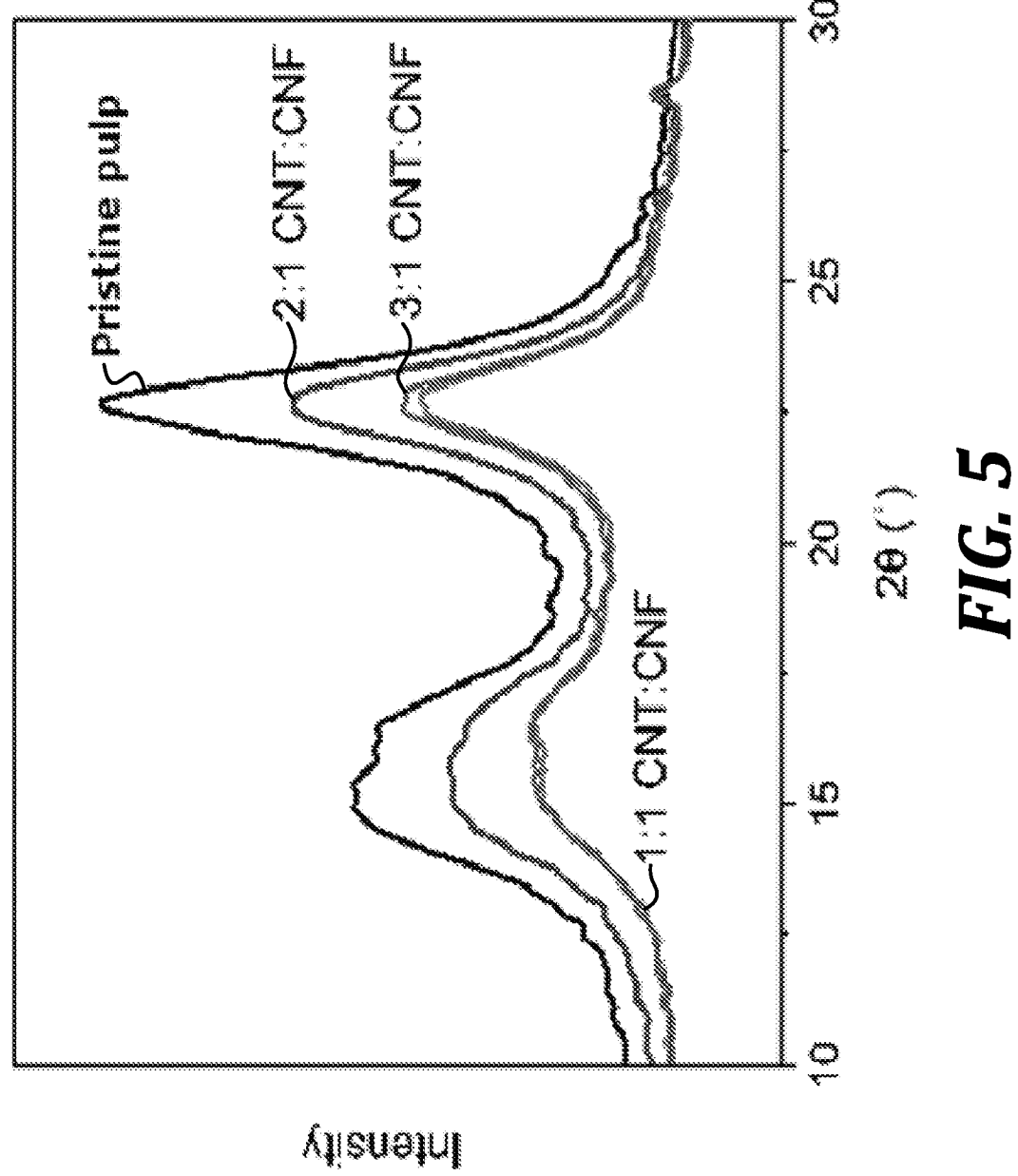
FIG. 5 shows the X-ray diffraction patterns of embodiments of paper nanocomposites with 15 wt % CNT.
Figure 6:
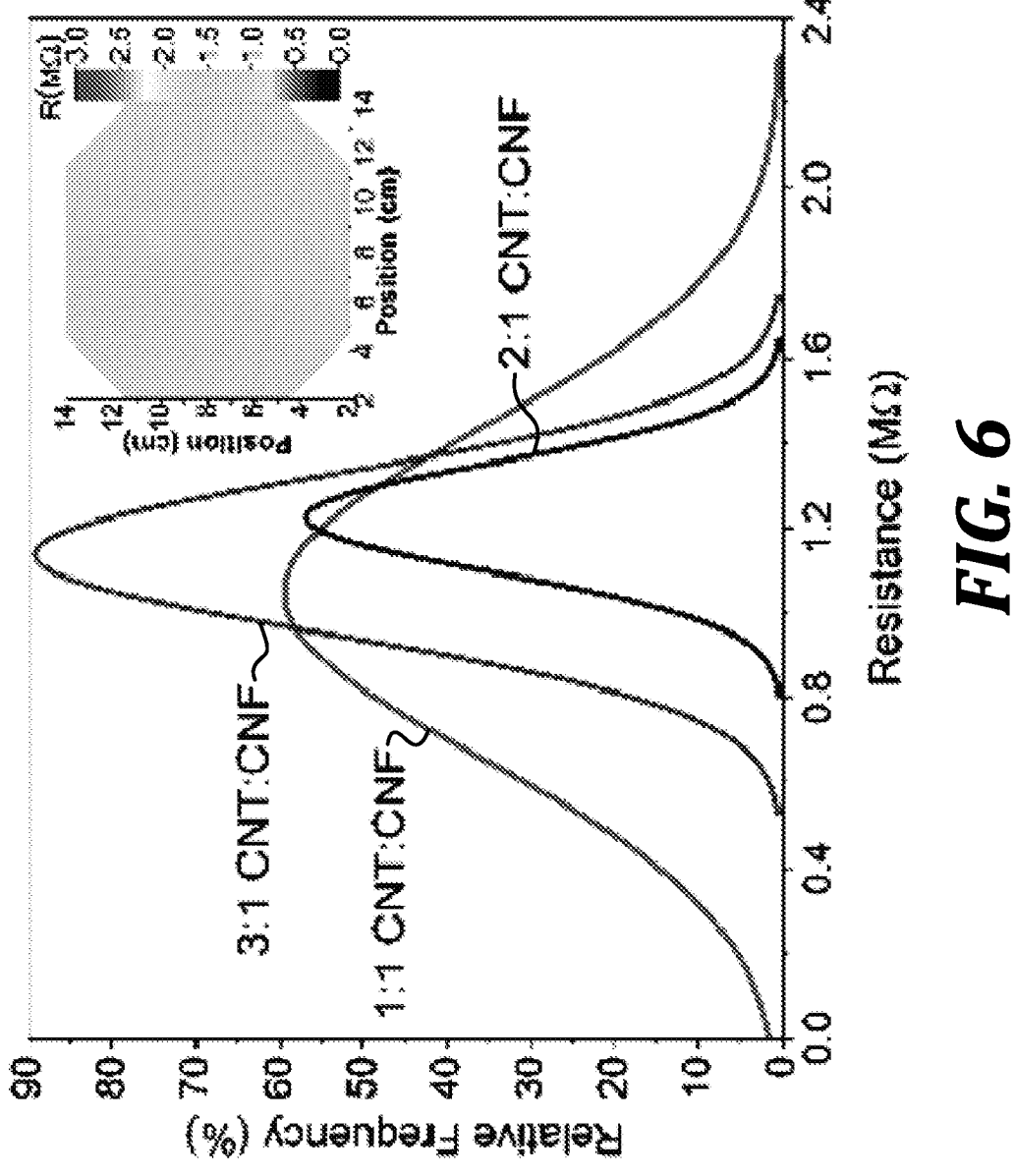
FIG. 6 shows the 4-point probe resistance measurements of embodiments of paper nanocomposites with 15 wt % CNT unless otherwise specified. The inset corresponds to the spatial distribution of the electrical resistance across 37 different locations on the sheet with a 2:1 CNT:CNF ratio.
Figure 7:
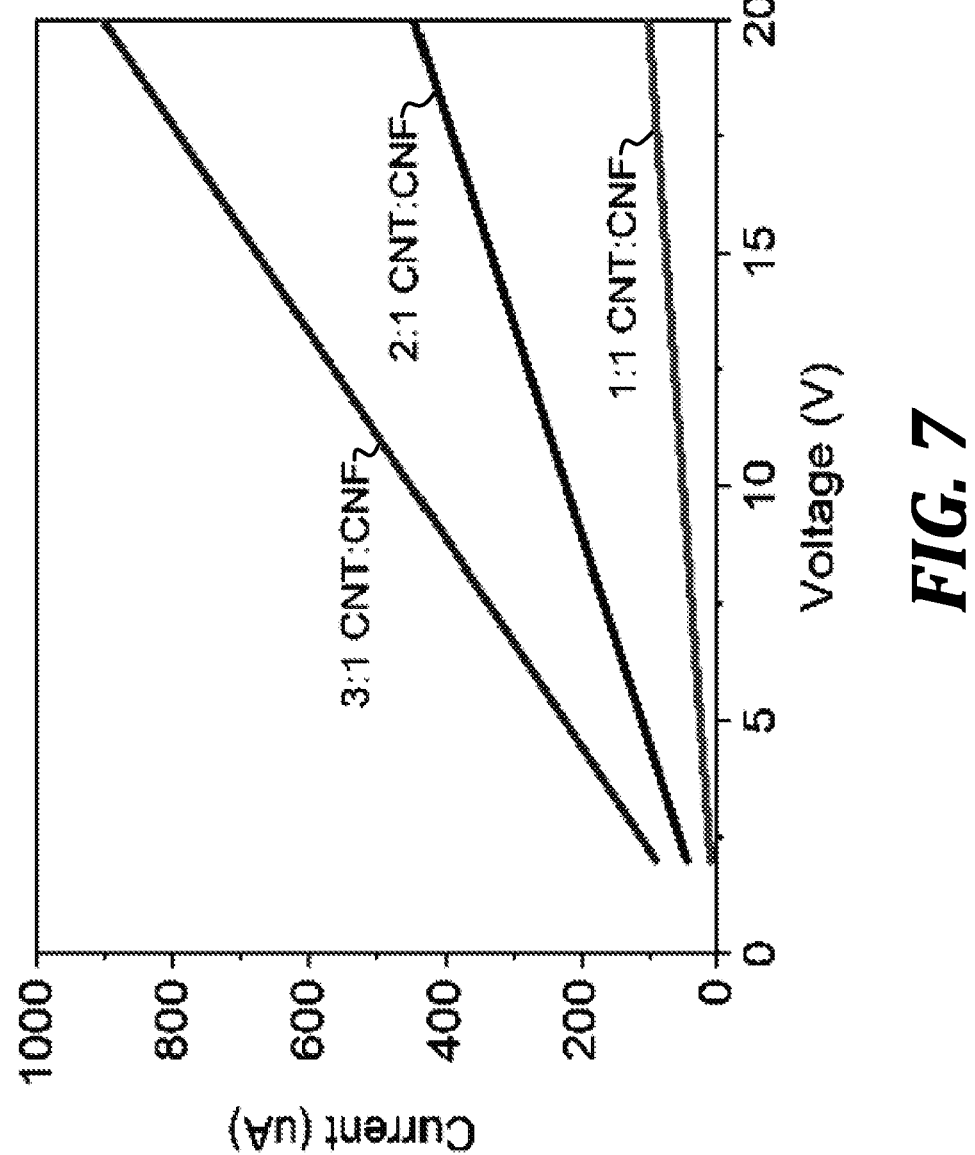
FIG. 7 shows the I-V curves of embodiments of paper nanocomposites with 15 wt % CNT unless otherwise specified, at with varying CNT:CNF ratios.
Figure 8:
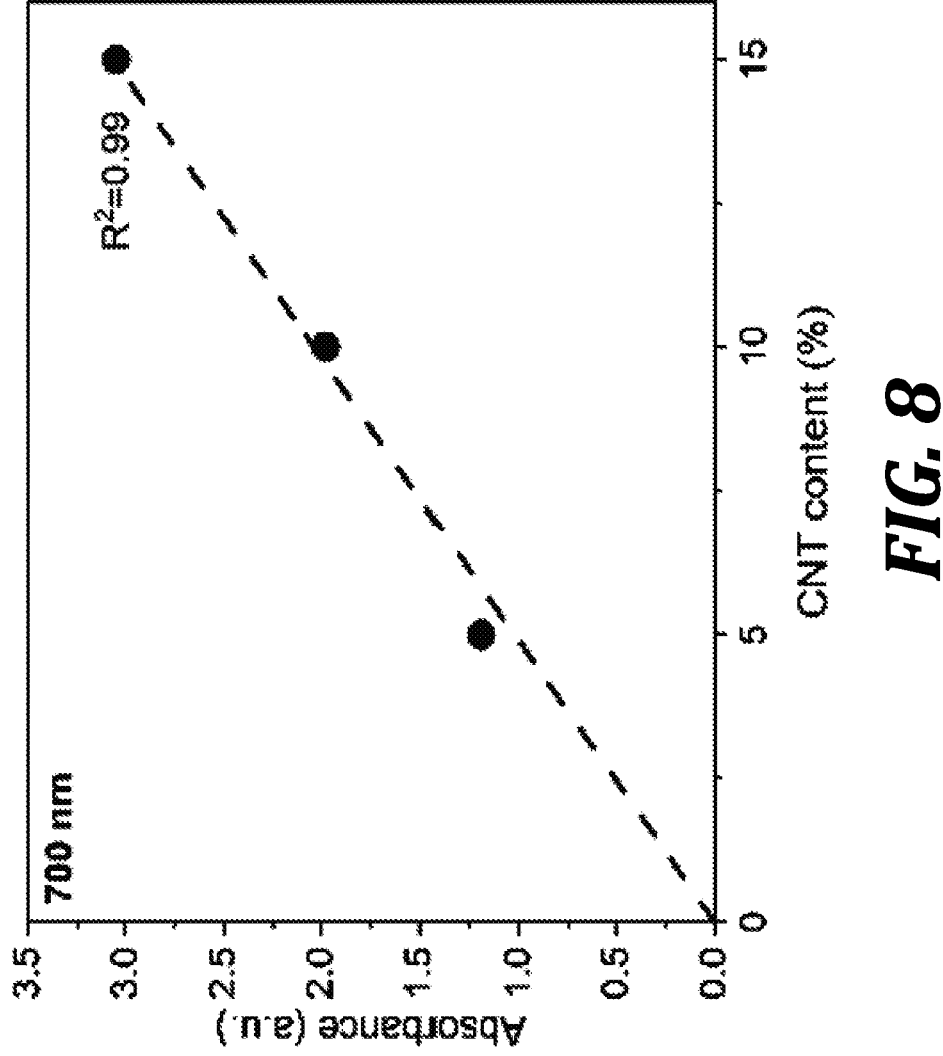
FIG. 8 shows the optical absorption spectra of papers prepared at different CNT loadings but with the same CNT:CNF ratio of 2:1.

The resulting paper nanocomposites were mechanically flexible and robust with uniform electrical conductivity across the 16-cm diameter sheet. Electron microscopy confirmed the even distribution of nanoparticles in the paper without significant aggregation despite loadings as high as 15 wt %. This was attributed to the presence of CNFs playing two roles: (i) that of a dispersing agent for the hydrophobic CNTs and (ii) that of an interfacial reinforcing agent between the CNTs and the pulp fibers. The former role could be ascribed to the polarization of electrons in the sp2 CNT lattice induced by the fluctuations of counter-ions on the surface of the TEMPO-oxidized CNFs, which promoted the colloidal stabilization of CNT:CNF complexes in water by means of electrostatic repulsion and steric hindrance, as shown by absorption spectroscopy (FIG. 1B). The latter role was evidenced by the red-shifts observed with the addition of CNT:CNF complexes in the graphitic D- and G-bands, respectively around 1350 and 1580 cm$^{-1}$, of the Raman spectra of papers, which were indicative of strong bonding interactions between CNTs and the cellulose components (FIG. 3). The good interfacial properties were further confirmed by tape peeling tests, where the thickness and the in-plane electrical resistance of paper nanocomposites with 15 wt % CNTs decreased respectively by less than 1 and 2% on average after peeling (FIG. 4). SEM images of the paper and adhesive sides captured after the fifth peeling cycle showed that CNTs remained attached onto the surface of pulp fibers even after being transferred to the tape surface. This demonstrated that the fortified interface between CNTs the cellulose components was greater than the adhesion strength of the tape. X-ray diffraction angles of bleached pulp handsheets prepared with various CNT:CNF ratios revealed that the crystallinity index (CrI, %) was less significantly reduced by the presence of CNTs when a specific quantity of CNF was introduced in the composite, despite the same CNT content of 15 wt % being used in each case (FIG. 5). This result suggested that a better dispersion state with higher degree of CNT individualization was achieved at the CNT:CNF ratio of 2:1, while more compact CNT loadings were obtained both below and above this value, hindering the formation of crystalline regions along cellulose chains, resulting in a greater decrease in crystallinity. This was consistent with electrical resistance measurements collected by four-point probe at 37 different locations across each sample sheet. The paper nanocomposites prepared at a CNT:CNF ratio of 2:1 yielded the most uniform sheet resistance (FIG. 6) compared to the other compositions tested. Moreover, the current-voltage characteristics of paper nanocomposites exhibited a linear behavior with excellent stability and ideal Ohmic contact between the paper and the electrodes (FIG. 7). FIG. 8 also showed that the paper absorbance was linearly proportional to the CNT content, suggesting minimal loss of nanoparticles during sheet formation and dewatering.

Multifunctional Liquid Sensing

Aqueous-Phase Sensing Performance and Mechanism

Figure 9:
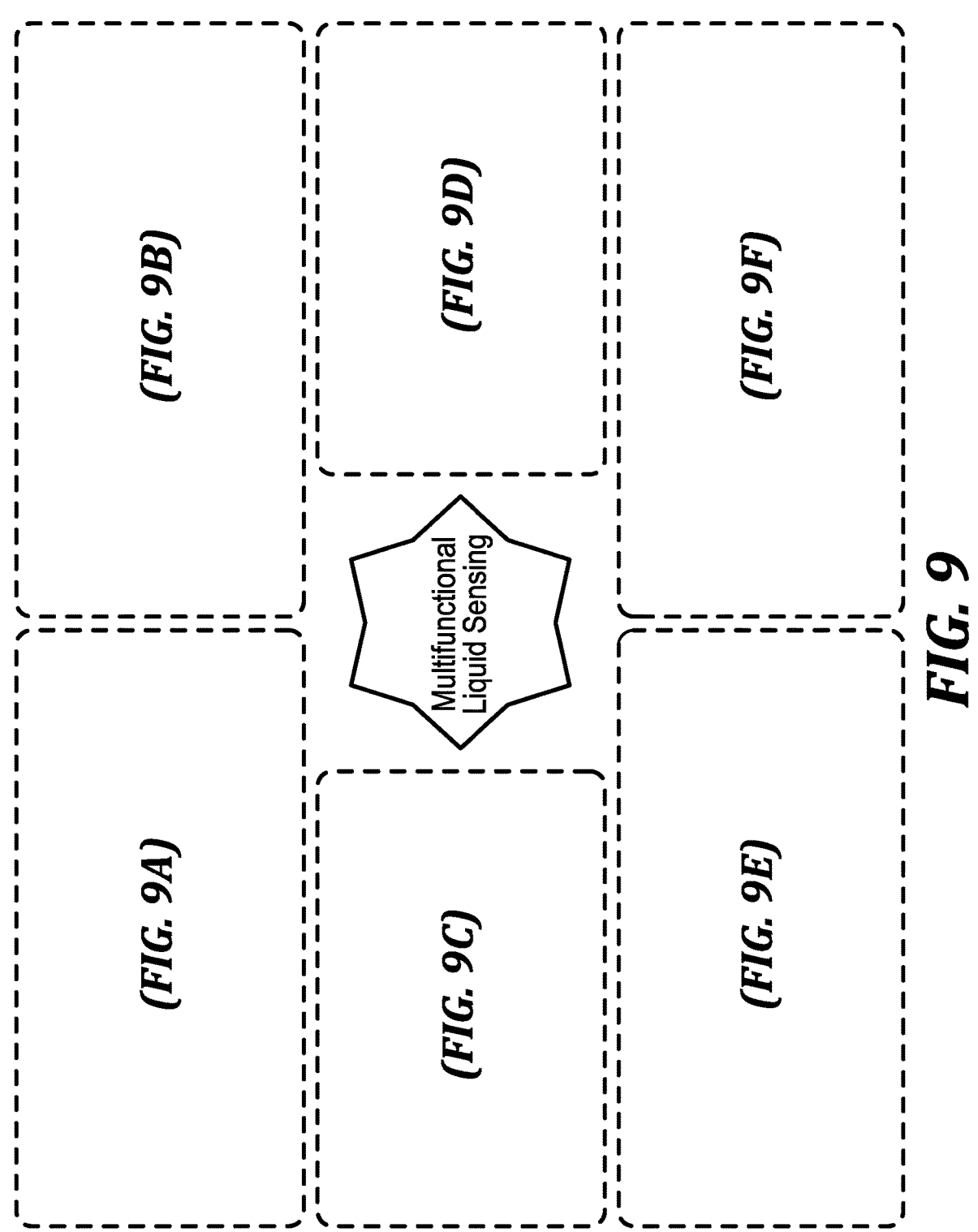
FIG. 9 a series of graphs showing the multifunctional liquid sensing performance of embodiments of paper nanocomposites with 15 wt % and 2:1 CNT:CNF ratio. Submersion: The apparatus used for the submersion analysis includes thermal imaging to ensure there is no direct contact between the electrodes and the test solution (left). $R_{rel}$ as a function of time immersed in DI water for a pristine and a 6-month aged specimen after their first and $30^{th}$ immersion/drying cycle (right). The inset shows the time profile for the first 5 immersion/drying cycles. Droplets: The maximum $R_{rel}$ achieved for small volumes of DI water incrementally drop casted onto the sensor (0.25, 0.5, 1, 2, 5, and 10 L), with the corresponding time profile shown in the inset. Wave monitoring: $R_{rel}$ as a function of time immersed in DI water under constant agitation using an orbital shaker successively operated at 45, 50 and 60 rpm. Organic Solvents; $R_{rel}$ response at 300 s of immersion in various solvents (left) and $R_{rel}$ time profile for different mixtures of water in toluene with increasing water content from 0.025 to 0.10 wt % (right). Temperature: Linear relationships of relative resistance response (Rei) as a function of liquid temperature at various immersion times in DI water. Ionic Strength: Evolution of $R_{rel}$ recorded at 300 s with the NaCl concentration of DI and tap water solutions, fitted with a power law (left). The inset shows the time profile in pure DI and tap water. Graph of the $R_{rel}$ time profile over six immersion/drying cycles in alternating aqueous solutions of 0.1 wt % NaCl and pure DI water (right).
Figure 9A:
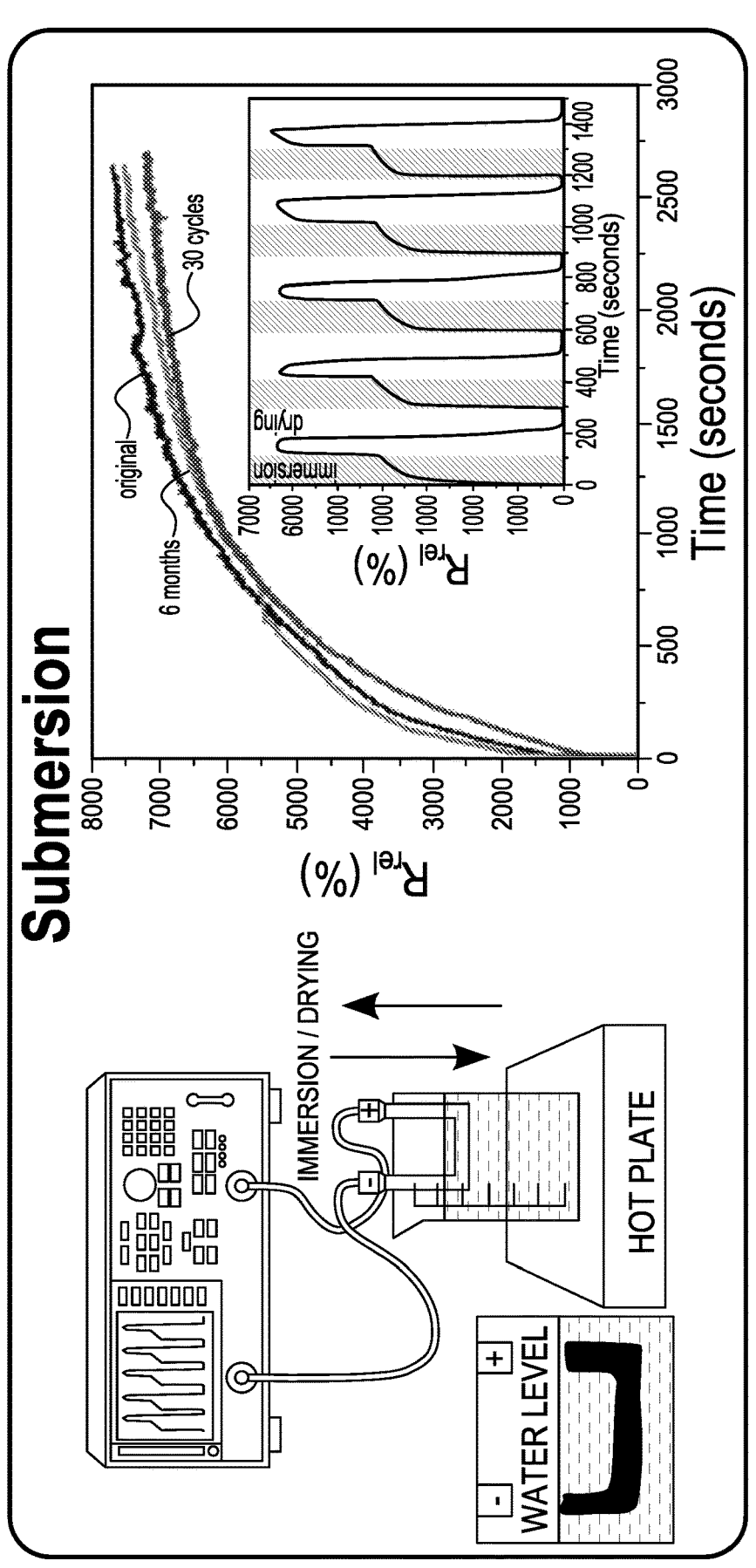
Figure 9B:
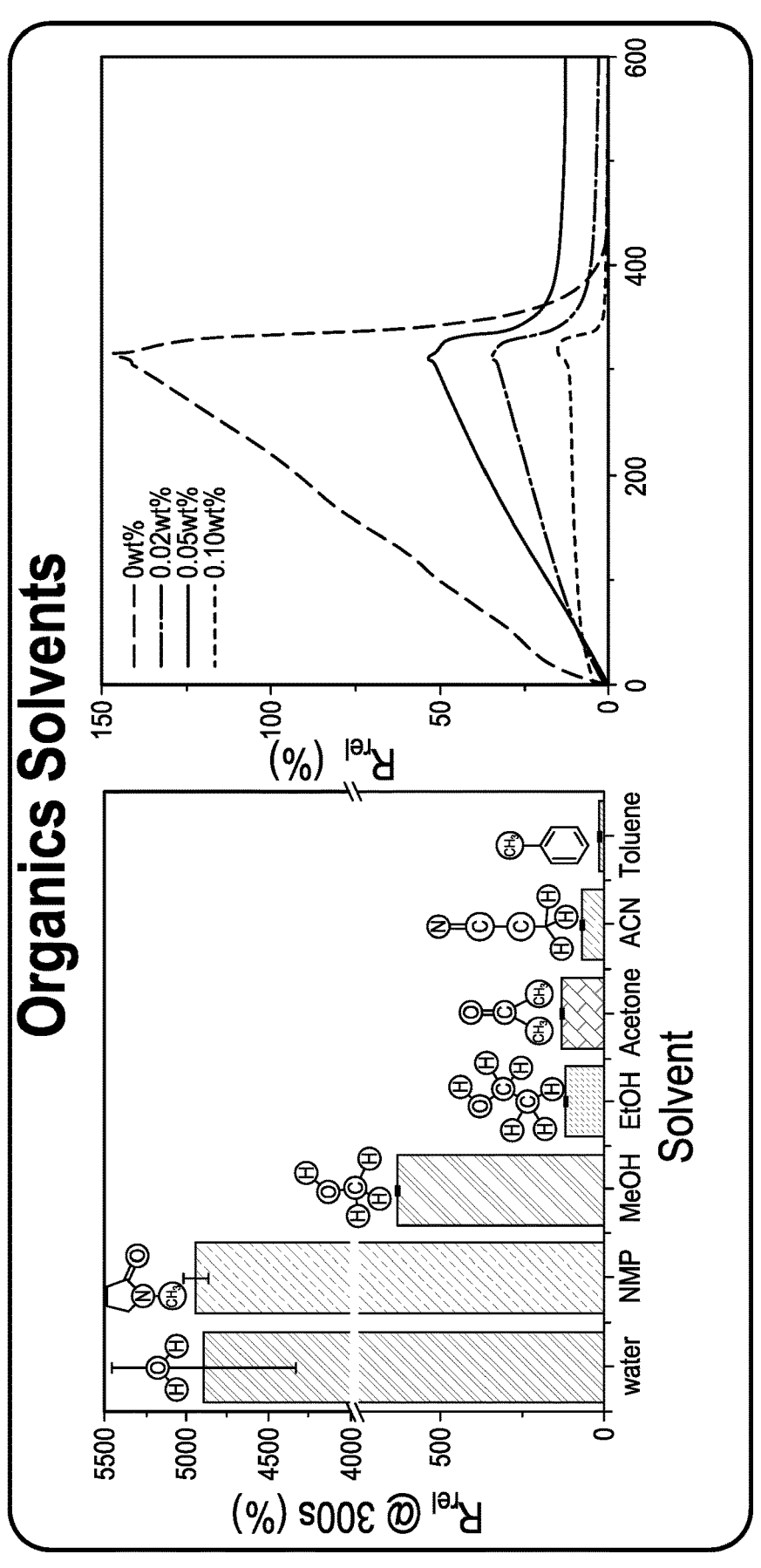
Figure 9C:
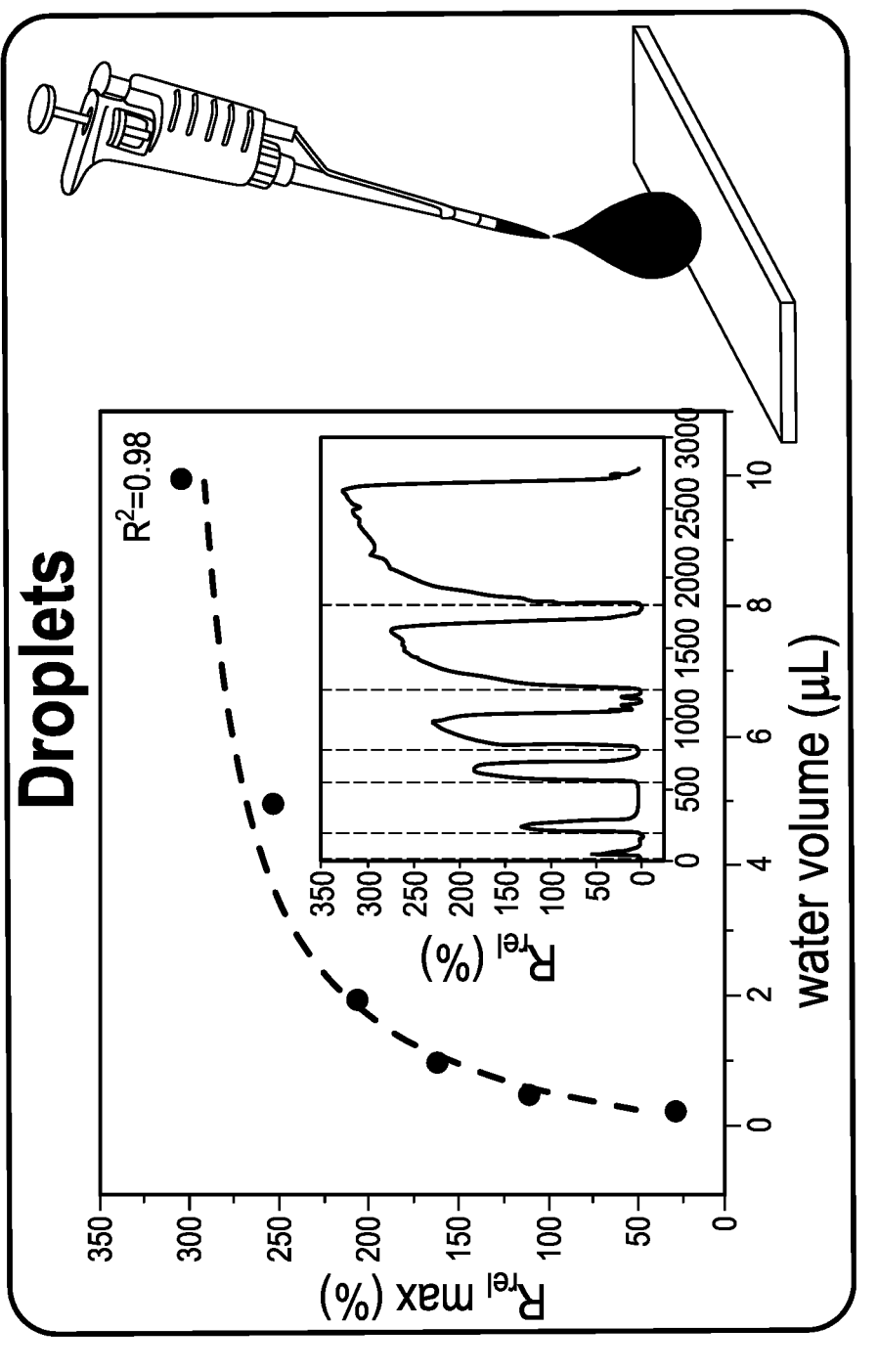
Figure 9D:
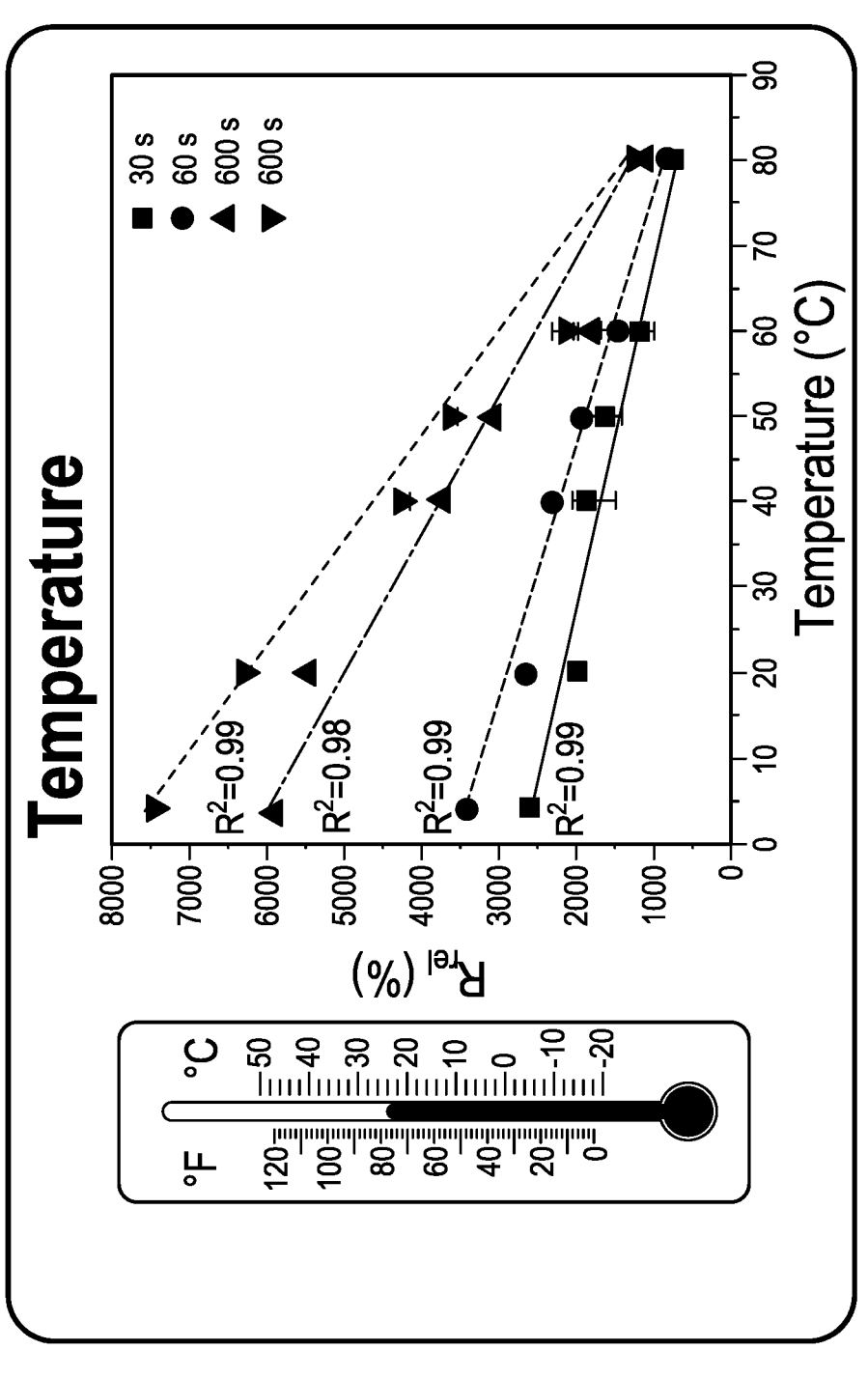
Figure 9E:
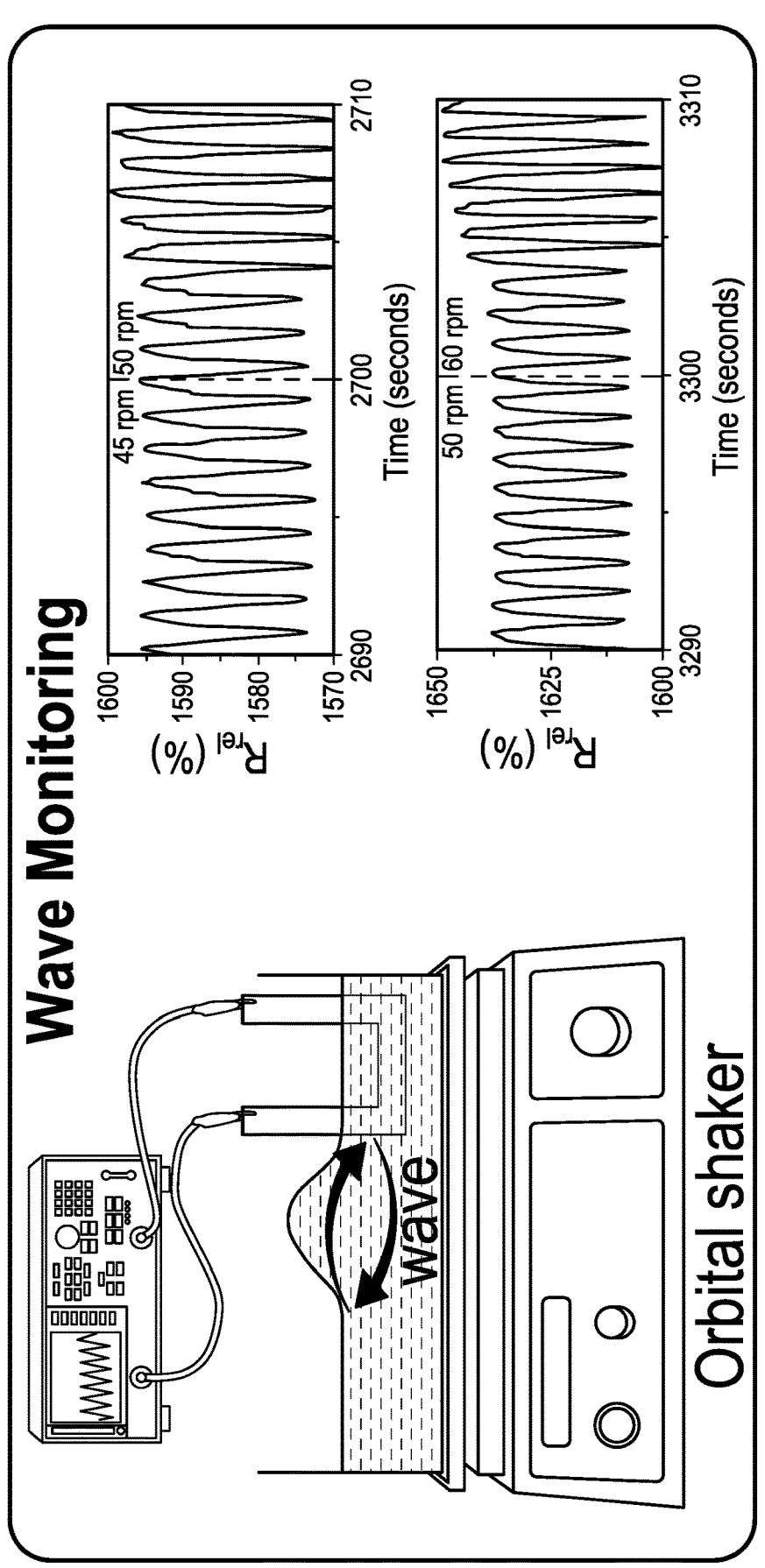
Figure 9F:
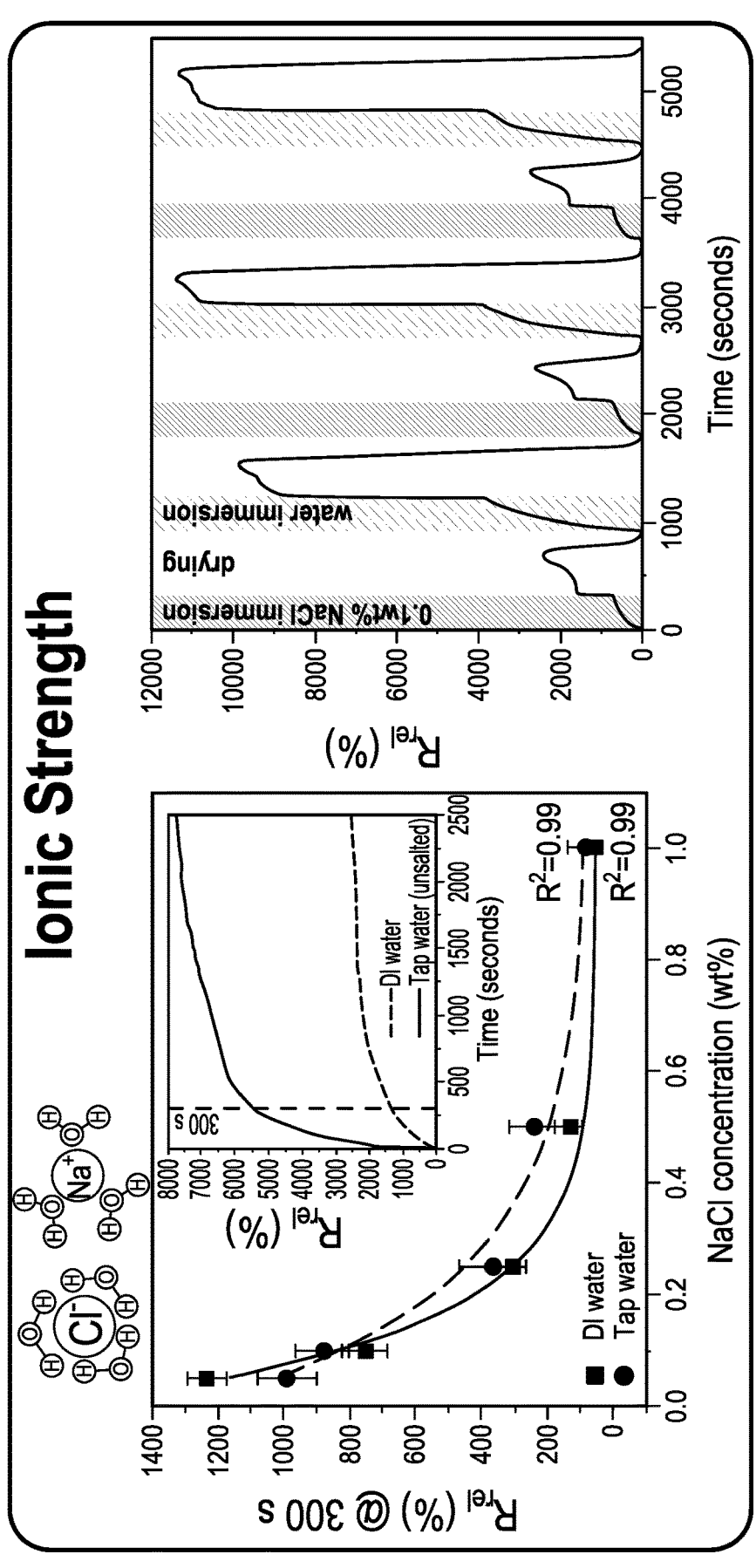
Figure 10A:
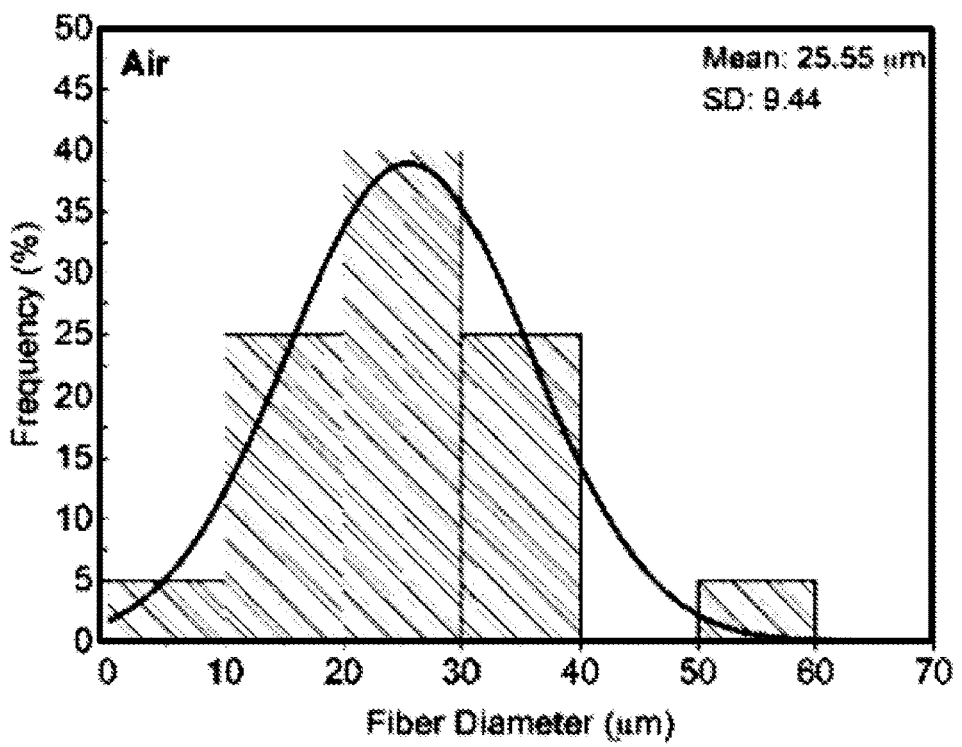
FIG. 10A is a bar graph showing the diameter distribution of embodiments of modified pulp fibers in air for 60 s.
Figure 10B:
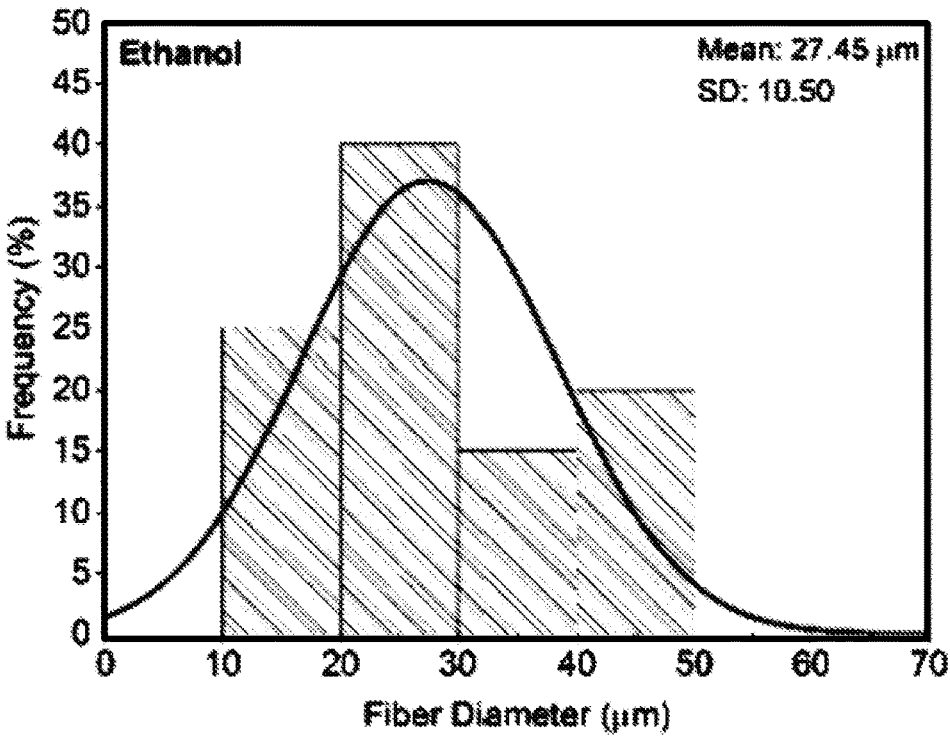
FIG. 10B is a bar graph showing the diameter distribution of embodiments of modified pulp fibers after immersion in ethanol for 60 s.
Figure 10C:
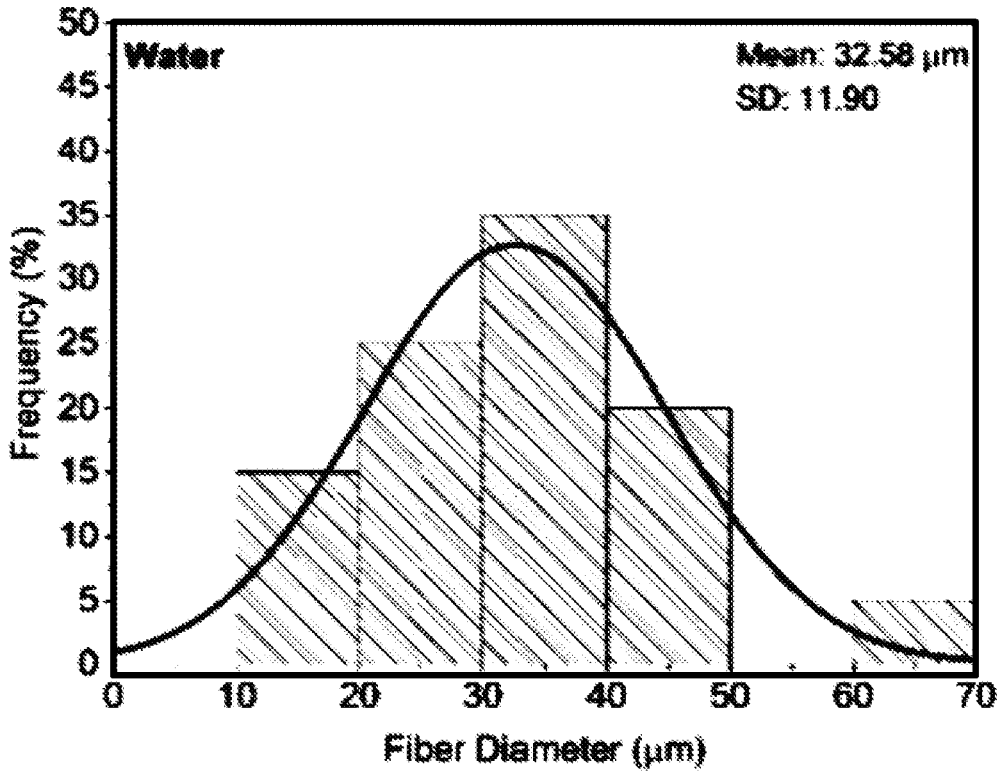
FIG. 10C is a bar graph showing the diameter distribution of embodiments of modified pulp fibers after immersion in water for 60 s.
Figure 11A:
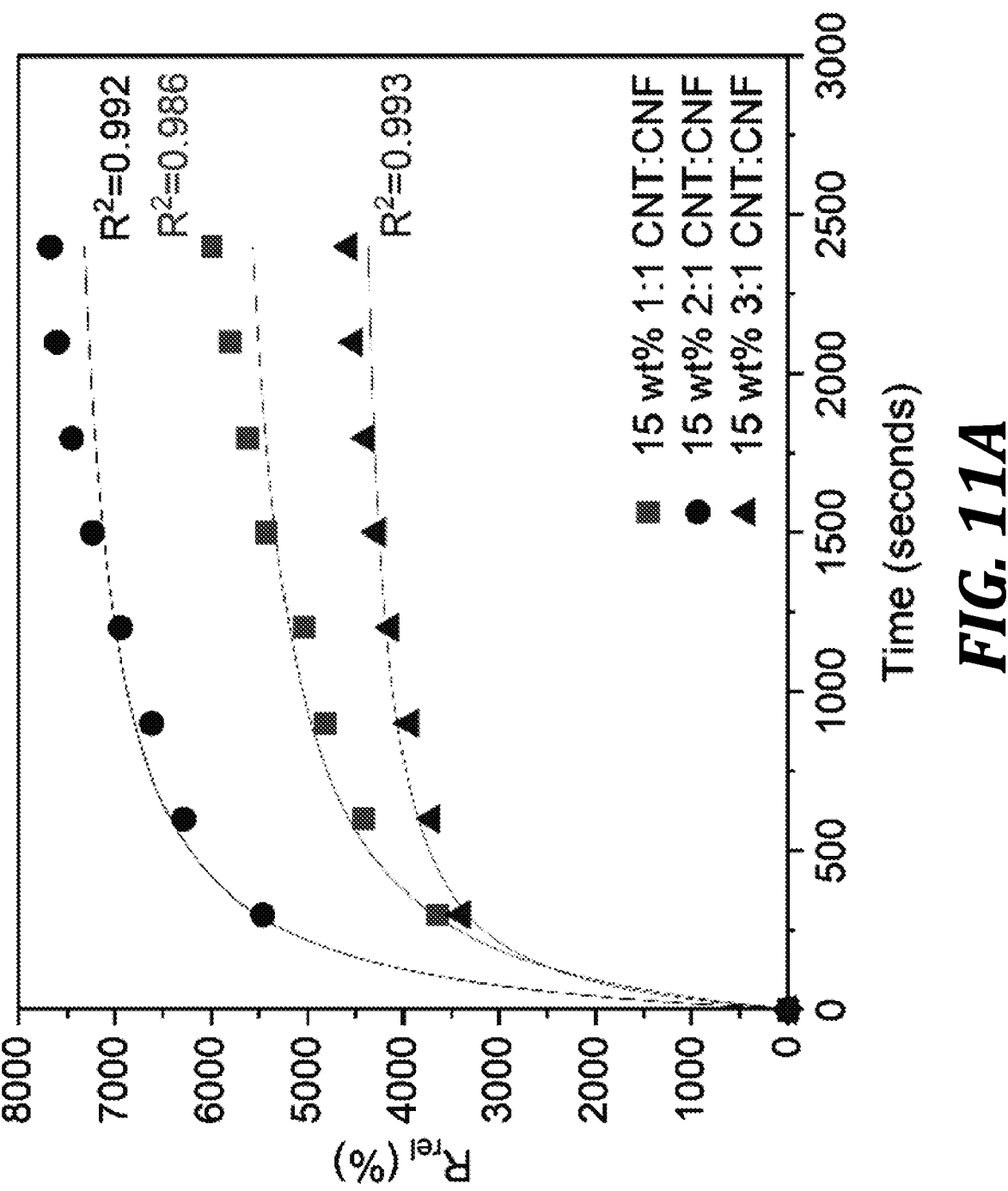
FIG. 11A shows the relative resistance response ($R_{rel}$) of embodiments of cellulose nanocomposites prepared with varying CNT:CNF ratios and CNT contents. The curve fit represents a pseudo second order model.
Figure 11B:
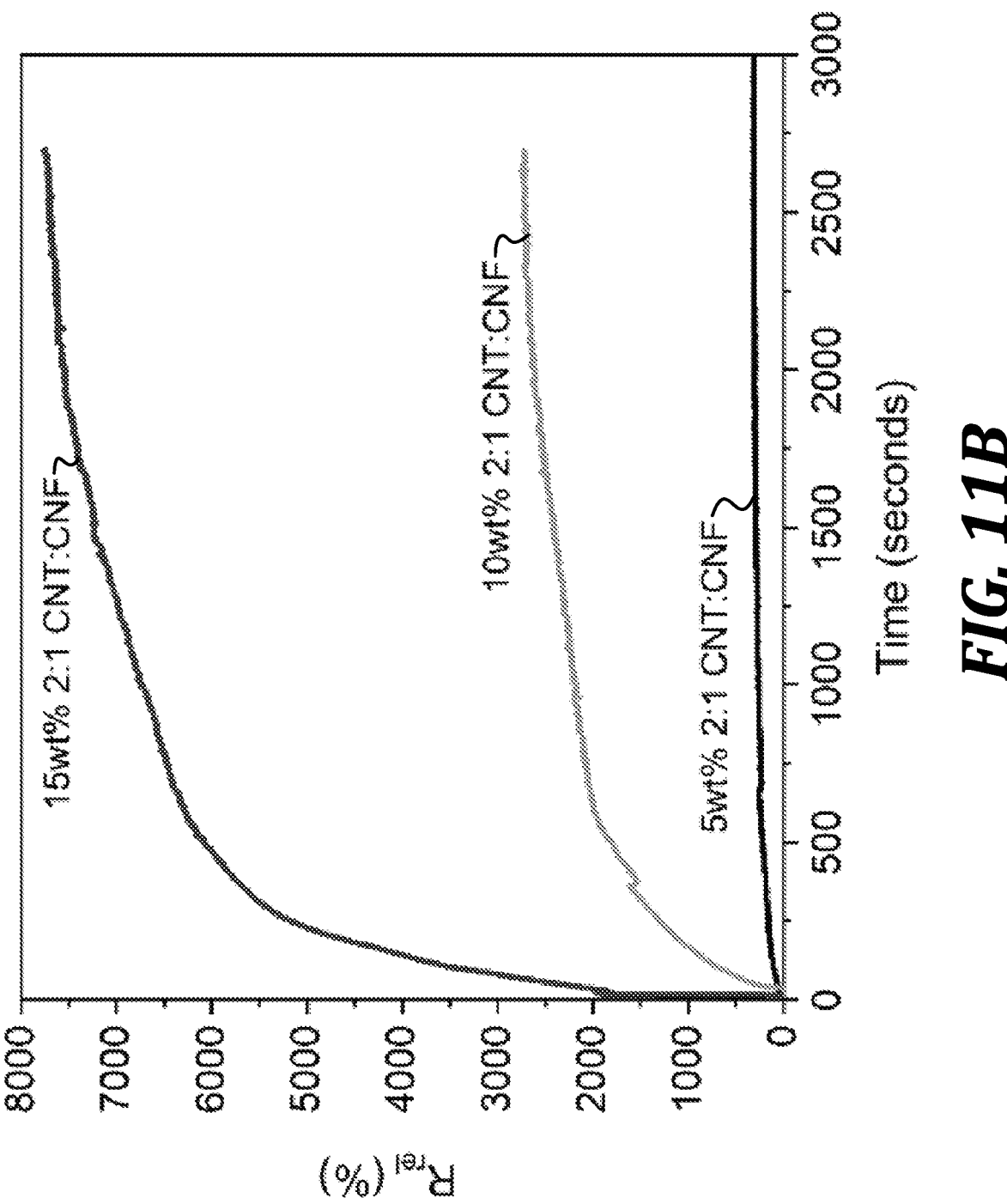
FIG. 11B is shows the relative resistance response ($R_{rel}$) of embodiments of cellulose nanocomposites prepared with varying CNT:CNF ratios as a function of immersion time in DI water.
Figure 12:
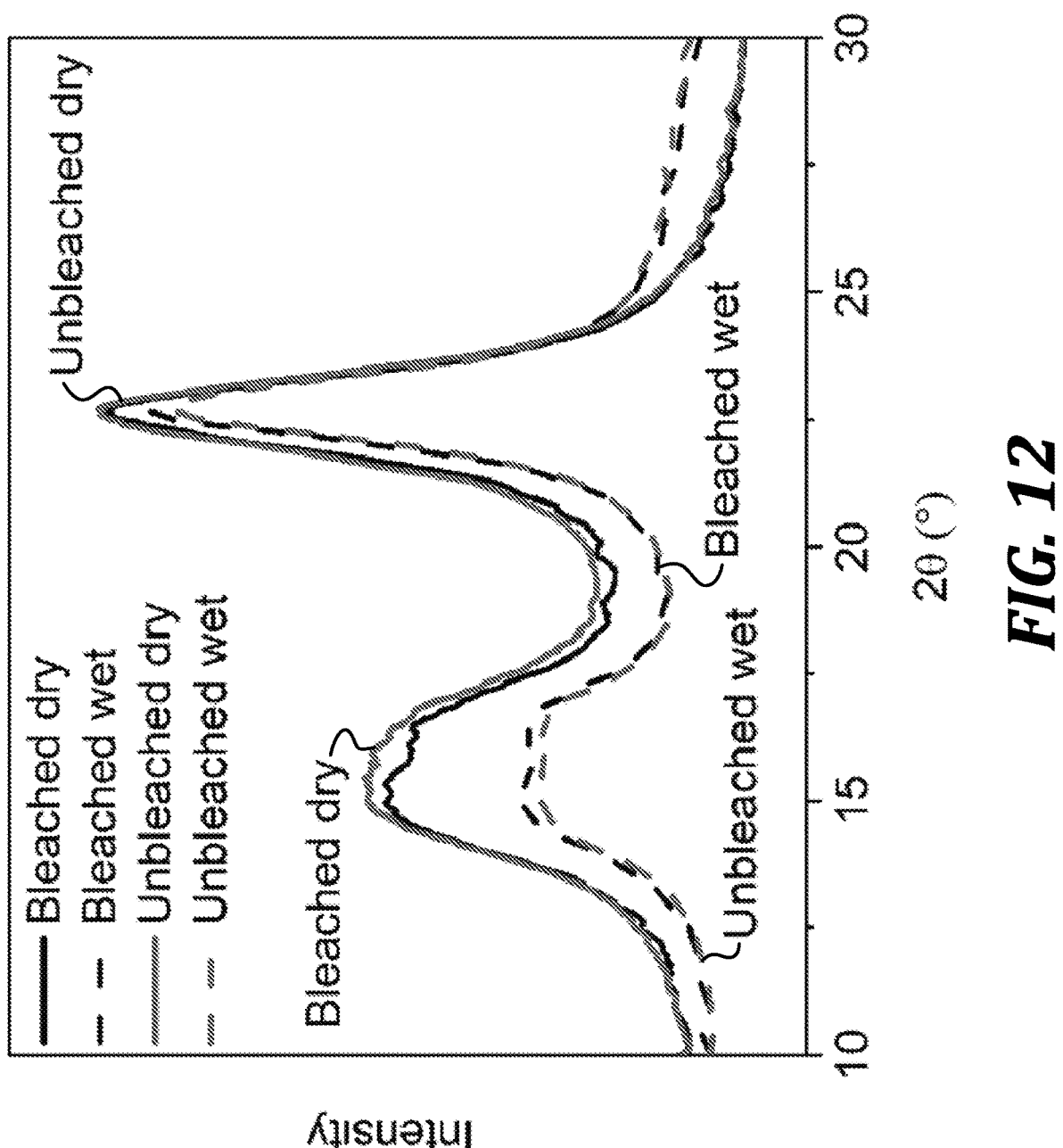
FIG. 12 shows the X-ray diffractograms of bleached and unbleached softwood pulp fibers in their dry and wet state, after soaking in DI water for 60 s.
Figure 13A:
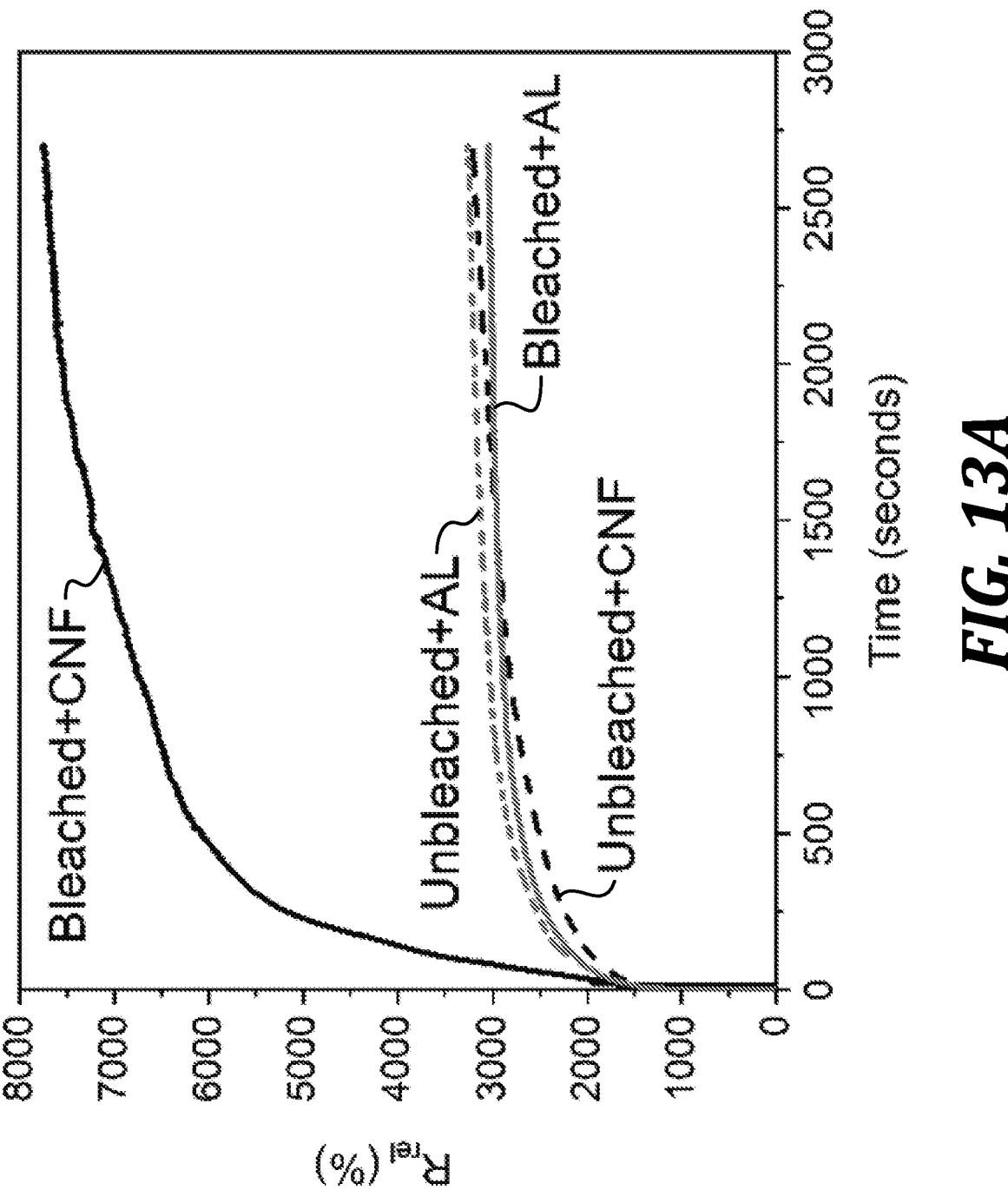
FIG. 13A is a graph showing the $R_{rel}$ as a function of time immersed in DI water for 60 g·m$^{-2}$ paper nanocomposites prepared with bleached or unbleached pulp, and lignin or CNF as the dispersing agent. The graph is indicative of the sensitivity to liquid water of 15 wt % 2:1 paper nanocomposites.

Paper cutouts were applied as multifunctional resistive sensors in aqueous environments, as illustrated in FIG. 9. The paper nanocomposites possessed unique sensing characteristics with one of the highest sensitivities to liquid water reported (i.e., $R_{rel}$~12,000%), which was defined as the ratio of the difference between the electrical resistances of the wet and dry specimen to the electrical resistance of the dry sample. Such record sensitivity enabled the quantification of water volumes as small as 0.25 µL with great accuracy (FIG. 9-droplets). This could be attributed to the peculiar swelling behavior of cellulose in the presence of water—the diameter of pulp fibers in water increased by 28% on average compared to their original drying state (FIGS. 10A-10C). While conventional sensors relied on changes in charge carrier concentration due to adsorbed water molecules, the swelling mechanism of cellulosic fibrous network allowed for dramatically faster and greater responses. The presence of free water molecules could affect the interfiber spacing by disrupting hydrogen bonding between adjacent pulp fibers, although its contribution to the sheet hydroexpansion was negligible compared to the swelling of individual fibers. Cellulose fibers were commonly understood to demonstrate two distinct swelling phases when immersed in water: an initial short but fast phase where the swelling rate reached a maximum, followed by a longer and slower phase where the swelling rate approaches zero. The resistive response of fully immersed paper sensors followed the same behavior with a steep linear increase at short times before leveling off after several minutes (FIG. 9-submersion). This behavior could be fitted using a pseudo second order model with correlation coefficients approaching unity (FIGS. 11A and 11B). The extent of cellulose expansion depended on the uptake of water molecules, which occurred mainly in the amorphous regions of cellulose where larger numbers of free hydroxyl moieties were available. Comparing the X-ray diffractograms of dry and wet bleached and unbleached softwood pulp (FIG. 12), the same shift in the characteristic 29 cellulose peak was observed for both types of wet pulp (Table 2). This indicated that each sample experienced the same level of strain in their cellulose crystalline regions after soaking in water for 60 seconds. Despite presenting the same magnitude of expansion—in each case the crystallite size increased by approximately 15% when wet, the presence of lignin in the unbleached pulp considerably limited the extent of water sorption, hence reducing the total swellable area within the sample. Besides delignification, the swellable area could be augmented further by incorporating CNFs into the paper nanocomposites as CNT dispersing agents instead of less water-swellable surfactants, creating a hierarchically swellable structure (FIG. 13A).

TABLE 2

2D-XRD parameters for bleached and unbleached cellulose pulp, dry and after being soaked in DI water for 60 seconds.

| Sample ID | FWHM | (200) peak 2θ (°) | CrI (%) | Crystallite size ($L_{200}$, nm) |
|---|---|---|---|---|
| Bleached dry | 2.17 | 22.54 | 82.39 | 3.59 |
| Bleached wet | 1.89 | 22.72 | 92.74 | 4.12 |
| Unbleached dry | 2.26 | 22.51 | 79.64 | 3.45 |
| Unbleached wet | 1.93 | 22.72 | 95.09 | 4.03 |

Figure 13B:
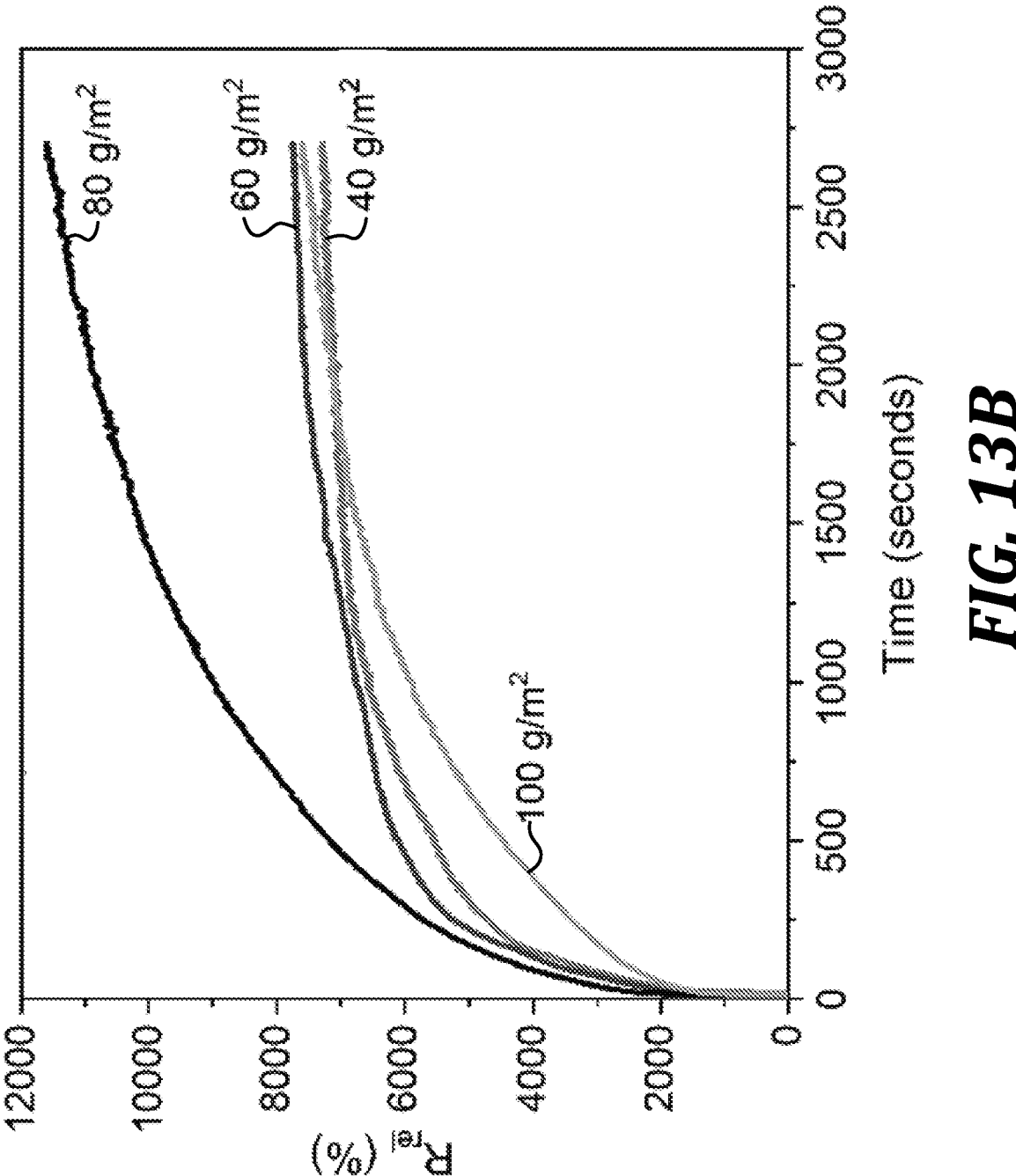
FIG. 13B is a graph showing the $R_{rel}$ as a function of time immersed in DI water of paper nanocomposites prepared at different sheet grammages (g·m$^2$). The graph is indicative of the sensitivity to liquid water of 15 wt % 2:1 paper nanocomposites.

The sheet density and porosity were other important factors governing the resistive response of materials to liquids. In low density sheets, the fibers could occupy the surrounding empty space when swollen. As the sheet density increased, the spacing between fibers decreased and the number of interfiber contacts increased. Therefore, there was an optimum sheet density to maximize the disruption of the percolated electrical network on the surface of individual fibers, while minimizing the reformation of CNT junctions between adjacent fibers (FIG. 13B). Finally, the CNT content and dispersion state within the fibrous network also had a strong influence on the signal response. Papers prepared with 15 wt % CNT and at a CNT:CNF ratio of 2:1 achieved the highest sensitivity to aqueous solutions due to the optimized balance between sheet resistance and CNT dispersion throughout the paper. Sharp reductions in sensitivity were observed both when the initial resistance of the paper was too high at lower CNT content, and when CNTs were less evenly distributed in the sheet due to larger quantities of hydrophobic particles in the aqueous suspension (FIGS. 11A and 11B).

Influence of Environmental Factors

Since the extent of cellulose swelling was also highly dependent upon the nature and temperature of the solvent, the paper nanocomposites could serve as liquid sensors in various applications. For instance, the fiber diameter increased by 27.5% on average when immersed in deionized water, while the radial swelling was only 7.4% in ethanol (FIGS. 10B and 10C). These observations were consistent with other studies and suggested that polarizability and molar volume were the main solvent characteristics influencing the swelling behavior of cellulose. Based on the solvent-specific swelling response, the paper nanocomposites were not only able to distinguish between different solvents, but they could also detect the presence of water in organic solvents (FIG. 9-organic solvents). The detection limit was as low as 250 ppm for water in toluene, making the resistive paper sensors very compelling for the monitoring of trace water impurities during the production of fuels and chemicals. The temperature of aqueous solutions could also be measured accurately and reliably based on linear relationships between the electrical resistance and the liquid temperature with correlation coefficients approaching unity regardless of the sensing time (FIG. 9-temperature). The presence of ionic species in solution was another important factor influencing the resistive response of paper nanocomposites. The effect of salinity on the sensing performance was studied using sodium chloride solutions to simulate seawater (FIG. 10-ionic strength). Results reveal that the signal intensity decreased with the increase of salt concentration. This could be attributed to the reduced Donnan osmotic pressure between the porous paper structure and the extremal solution at high salt concentrations, which was caused by the ionic interactions between mobile ions and the fixed charges on the cellulosic material. This result explained the different sensitivity values obtained in deionized and tap water. Furthermore, the paper nanocomposites exhibited the same predictable electrical response with correlation coefficients approaching unity when immersed in either deionized or tap water spiked with sodium chloride ranging from 0.05 to 1 wt %. Beyond this concentration range, the salt quantity was either too low or the solution conductivity is too high to yield statistically significant variations in electrical resistance. The predictable sensitivity of the paper nanocomposites to liquid temperature and salinity was especially attractive for smart aquaculture applications.

Sensing Stability and Cyclic Analysis

Figure 14:
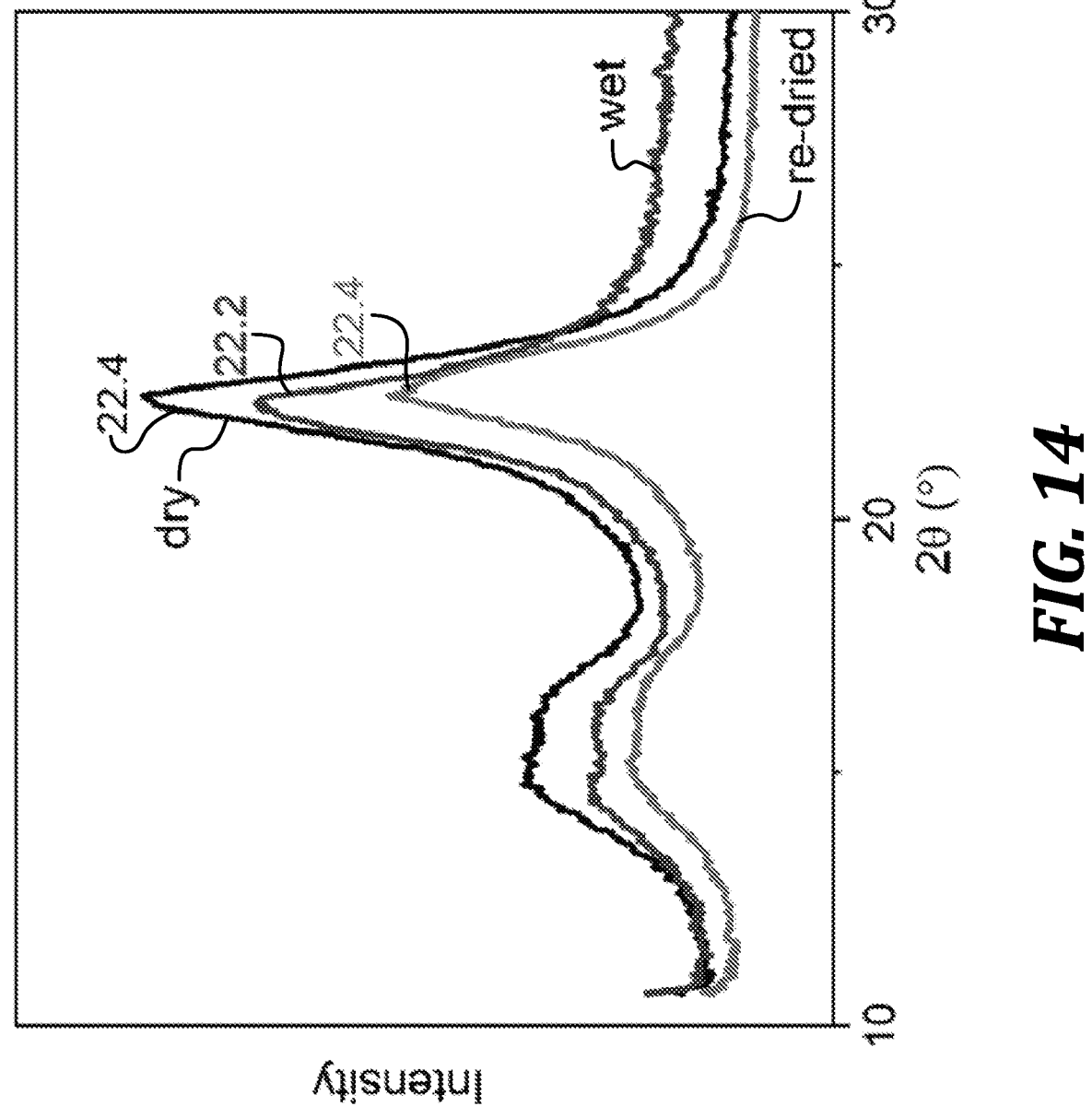
FIG. 14 shows the X-ray diffractograms of pristine bleached softwood fibers when dry, immersed in water for 30 seconds, and re-dried. The reversibility of cellulose expansion mechanism is illustrated.
Figure 15:
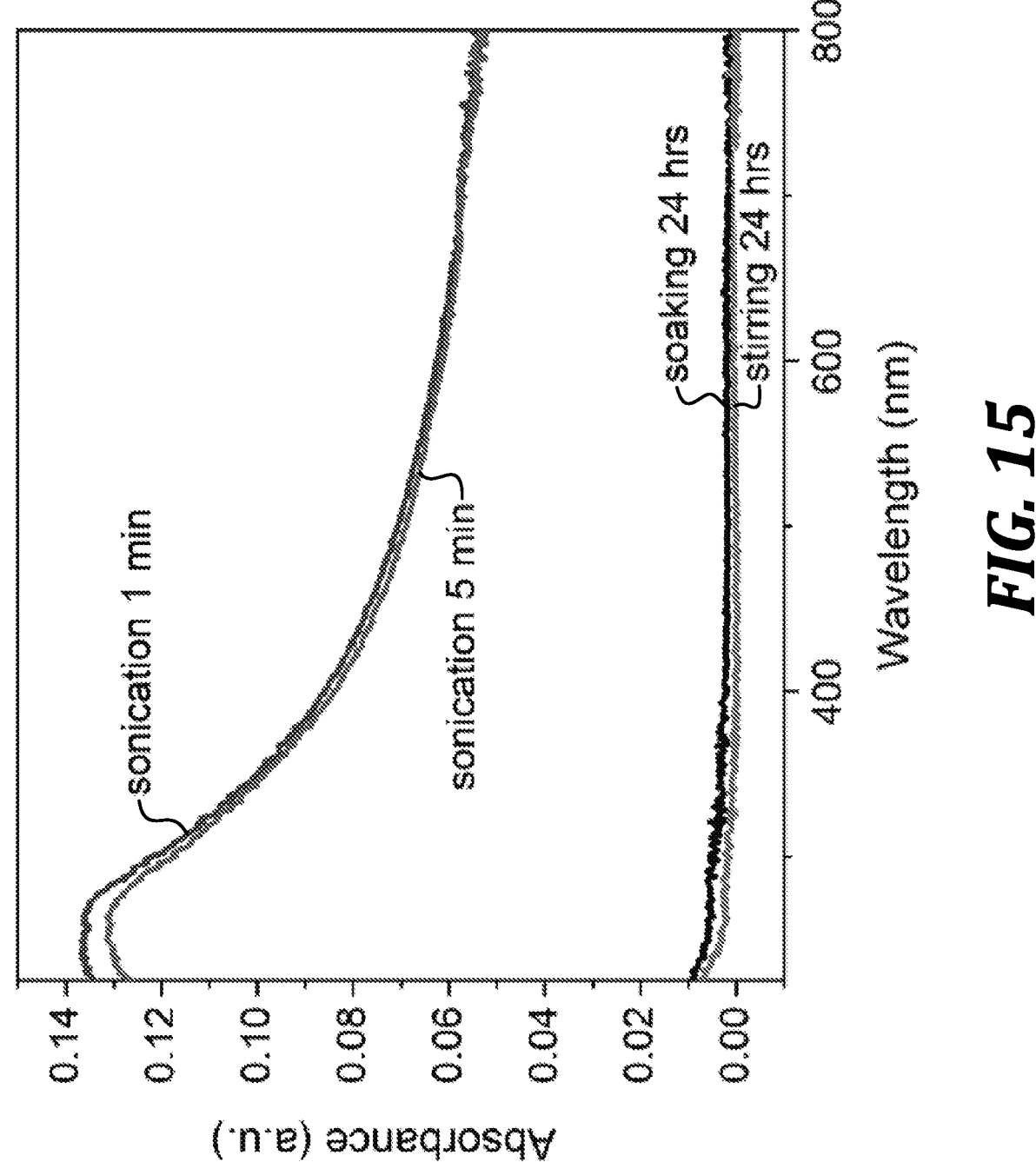
FIG. 15 is the optical absorption spectra of solutions containing 1 cm$^2$ sections of paper nanocomposites subjected to varying degrees of agitation in DI water. Sample agitation was conducted by either soaking on an orbital shaker or stirring for 24 hours, or by bath sonication for 1 and 5 minutes. In this manner. CNT leaching from embodiments of paper nanocomposites is evaluated. Representative optical microscope images (not shown) of sonicated solutions confirm that CNTs remain strongly attached to pulp fibers even after the cellulose fibers have been dislodged from the sheet.
Figure 16:
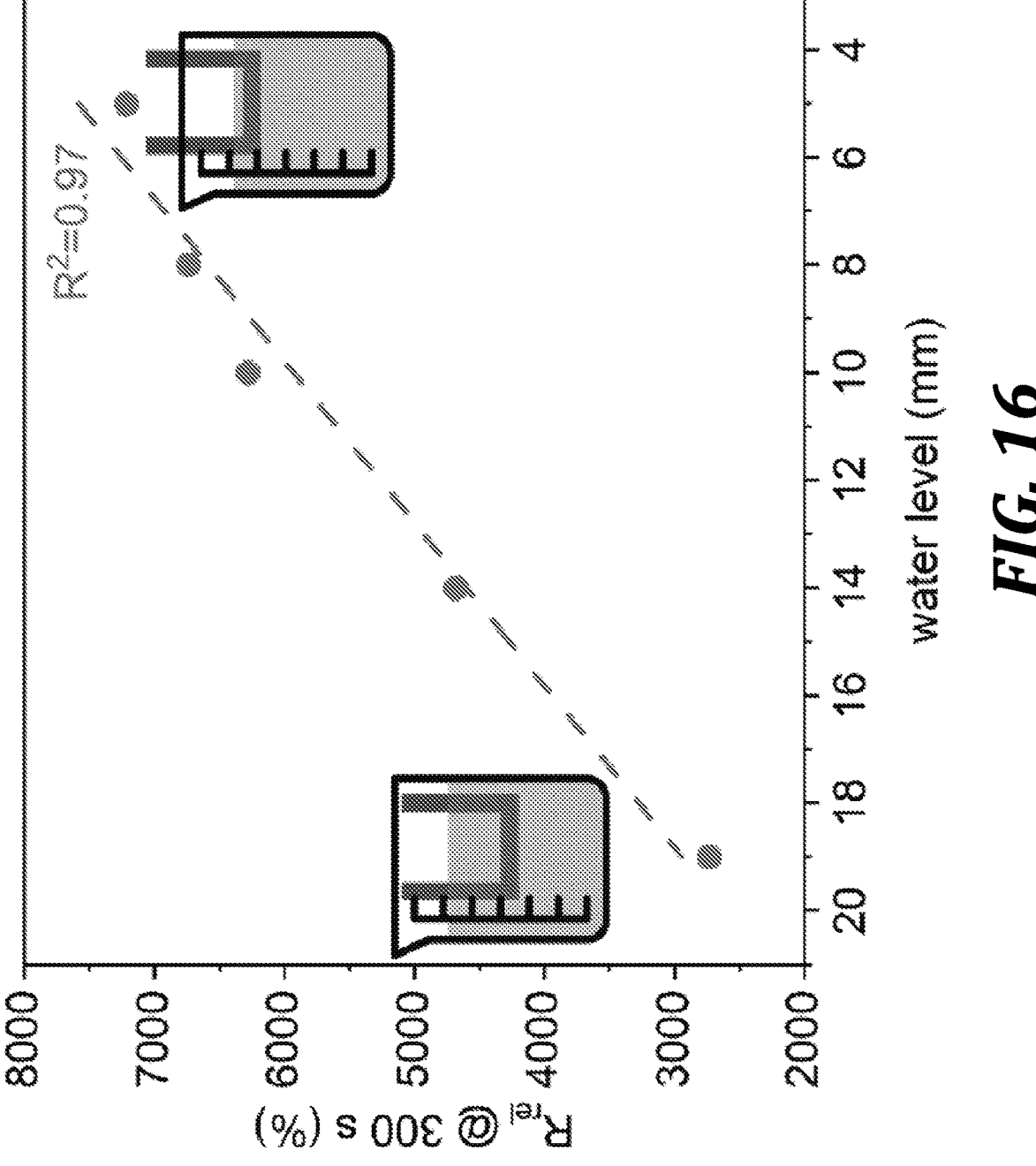
FIG. 16 is a graph of the relative resistance response ($R_{rel}$) as a function of immersion depth in DI water. A U-shaped sample was initially immersed 19 mm into DI water, and then subsequently raised out of the water every 300 s to a final immersion depth of 5 mm. The electrical response was continuously monitored by a Keithley 2450 voltage-current meter. Similar setups can be implemented applications in overflow monitoring systems.

Interestingly, the expansion mechanism of cellulose fibers was fully reversible, as evidenced by XRD and optical microscopy (FIG. 14). As liquid successively entered and left the material, the cellulose chains moved apart or draw closer together, respectively. This reversible response was indicated by the elastic shift in the characteristic 29 cellulose peak from 22.4° to 22.2° and back as well as a reversible increase in the crystallite size from 4.5 to 4.8 nm and back. This movement was responsible for altering the electron transport by varying the intertube distance between neighbored CNTs above or below the critical tunneling distance, which was approximately 1.8 nm. This translated to very reproducible sensing responses over at least 30 immersion/drying cycles (FIG. 9-submersion). Absorption spectroscopy also confirmed the absence of individual CNT leaching in solution even when the paper sensor was immersed in water under continuous agitation for extensive periods of time up to 24 hours (FIG. 15). Noteworthily, the sensor performance was not affected by aging and similar signals were obtained with the same paper-based sensor after a six-month interval. Sensing stability also remained excellent after multiple immersion/drying cycles in alternating aqueous solutions containing various levels of salts (FIG. 9-ionic strength). Furthermore. Laplace pressure increased as the water is withdrawn from the paper, bringing pulp fibers closer to each other due to capillary forces. This rapid reorganization of the wet fibrous network contributed to fast response times, enabling applications like wave monitoring and water level measurement. The former, exemplified in FIG. 9—wav monitoring, showed consistent variations in the signal period with the rotation speed of the wave generator. When the rotation speed increased by 11% (i.e., from 45 to 50 rpm) and 20% (i.e., from 50 to 60 rpm), the average signal period was raised by 10% (i.e., from 1.22 to 1.11 s) and 19% (i.e., from 1.11 to 0.90 s), respectively. The latter revealed that the electrical resistance of the paper nanocomposites varied linearly with the depth of immersion, exhibiting a sensitivity of 45 $k\Omega \cdot mm^{-1}$ and a correlation coefficient of 0.97, as shown in FIG. 16. This implied that resistive paper sensors can monitor liquid levels in the millimeter range, which can be beneficial in various applications, such as offshore engineering constructions, overflow prevention systems and early warning of marine disasters.

Pilot Scale Manufacturing

Figure 17:
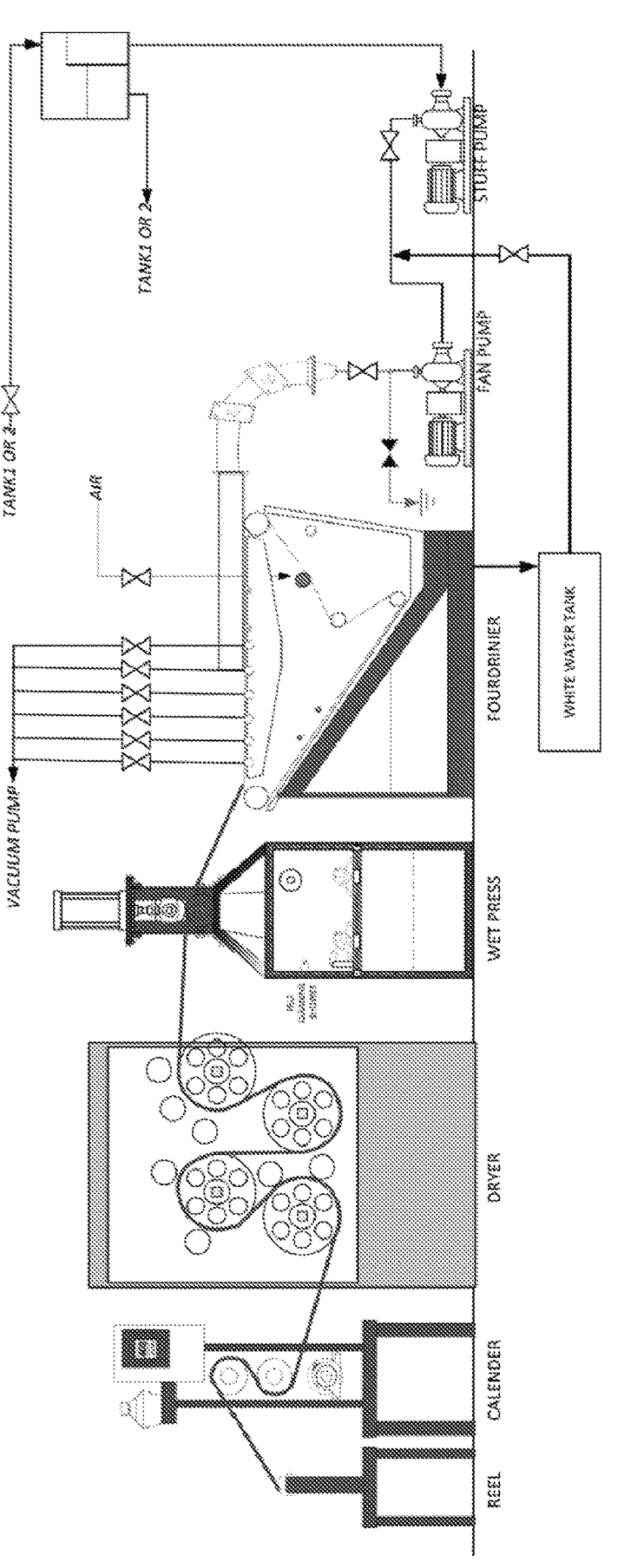
FIG. 17 is a process flow diagram of pilot-scale web former. Softwood and hardwood fibers were prepared in tank 1 and combined with the aqueous CNT:CTAB and CNT:AL dispersions (5 wt %, 2:1) at the fan pump prior to sheet formation. The machine was operated at 3.2 m·min$^{-1}$ and the formed sheet was dewatered (i.e., the liquid was removed) by subsequent pressing and drying. More than 70 meters of paper nanocomposite with 18±2 wt % CNT were produced in this continuous flow fashion.
Figure 18A:
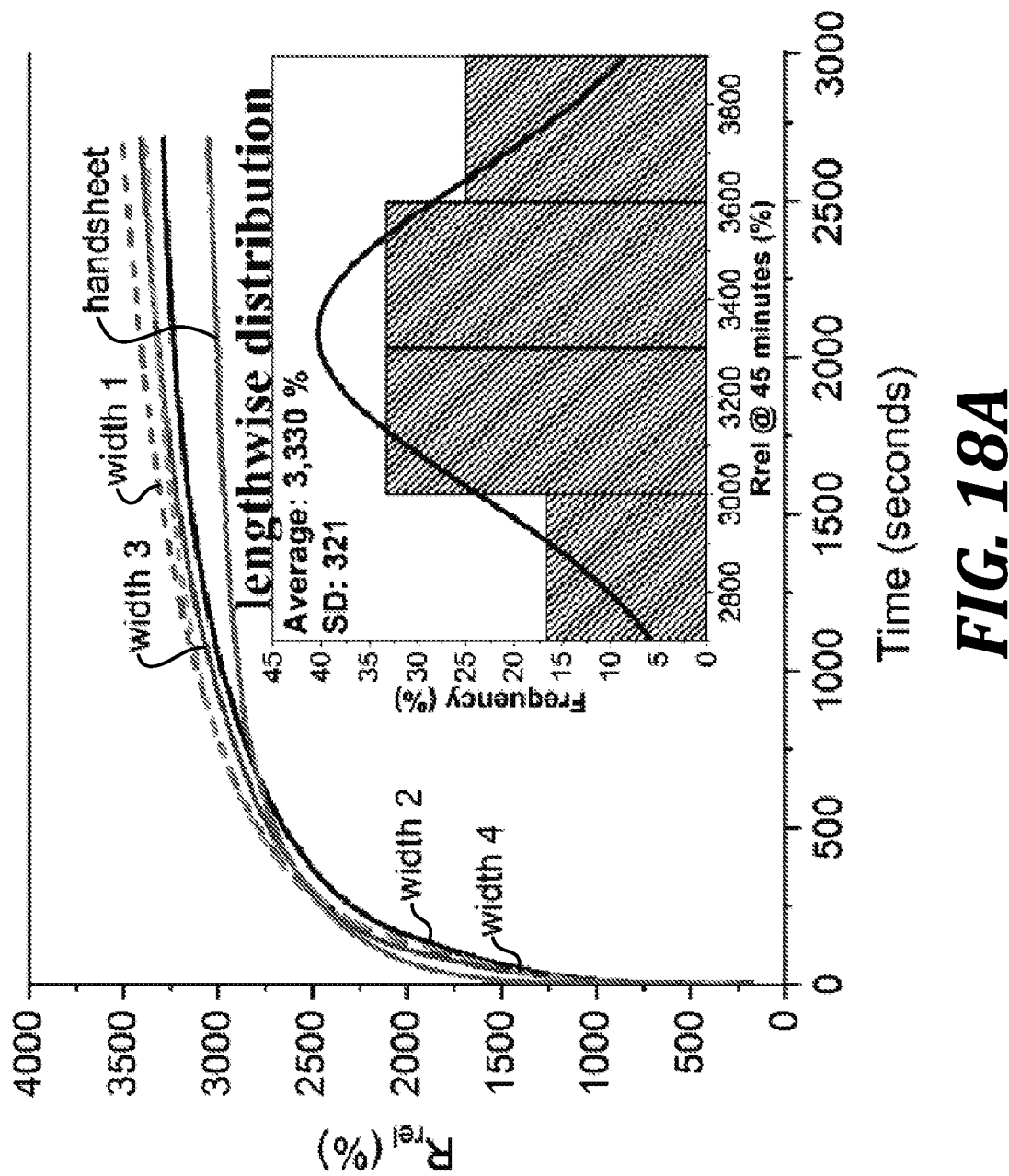
FIG. 18A is a graph showing the relative resistance response ($R_{rel}$) as a function of time immersed in water for samples of continuous flow processed paper nanocomposites, taken across the full width (30 cm) of the sheet prepared with the dynamic web former, compared to similar samples made at the bench scale. The inset demonstrates the relatively narrow lengthwise distribution in sensitivity along the 70-m long sheet with over 35 replicates.
Figure 18B:
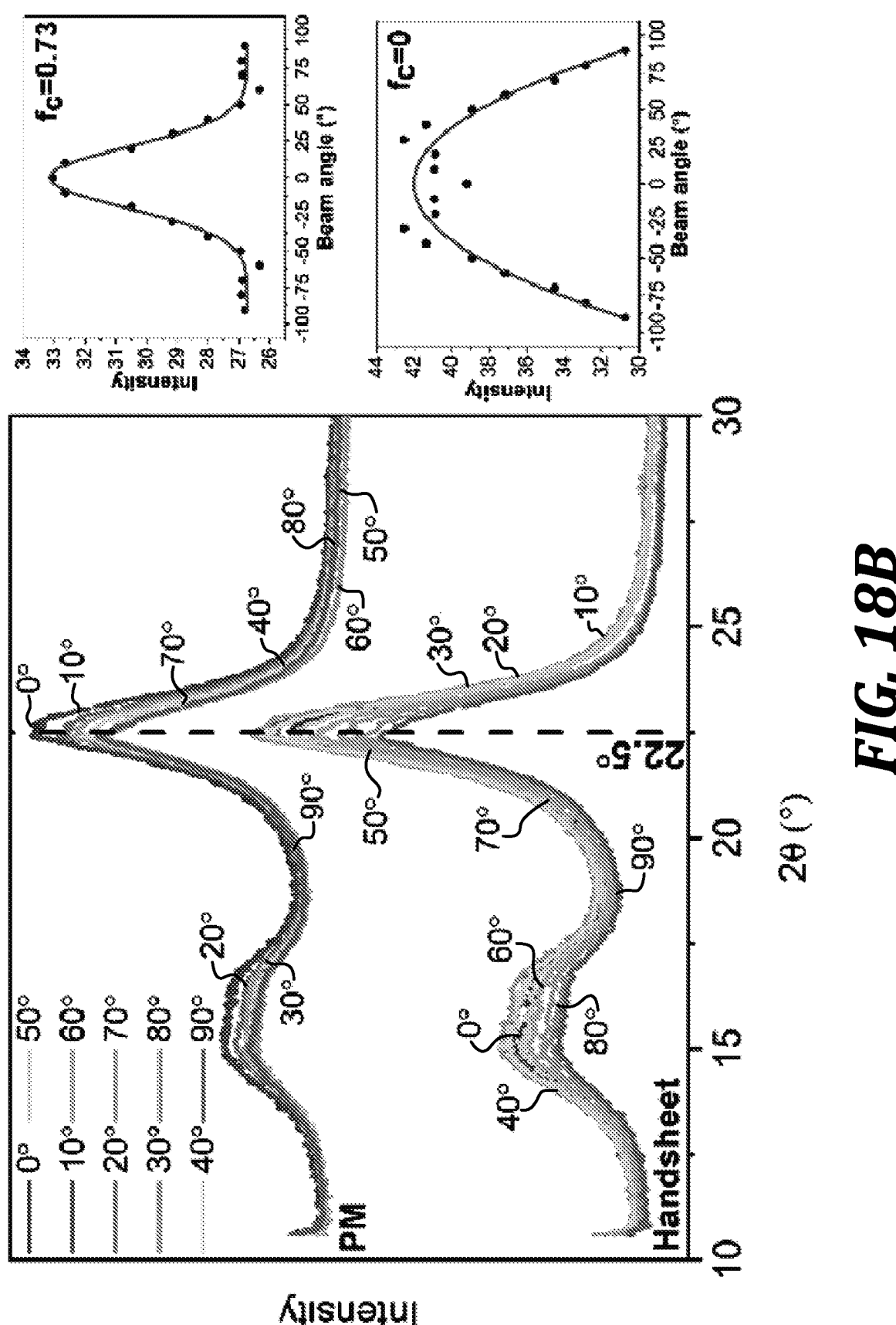
FIG. 18B shows the 2D-XRD profiles of paper nanocomposites produced by continuous-flow and batch scale processes, where the beam angle was rotated from 0 (in direction of continuous flow) to 90° (perpendicular to flow). The insets show the corresponding azimuthal integration of the peak at 22.5° with respect to beam angles. Fc values of 0.73 and 0 for the paper machine specimens (PM) and handsheets respectively, indicate some degree of fiber alignment during dynamic web formation, with Fc value of 1 indicating perfect alignment and Fc value of 0 being characteristic of randomly oriented fibrous networks.
Figure 19A:
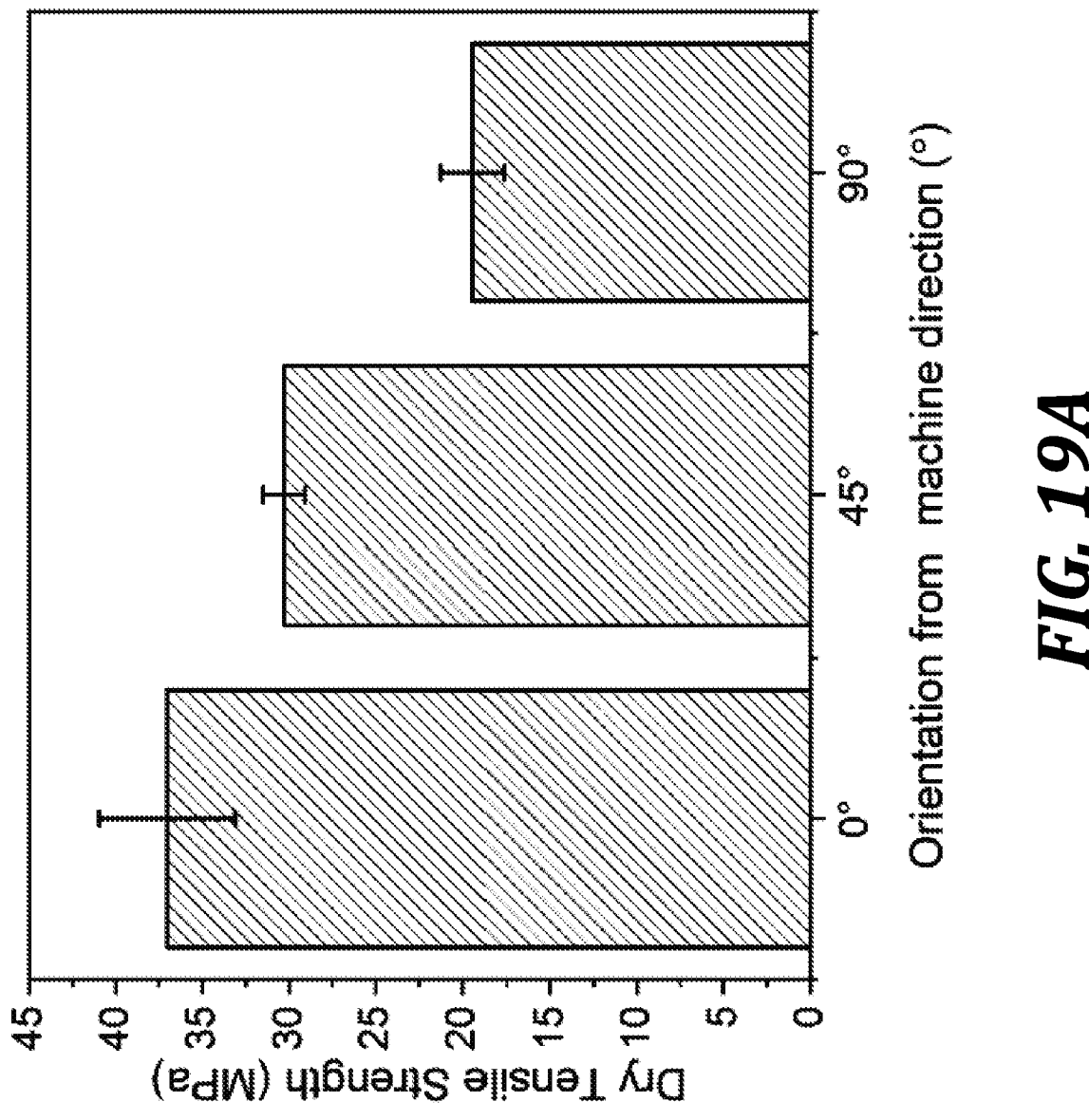
FIG. 19A is a bar graph of the Tensile strength of anisotropic paper nanocomposites produced by pilot-scale web forming as a function of the angle between the stretching direction and the fiber orientation in the sample. At 0°, the pulp fibers are aligned parallel and perpendicular to the stretching direction, respectively. The effect of fiber orientation on mechanical and electrical properties of paper nanocomposite is shown.
Figure 19B:
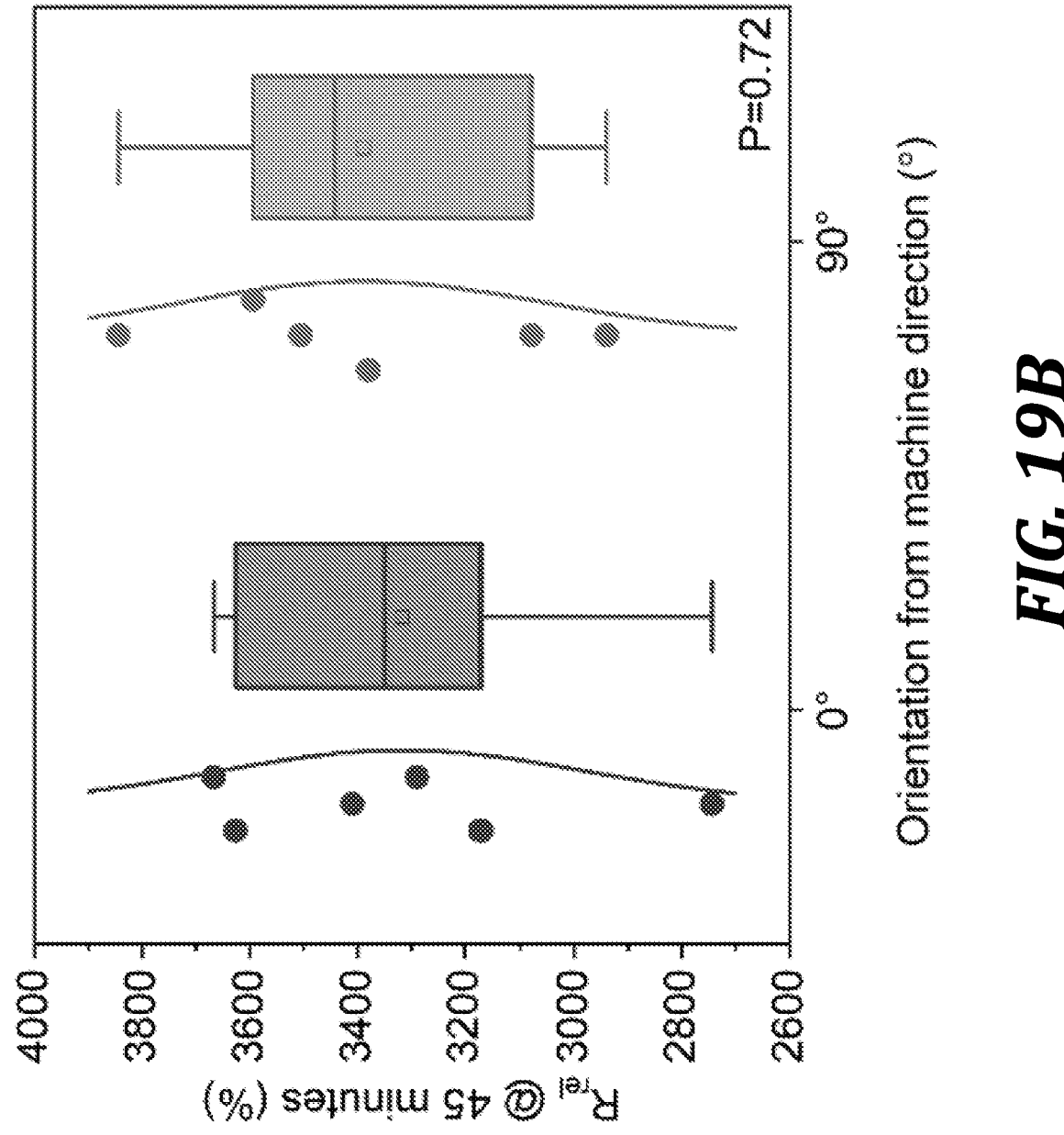
FIG. 19B is a graph showing the statistical analysis comparing the means of maximum relative resistance achieved after 45 minutes of immersion in DI water for specimens prepared with different fiber orientations. At 0° and 900 orientations, fibers are aligned vertically and horizontally along the bottom part of the immersed U-shaped samples, respectively. The calculated p-value of 0.72 at a 95% confidence level confirmed that the resistive response of paper nanocomposites to water remained isotropic. The effect of fiber orientation on mechanical and electrical properties of paper nanocomposite is shown.

In continuous flow processing, colloidal retention and dewatering time were identified as limiting factors for sheet formation. Since the pore size of the wire was too large to retain the nanoparticles, filler retention was promoted by mechanical entrapment and electrostatic adsorption. First, the sheet grammage was increased from 60 to 80 $g \cdot m^{-2}$ and 25 wt % bleached hardwood pulp was incorporated in the paper composition to diminish the number and size of pores in the fibrous mat. Then, the CNT feed was split into two filler streams of opposite charges to enhance electrostatic interactions between CNTs and pulp fibers based on a layer-by-layer nanoassembly technique. The first filler addition comprised a cationic dispersion of CNTs and Cetyl Trimethyl Ammonium Bromide (CTAB 5 wt %, 2:1), which was supplied at the fan pump to ensure sufficient time and shear forces for adequate mixing with the anionic pulp. The second filler addition consisting of an aqueous mixture of CNTs and anionic lignin was introduced prior to entering the forming section (FIG. 17). As a result, the wood pulp was modified by the successive adsorption of alternating layers of oppositely charged CNTs on the surface of cellulose fibers. CNTs that were not retained in the fibrous mat during their first pass were recirculated back to the web forming section to minimize nanoparticle loss. This approach yielded CNT retention higher than 90% in the final sheet. Given the non-polar nature of CNTs, the dewatering was fast, enabling operating speed over 3 $m \cdot min^{-1}$ with excellent sheet formation and uniform CNT distribution. Paper nanocomposites with sheet dimensions of 30 cm×80 cm were produced and exhibited homogeneous sensing performance with negligible change in sensitivity along the width and less than 10% variations along the length (FIG. 18A). Unlike batch processing, the dynamic web forming method induced the alignment of pulp fiber along the machine direction creating anisotropic sheets (i.e., long grain paper), as demonstrated by XRD measurements at different beam angle with the paper (FIG. 18B). While the preferred orientation of pulp fibers in the sheet had an impact on the mechanical properties (FIG. 19A), the resistive response of the paper sensor to water remained isotropic (FIG. 19B). More importantly, the signals collected from bench-scale handsheets prepared with the same characteristics (i.e., composition and density) were similar than those recorded with the materials made by the dynamic web former (FIG. 18A).

Leak Detection Applications

Figure 20A:
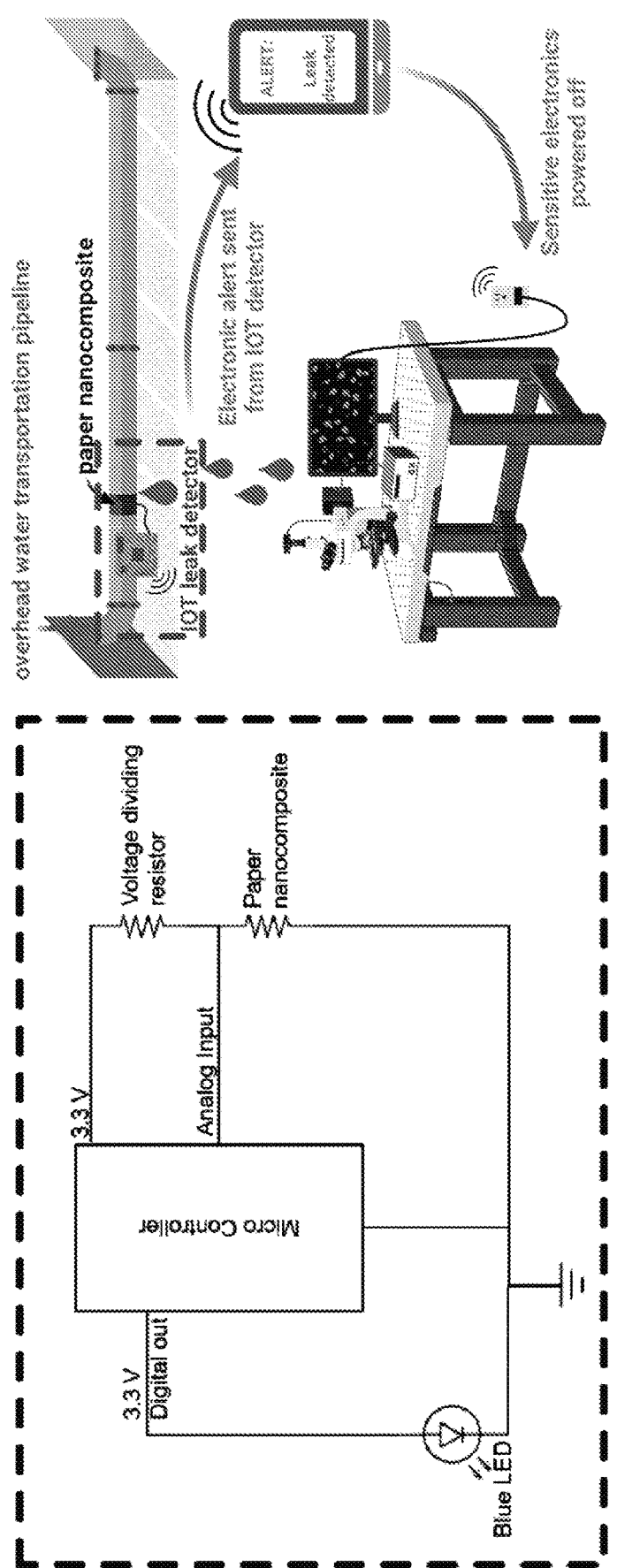
FIG. 20A is schematic depicting the implementation of paper nanocomposites connected to a NodeMCU that runs an OPC UA server capable of sending alerts to the ATLAS Detector Control System upon the detection of water in an underground network of cooling pipes at the CERN facility.
Figure 20B:
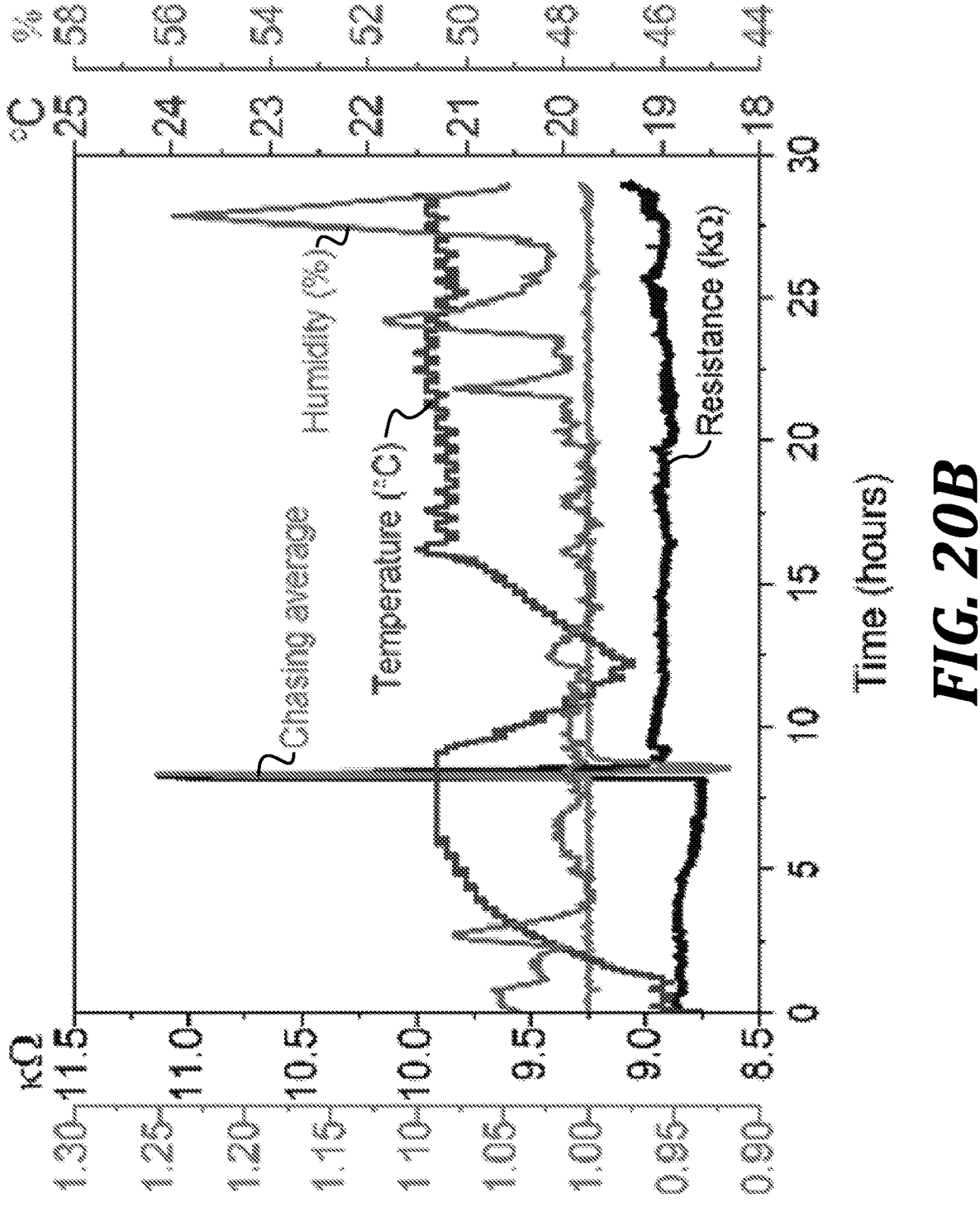
FIG. 20B is a graph of raw electrical resistance and processed response using a chasing average algorithm for a 30 cm×80 cm sheet wrapped around a pipe and exposed to 0.25 mL coolant water.
Figure 21:
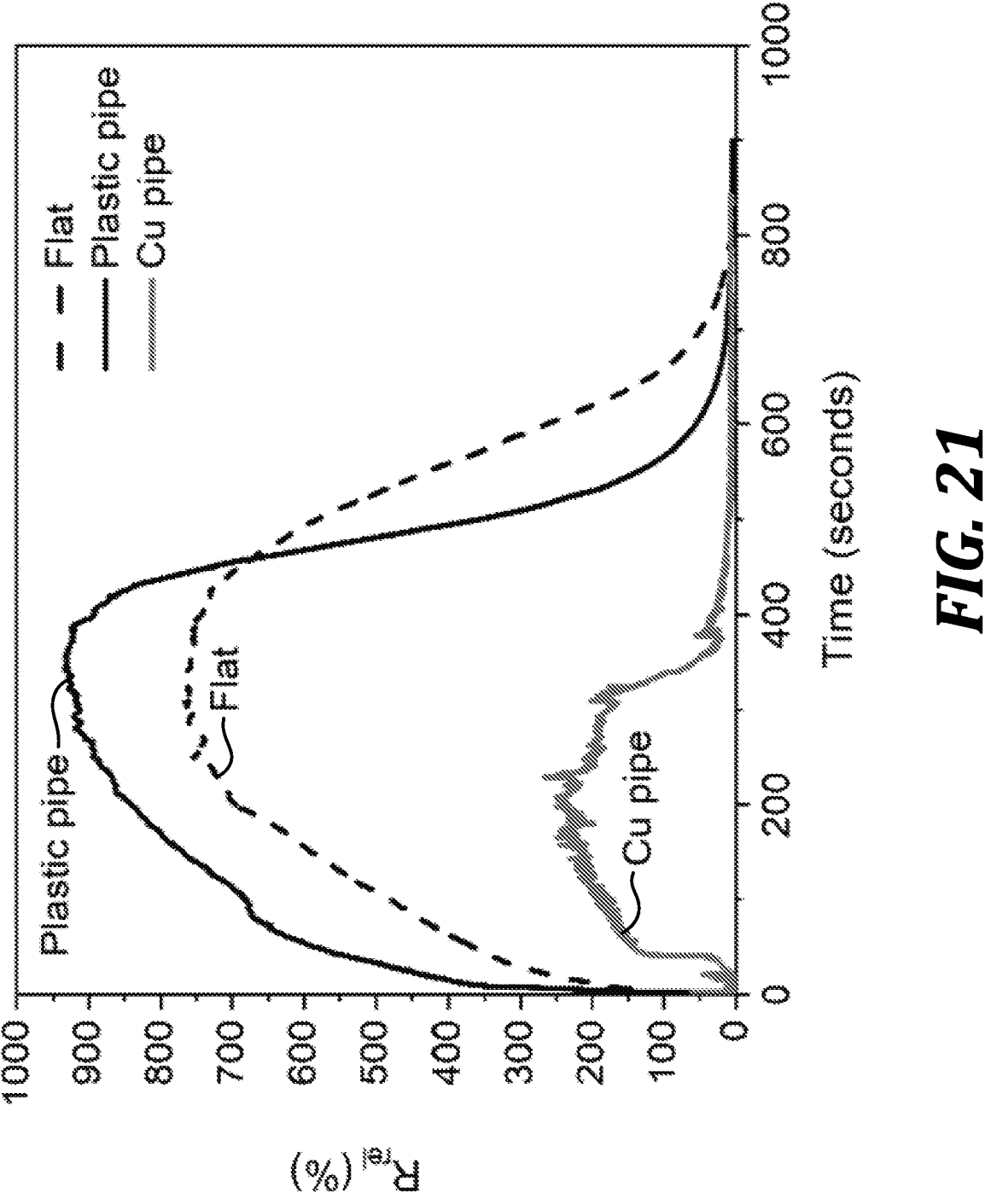
FIG. 21 is a graph of a time profile of the relative resistance response ($R_{rel}$) for flat and bent paper nanocomposites exposed to 10 μL of DI water. Water was applied at t=0 seconds, and the electrical response was monitored continuously by a Keithley 2450 voltage-current meter. Samples were either lying flat or bent around insulating (plastic) or conductive (copper) pipes. These electrical responses can be utilized as baselines to adequately adjust the resistance threshold for triggering a leak alert system in different configurations.

The paper sensors could function at low input power and do not require any active signal amplification. An inexpensive and portable leak monitoring system was developed using a NodeMCU microcontroller to send wireless text messages to a remote cellphone or computer as soon as the presence of liquid water was detected on a pipe wrapped in a paper nanocomposite sheath. FIG. 20A depicts the prototype wiring diagram, wherein the paper nanocomposite acted as the ground-side leg in a voltage dividing circuit. When the paper got wet, the resistance increased, causing the measured voltage to increase and triggering an alert. The leak detection system could be operated with pipes and surfaces of various nature and size by adequately adjusting the resistance threshold for triggering the alert to compensate the reduced sensitivity caused by bending or/and by contact with an electrically conductive surface (FIG. 21). FIG. 20A demonstrates how the sensory paper, when used in tandem with other Internet-of-Thing (IoT) technology, can be utilized to monitor and protect leak prone facilities by wirelessly responding to the presence of water. The rapid change in resistance within the voltage dividing circuit triggered immediate electronic alerts and allowed to automatically power off sensitive electronics, preventing property damages and data losses. To mimic practical applications, the leak monitoring device was placed around a 30-cm wide section of a 13-cm diameter metallic pipe in an underground cavern of the CERN ATLAS facility and tested over a 30-hour period. Water from the cooling circuit (Table 3) was drop casted (0.25 mL) on the paper sensor to simulate a leak after 8 hours of testing. FIG. 20B revealed that the sub-milliliter leak was clearly identified despite fluctuations in humidity (10%) and temperature (~3° C.) using a chasing average algorithm to prevent false positives. These results demonstrated that the as-prepared leak-sensors were capable of rapidly detecting the onset of water leaks the very moment it occurred to instantaneously power off sensitive instruments. Moreover, sensory papers could monitor large surfaces and be deployed in spaces with a complicated geometry by enabling 2D or 3D surface sensing, moving away from single point detection.

TABLE 3

| Analysis and photograph of the cooling circuit water used in leak sensing tests. | | | | |
| --- | --- | --- | --- | --- |
| Parameter | Technique | Value | Unit | Precision |
| pH | | 8.0 | — | 1.0 |
| Alkalinity P | | <0.10 | ° F. | 0.10 |
| Alkalinity M | | 17.3 | ° F. | 0.10 |
| $F^-$ | IC/CD | <0.1 | ppm | 0.1 |
| $NO_3^-$ | IC/CD | <0.1 | ppm | 0.1 |
| $SO_4^{2-}$ | IC/CD | 0.2 | ppm | 0.1 |
| Tolytriazole | HPLC/UV-vis | 2.1 | ppm | 0.2 |
| Cl— | Photometry | 12.3 | ppm | 0.6 |
| Conductivity @ 25° C. | | 344 | $\mu S \cdot cm^{-1}$ | 5.0 |
| Al | ICP-MS | <5.0 | ppb | 5.0 |
| Fe | ICP-OES | <0.05 | ppm | 0.05 |
| Al | ICP-OES | <0.50 | ppm | 0.5 |
| Ba | ICP-OES | <0.10 | ppm | 0.1 |
| Hardness Ca | ICP-OES | 11.1 | ° F. | 0.5 |
| Cu | ICP-OES | <0.50 | ppm | 0.5 |
| Fe | ICP-OES | 8.91 | ppm | 0.5 |
| K | ICP-OES | 9.2 | ppm | 5.0 |
| Hardness Mg | ICP-OES | 2.76 | ° F. | 0.5 |
| Mn | ICP-OES | <0.10 | ppm | 0.1 |
| Na | ICP-OES | 13.9 | ppm | 5.0 |
| PO4 | ICP-OES | 5.0 | ppm | 5.0 |
| SiO2 | ICP-OES | <10.0 | ppm | 10.0 |
| Sr | ICP-OES | 0.626 | ppm | 0.05 |
| $PO_4^{3-}$ | ICP-OES | <0.2 | ppm | 0.2 |
| $PO_4^{3-}$ | Photometry | 3.5 | ppm | 0.2 |
| C | COT | 4.9 | ppm | 1.0 |

Figure 20C:
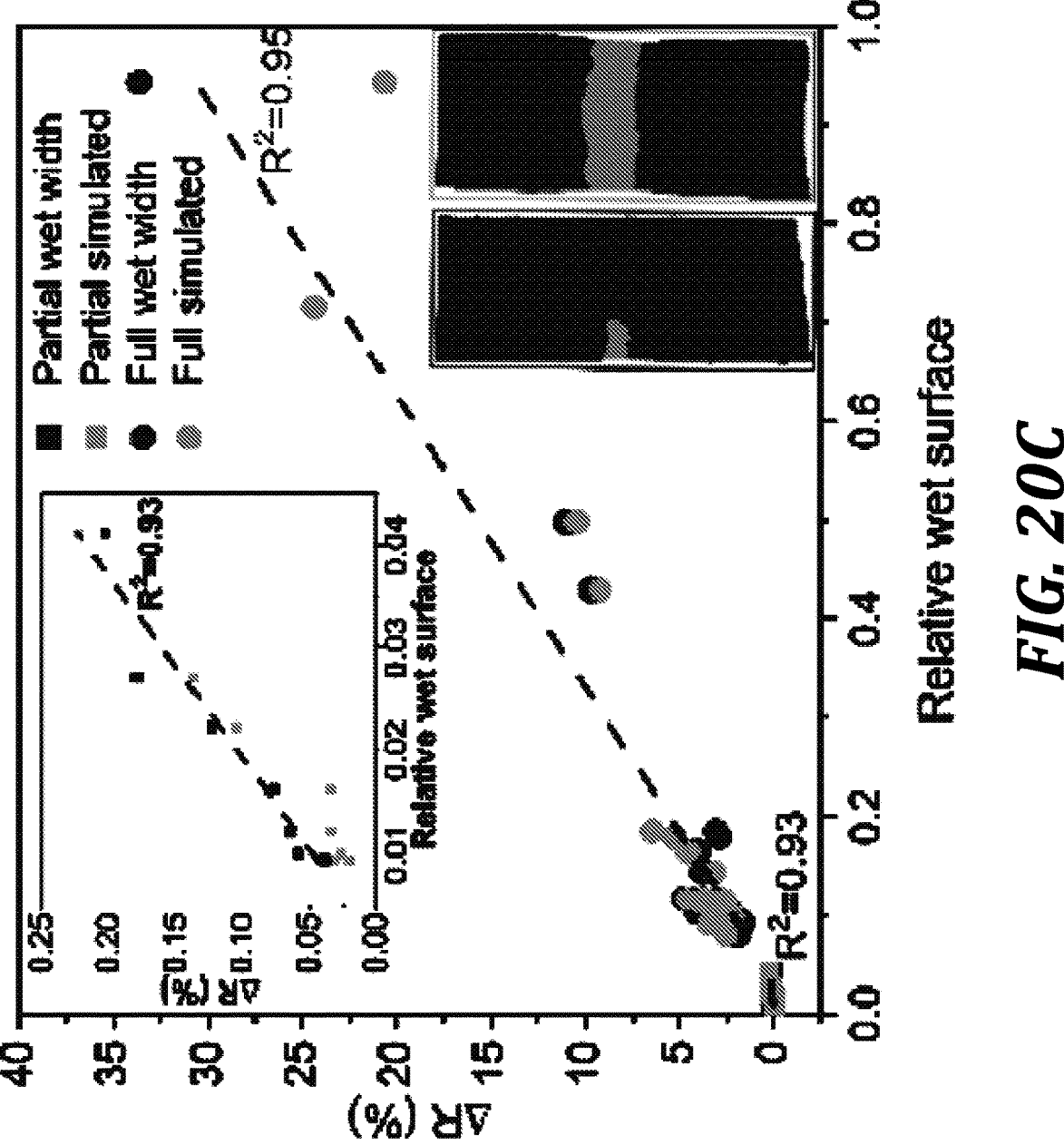
FIG. 20C is a graph of a change in electrical resistance ($\Delta R$) as a function of the relative wet area determined by image analysis. Inset shows expanded view of the partially wet data. Simulated data points are modeled as described in ESI, where the dry unit resistance ($r_d$) is calibrated to equate the experimental and simulated dry sheet resistance.
Figure 20D:
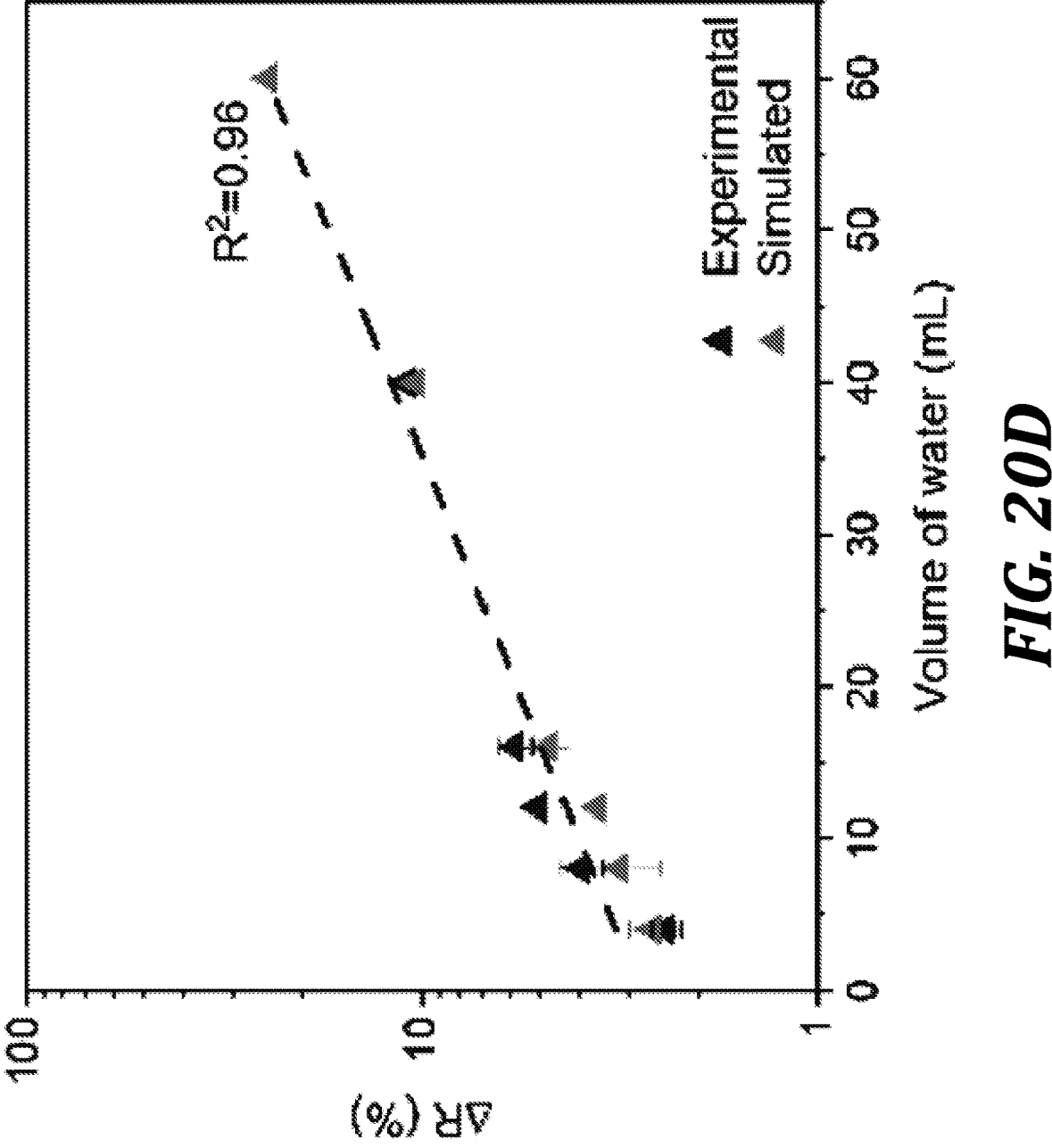
FIG. 20D is a graph of a change in electrical resistance ($\Delta R$) as a function of the volume of water applied to the sheet. Simulated data points are modeled as described in ESI, where the dry unit resistance ($r_d$) is calibrated to equate the experimental and simulated dry sheet resistance.
Figure 22:
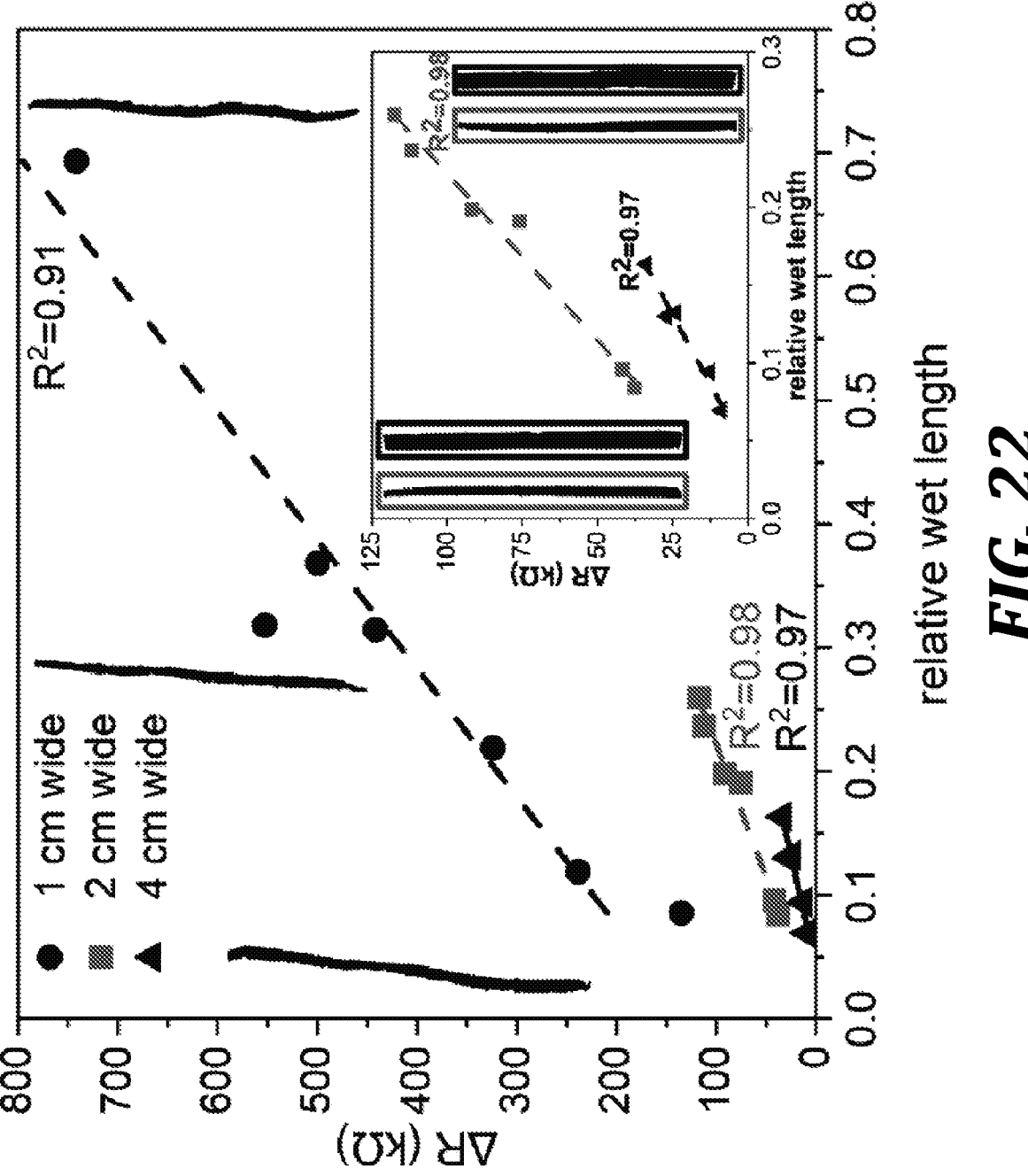
FIG. 22 is shows the linear evolution of the change in electrical resistance ($\Delta R$) as a function of the relative wet length for paper nanocomposites with different dimensions (i.e., 1 cm×80 cm, 2 cm×80 cm and 4 cm×80 cm). The insets show images of the wet (blue) and dry (black) portions of the various paper strips, as analyzed by GIMP software. Coolant water was used in this test (Table 2).
Figure 23:
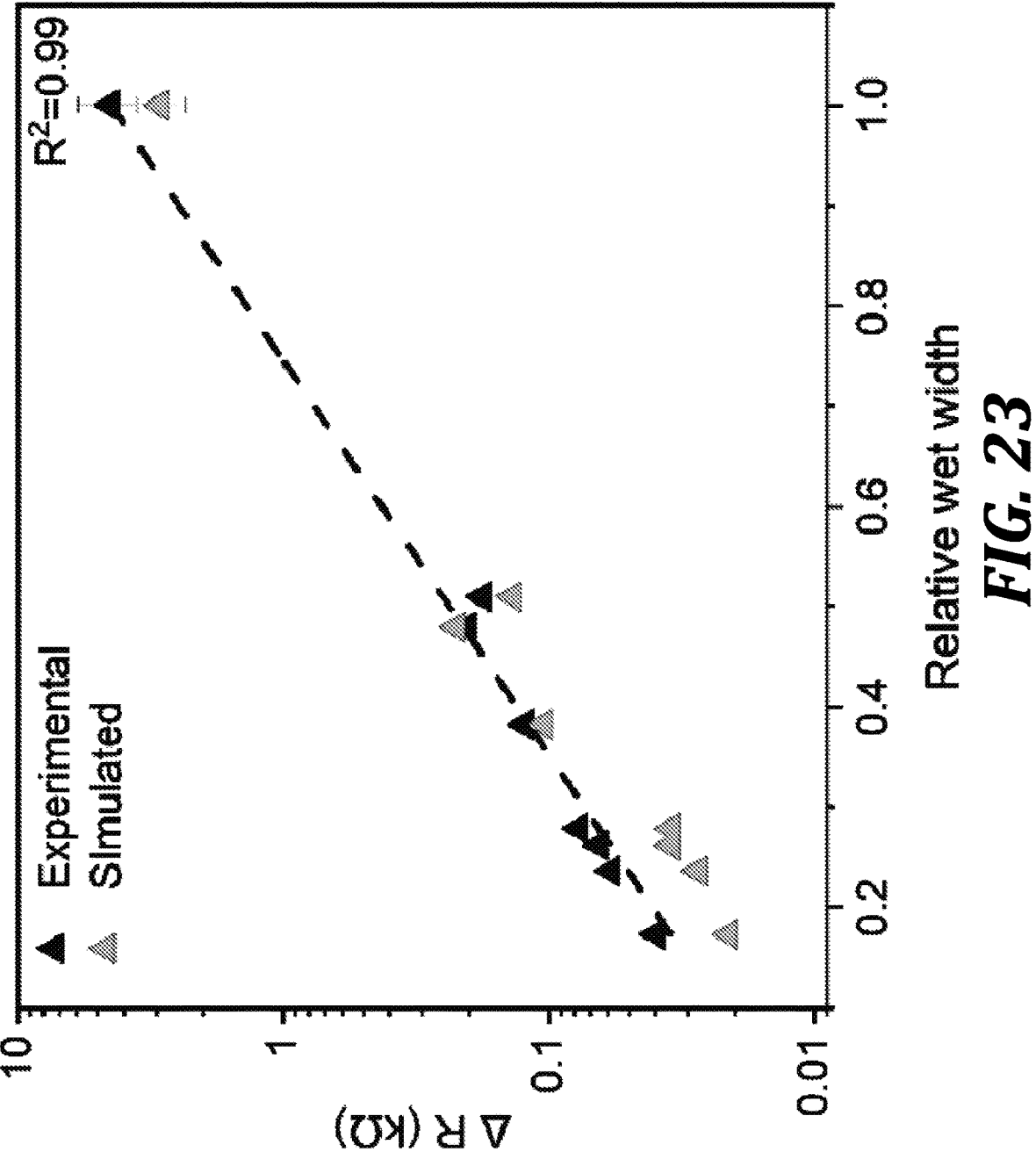
FIG. 23 is shows the experimental and simulated linear evolution of the change in electrical resistance ($\Delta R$) as a function of the relative wet width for 30 cm×80 cm paper nanocomposite sheets. The simulation was performed as described in Equations S2-S4 using wet width values estimated by GIMP image analysis software. Coolant water was used in this test (Table 2).
Figure 24A:
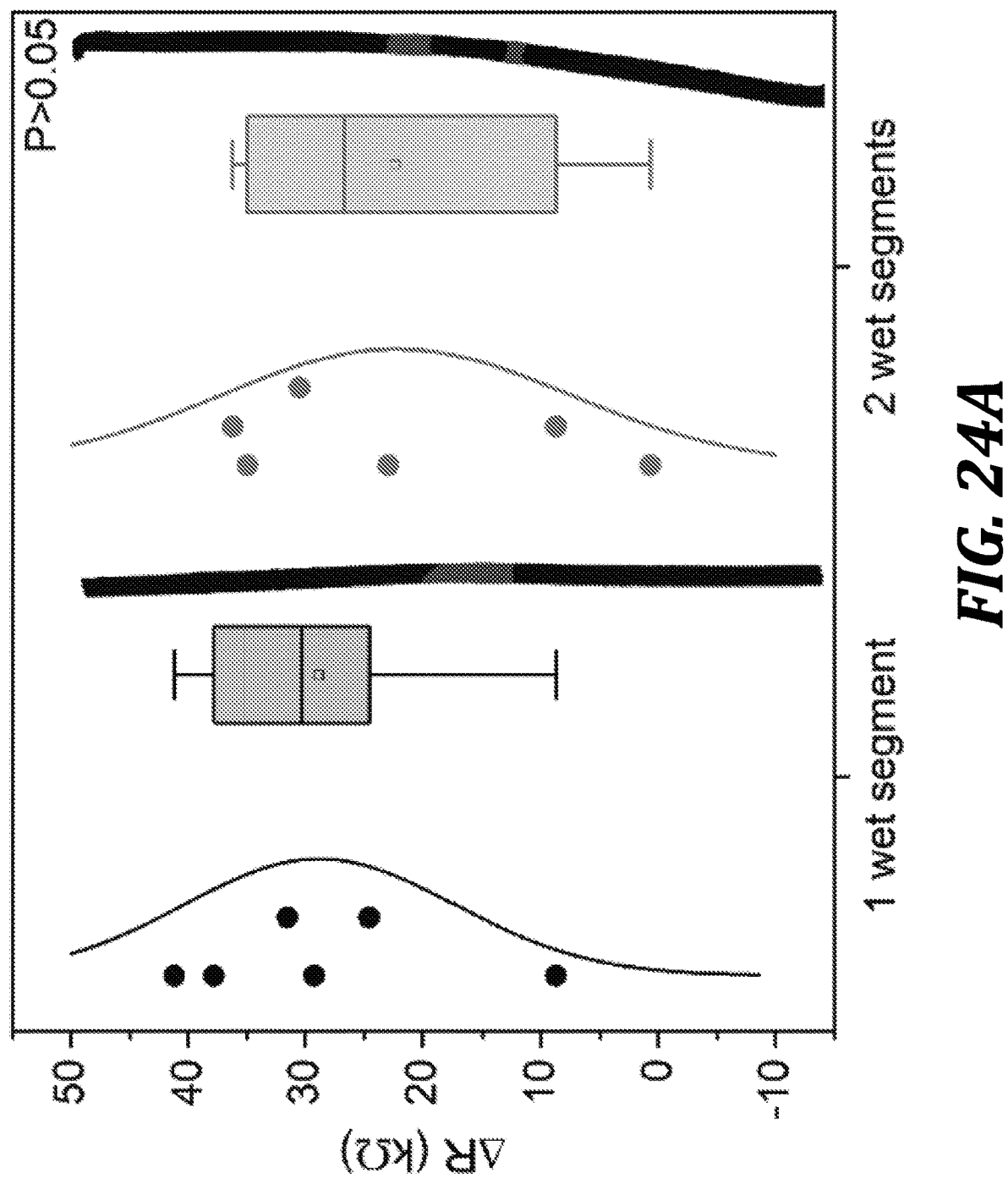
FIG. 24A shows the statistical analysis comparing the means of changes in electrical resistance for 2 cm×80 cm paper nanocomposite sheets as a function of the number of wet segments. There was no statistical significance between the means, as indicated by p-values>0.05 at a 95% confidence level.
Figure 24B:
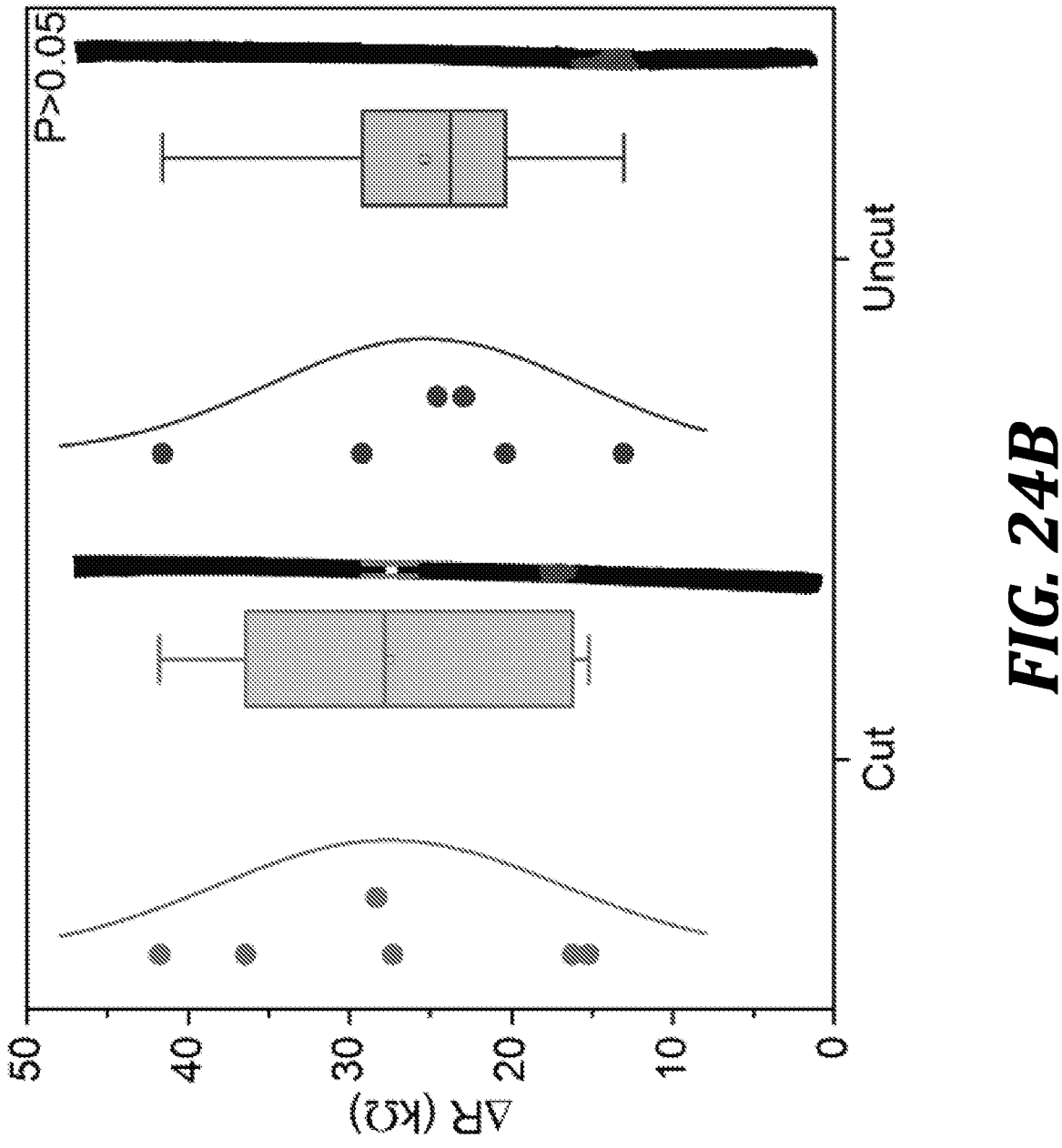
FIG. 24B is shows the statistical analysis comparing the means of changes in electrical resistance for 2 cm×80 cm paper nanocomposite sheets as a function of the number of sheets stitched together with aluminum tape. There was no statistical significance between the means, as indicated by p-values>0.05 at a 95% confidence level.

To explore the concept of surface detection further, the sensitivity of 30 cm×80 cm sheets was examined as a function of the relative wet area, which was computed by image analysis of the wet samples (FIG. 20C). Two linear regimes were clearly observed depending on whether water bridges both ends of the sensor width perpendicular to the direction of the electrodes. When water completely crossed the width of the sensor, the linear resistive response exhibited a steeper slope, indicating that the paper nanocomposites were more sensitive to variations in relative wet area in the full wet width regime. In this case, the resistive signal became linearly proportional to the relative wet length regardless of the sensor dimensions (FIG. 22). This result was consistent with the linear relationship observed between sensitivity and depth of immersion in the fully submerged experiments (FIG. 16). On the other hand, when the sensor width was partially wet (FIG. 4c-inset), the electrical response had a lower slope and is predominantly sensitive to the relative wet width (FIG. 23). Both regimes could be modeled by dividing the paper width as a set of parallel resistors, which were linked in series along the length of the sheet. As water spread through the paper, the value of the resistors gradually shifted from dry to wet levels, thereby increasing the equivalent resistance of the sensor. A step change was apparent when a low-resistance path through a parallel group of resistors was no longer available (i.e., full wet width). In this case, the equivalent resistance increased abruptly and its relationship with the wet area entered a second linear regime, where the electrical response became proportional to the relative wet length of the sensor. This simple model agreed very well with all experimental data as long as the sensor was not saturated with water, which happened when the relative wet surface approached unity. At this point, the simulation underestimated the resistive signal. Furthermore, the electrical response at a given relative wet area was also correlated with the volume of water, as demonstrated by both experimental and simulation data (FIG. 20D). This work provided a framework for the quantification of various liquids over large surfaces, which bore important implications for the sustainable and efficient management of fluids. Finally, there were no statistical differences in resistance when the relative wet area is computed either from multiple discrete small wet spots or from a single wet spot of larger dimensions (FIG. 24A). Similarly, no statistical differences were observed between data collected with a single strip of paper sensor and data obtained from a specimen of the same size but comprising multiple strips connected to each other with aluminum tape (FIG. 24B). This meant that paper nanocomposites could be cut and reattached easily using conductive tape without altering their sensing performance. Their versatility combined with their innate flexibility made it possible to design sensory papers with nearly every imaginable shapes for various applications in buildings, distribution lines, household manifolds, miniaturized cooling pipes and mobile tanks in ships and trucks.

Thus, the use of paper nanocomposites as leak detectors for aqueous and organic solvents was very promising, due to the combined technological and economic benefits. The tailored and cost-efficient web forming process was based on mature industrial systems, allowing the transfer of laboratory scale sensors to commercial applications. Low-cost arrays of highly sensitive and responsive liquid sensing devices could be deployed over large areas, in inaccessible spaces, and challenging configurations, to mitigate liquid damages and reduce utility bills by rapidly powering off sensitive instruments and locating leaks.

Exponential Method

Batch-Scale Preparation

Paper nanocomposites were prepared by combining pulp fibers (WestRock Company and Boise Cascade) with aqueous suspensions of hydroxyl-functionalized CNTs (Cheap Tubes Inc., 0.7% OH) and TEMPO-oxidized cellulose nanofibrils (CNFs), dispersed using a double acoustic irradiation system prior to sheet formation. For comparison purposes, helical CNTs and graphene nanoplatelets purchased from Cheap Tubes Inc. were also used as conductive fillers. The modified pulp was then filtered through a handsheet mold (Essex International Inc. custom machinery), and pressed and dried according to TAPPI T-205 standards. The quantities of pulp, CNTs, and CNF were adjusted to control the resulting composite density and porosity, and maintain final CNT contents of either 5, 10, or 15 wt %.

Pilot-Scale Manufacturing

Paper comprising a blend of cellulose fibers from softwood and hardwood (75:25) sources was produced using a 32-cm wide dynamic sheet former (Noble and Wood) operated at 3.2 m·min$^{-1}$. Prior to sheet formation, the pulp was alternatingly dosed with two aqueous dispersions of CNTs pre-absorbed with oppositely charged surfactants, namely CTAB (5 wt %, 2:1) and alkali lignin (5 wt %, 2:1). The CNT loading in the final sheet was set to ~18 wt %±2 wt % by adjusting the injection flow rate of each CNT dispersion. Dewatering was achieved by subsequent pressing at 50 PSIG and drying at 80° C. The resulting paper nanocomposite was wrapped around a 10-cm diameter roll before being unwound and cut into sheets of 30 cm×80 cm using an automated sheet slicer (Kunshan Dapeng Precision Machinery Co., Ltd., DP-360CQ).

Structural and Electrical Characterization

The paper morphology was characterized by SEM. Raman spectroscopy and tape peeling tests were conducted to analyze the interfacial properties of the fibrous composites. The hygroexpansion of the paper sensors was investigated by optical microscopy and XRD. Optical absorption spectroscopy was employed to assess the CNT distribution and retention during sheet formation. The electrical properties were examined based on current-voltage (I-V) characteristics and 4-point probe measurements.

Sensing Performance

Liquid water sensing measurements were performed using a Keithley 2450 voltage-current meter to monitor changes in electrical resistance across cutouts from the as-prepared paper nanocomposites when either immersed in solution or wetted via drop-casting small volumes onto the paper surface. Sensing performance was quantified based on the relative resistance (Ru), defined as the ratio of the difference between the electrical resistances of the wet and dry specimen to the electrical resistance of the dry sample. When utilized in a portable leak monitoring system, the paper nanocomposite was wired in series with a resistor ohm matched to its dry state, creating a voltage-dividing circuit. A NodeMCU microcontroller supplied the input voltage and sampled the output voltage from the voltage-dividing circuit, wirelessly relaying a message to the If This Then That (IFTTT) webhook service to facilitate device-to-device communication.

Materials

Bleached Kraft softwood (SW, 50% Hemlock, 50% Douglas fir) and hardwood (HW, 50% cottonwood, 50% sawdust) pulps were supplied in a dried mat form after chipping, screening, washing, digesting, and bleaching by WestRock and Boise Cascade companies, respectively. Hydroxyl-functionalized multi-walled carbon nanotubes (CNTs) were purchased from Cheap Tubes Inc. with length in the range of 10-20 um, mean diameter of 50 nm and OH content of 0.7%, per the manufacturer specifications. Helical CNTs and graphene nanoplatelets (GnPs) were also purchased from Cheap Tubes Inc. for comparison purposes. The CNTs were synthesized by chemical vapor deposition and purified using acid chemistry. Sodium bromide and sodium hypochlorite (12.5 w/w %) were purchased from VWR, and 2,2,6,6-Tetramethylpiperidine (TEMPO) was purchased from Tokyo Chemical Industry. Alkali lignin (AL, 99%) and cetyl-trimethylammonium bromide (CTAB, 99%) dispersants were purchased from Tokyo Chemical Industry Co. and Amresco respectively.

Preparation of Cellulose Nanofibrils

Cellulose nanofibrils (CNFs) were synthesized following a previously described TEMPO-mediated oxidation process, on the basis of 5 mmol NaClO per gram of bleached softwood pulp, followed by mechanical defibrillation. Briefly, bleached softwood pulp was first soaked in 3 L DI water for 24 hours under mechanical agitation. Sodium bromide was added to the pulp (10 w/w %) followed by a 9.6 mg/mL aqueous solution of TEMPO under constant agitation. A 15 mmol solution of sodium hypochlorite was then slowly added to the pulp slurry and thoroughly mixed. Sodium hydroxide was then added drop wise to the pulp until a pH of 10 was maintained for at least 30 minutes. HCl was then added to stabilize the pH to neutral for at least 30 minutes and stop the oxidation reaction. The cellulose solution was then centrifuged for 10 minutes at 5,000 rpm, and the precipitate was poured into dialysis bags and stored in DI water. Dialysis water was exchanged daily until a solution conductivity of <1 µS was maintained. The washed fibrils were removed from the dialysis bags and DI water was added up to a total volume of 1 L. A blender was used to liquefy the solution, 500 mL at a time, for 30 minutes, or until a smooth solution consistency was reached. The blended pulp solution was then probe sonicated at 100% amplitude for 2 minutes. The sonicated nanofibrillated cellulose (CNF) was then centrifuge for 15 minutes at 5,000 rpm, and the supernatant was collected for further use. As—prepared CNFs exhibited a mean length and diameter of 650 nm and 2 nm, respectively, as measured by Atomic Force Microscopy (AFM, Asylum Research Cypher). Conductometric titration was used to measure the carboxylate content of CNF, and indicated an average charge density of 0.78 mmol COOH/g CNF.

Preparation of Carbon Nanotube-Cellulose Nanofibril Solution

The as-prepared CNF was dispersed in DI water at varying concentrations up to a total volume of 500 mL followed by bath sonication for 10 minutes at room temperature. Hydroxyl-functionalized carbon nanotubes (CNTs) were added to the CNF solution at varying CNT:CNF ratios. The amount of CNTs were adjusted to obtain a final paper grammage of 40, 60, 80, and 100 g·m$^{-2}$, with CNT loadings of 5, 10, and 15 wt %. The resulting mixtures were sonicated for another 15 minutes by double acoustic irradiation combining both bath and probe sonications, as reported previously.

Batch Preparation of Paper Nanocomposites

The CNT:CNF composite papers were prepared based on a modified TAPPI T-205 standard procedure, as reported previously. Briefly, 30 g of OD pulp was dispersed in 2,000 mL of DI water at 1.2% consistency using a disintegrator (Messmer Instruments Limited: Disintegrator MK.3C) operated at 3,000 rpm. Water was removed to achieve a consistency of 10% before refining in a Paperindustriens Forsknings-Institut (PFI) mill at 15 kg beating load, until a desired freeness level of 250 mL was achieved. Canadian Standard (CSF) was determined using a Mitchell CANADA: freeness tester according to the TAPPI T-227 standard procedure. The refined pulp stock solution was diluted to 0.3% consistency and stored for at least 24 hours prior to further processing. A desired volume of pulp stock solution was then heated to 50° C. on a hot plate. The as-prepared CNT:CNF solution was then slowly added to the pulp and thoroughly stirred for 30 minutes using an overhead mixer. The combined CNT:

CNF and pulp solution was then slowly poured into a handsheet mold (Essex International Inc. Custom Machinery) before subsequent pressing and drying. The proportions of cellulose, CNT, and CNF were adjusted to obtain paper with grammages of 40, 60, 80, and 100 g·m$^{-2}$. According to ASTM D685, all handsheets were conditioned for at least 48 hours under controlled atmosphere at 23° C. and 50% relative humidity prior to further characterization and testing.

Pilot-Scale Preparation of Paper Nanocomposites

Paper nanocomposites were produced on a Noble and Wood Machine Company (1967) pilot-scale web former equipped with a 31.75 cm deckle and operated at 3.2 m/min (FIG. 15). A continuous sheet over 70 meters in length was manufactured and cut into several samples of various dimensions using an automated sheet slicer (Kunshan Dapeng Precision Machinery Co., Ltd., DP-360CQ). The paper nanocomposites were prepared from a slurry comprising a combination of softwood and hardwood pulps at a 75:25 ratio and 0.35% consistency. Aqueous CNT dispersions of opposite charges were prepared by double acoustic irradiation for 15 minutes using anionic and cationic surfactants (i.e., alkali lignin (AL) and cetyl-trimethylammonium bromide (CTAB)). The CNT content and CNT:surfactant ratio of all dispersions were kept at 5 wt % and 2:1, respectively. The dynamic dosage of the pulp slurry with the CNT dispersions was conducted immediately prior to sheet formation by controlling the wire screen speed (~3.2 m·min$^{-1}$) as well as the fan (150-250 mL·min$^{-1}$) and stuff pump (15-30 L·min$^{-1}$) flow rates. The grammage and CNT loading in the final sheet was 80 g·m$^{-2}$ and 18±2 wt %, respectively, as measured by gravimetric analysis.

Microstructure Characterization

The morphology of individual pulp fibers was studied by optical microscopy using a Zeiss Axiocam ERc5s digital camera mounted on a Zeiss Axiolab light microscope, while the CNF morphology was examined by atomic force microscopy (AFM) in tapping mode with a bluedrive photothermal excitation and a scan rate of 1 Hz (Asylum Research Cypher), respectively. Prior to imaging, aliquots of pulp suspensions and aqueous CNF dispersions were drop casted on clean glass microscope slides for optical microscopy and on freshly cleaved mica discs (TedPella Inc., 12 mm) for AFM.

The morphology of the paper nanocomposites was analyzed using a scanning electron microscope (SEM, Sirion XL30). The samples were coated with a 5 nm layer of gold-palladium and observations were conducted under high vacuum conditions at an accelerating voltage of 5 kV. A Renishaw InVia Raman Microscope with a 785 nm laser excitation source was employed to assess the interfacial properties among the different constituents in the paper nanocomposite. Adhesion tests were conducted by placing a fresh tape on a 4 cm$^2$ area of the paper specimen. A force of 100 gf was applied for 10 min to the surface, after which the tape was peeled off. The procedure was repeated five times using fresh new tapes and the paper thickness and electrical resistance were recorded after each peeling cycle. X-ray diffraction profiles were collected using a Bruker D8 powder diffractometer equipped with a high-efficiency Cu (1.54 Å) anode at 50 kV and 100 μA, a microfocus X-ray source, and a Pilatus 100 K large-area 2D-detector. Angular scanning was performed at 11° increments from 0° to 90°. The XRD characteristics of cellulose samples were computed according to methods described elsewhere. Optical absorption spectra of paper nanocomposites prepared at various CNT loadings were collected at 1-nm resolution using a PerkinElmer Lambda 750 spectrophotometer equipped with a 100-mm InGaAs integrating sphere.

Characterization of Sensing Performance

Current-voltage (I-V) characteristics were measured to demonstrate the linearity of the nanocomposites Ohmic response. The spatial distributions of electrical resistance across various sheets were collected by 4-point probe measurements at 37 different locations across each sample, with probe spacing at 1$^{±}$0.01 mm. A Keithley 2450 voltage-current meter was used to monitor changes in electrical resistance across paper cutouts immersed in different solutions. Sensing performance was quantified based on the relative resistance ($R_{rel}$), defined as the ratio of the difference between the electrical resistances of the wet ($R_t$) and dry ($R_0$) specimen to the electrical resistance of the dry sample, as shown in the equation below:

$$R_{rel} = \frac{R_t - R_0}{R_0} * 100\% \qquad \text{Eqn. S1}$$

The relative wet areas defined as the ratio of wet surfaces with respect to the dry sheets were estimated by image analysis of photos of samples spiked with given volumes of water using GIMP software. An analytical model was developed by representing the equivalent resistance ($R_{eq}$) of a paper nanocomposite as an M×N matrix of resistive cells, with one of two values: the dry resistance, $r_d$ or the wet resistance $r_w$. Equation S2 shows the relationship between $R_{eq}$ and an M×N matrix, where M and N represent the length and width of the sample in centimeters, respectively. The dry resistance ($r_d$) was calibrated for each sample by solving Equation S3 for $R_{ij}$ based on the measured $R_{eq}$ operating under the assumption that in the dry state $r_d$ remains constant.

$$R_{eq}(M) = R_{eq}\begin{bmatrix} r_w & r_w & r_d \\ r_w & r_w & r_d \\ r_w & r_w & r_d \\ r_d & r_d & r_d \\ r_d & r_d & r_d \\ r_d & r_d & r_d \end{bmatrix} \qquad \text{Eqn. S2}$$

Equation S3 defines the model as a group of parallel resistors along the width, and in series along the length of the paper nanocomposite.

$$R_{eq} = \sum_i^n \left( \sum_j^m \frac{1}{R_{ij}} \right)^{-1} \qquad \text{Eqn. S3}$$

The simulated change in resistance (ΔR) is then obtained by the difference between the wet $$\left( R_{eq}^{wet} \right)$$

and dry $$\left( R_{eq}^{dry} \right)$$

resistances, as reported in Equation S4.

$$\Delta R = R_{eq}^{wet} - R_{eq}^{dry} \qquad \text{Eqn. S4}$$

By example and without limitation, embodiments are disclosed according to the following enumerated paragraphs:

A1. A method for preparing a paper nanocomposite, comprising:

continuously providing a first liquid suspension comprising lignocellulosic pulp fibers, cellulose nanofibrils, carbon nanotubes, and a cationic surfactant;

continuously adding a second liquid suspension to the first liquid suspension to provide a slurry, the second liquid suspension comprising lignocellulosic pulp fibers, cellulose nanofibrils, carbon nanotubes, and an anionic surfactant;

filtering the slurry comprising the first and second liquid suspensions on a membrane to provide a filtered mat; and removing the liquid from the filtered mat to form the paper nanocomposite.

A2. The method of Paragraph A1, wherein the first liquid suspension and/or the second liquid suspension comprises carbon nanotubes adsorbed to the lignocellulosic pulp fibers via the cellulose nanofibrils.

A3. The method of Paragraph A1 or Paragraph A2, wherein the slurry comprises carbon nanotubes adsorbed to the lignocellulosic pulp fibers via the cellulose nanofibrils.

A4. The method of any one of Paragraphs A1 to A3, wherein the carbon nanotubes are functionalized with a group capable of forming hydrogen bonds with the lignocellulosic pulp fibers and/or the cellulose nanofibrils.

A5. The method of any one of Paragraphs A1 to A4, wherein the carbon nanotubes comprise multi-walled carbon nanotubes functionalized with a hydroxy or a carboxy group.

A6. The method of any one of Paragraphs A1 to A5, wherein the carbon nanotubes have a length of from 10 μm to 20 μm and/or a mean diameter of from 8 nm to 100 nm.

A7. The method of any one of Paragraphs A1 to A6, wherein the lignocellulosic pulp fibers comprise bleached Kraft softwood (SW) pulp, bleached Kraft hardwood (HW) pulp, or a combination thereof.

A8. The method of any one of Paragraphs A1 to A7, wherein the cellulose nanofibrils are synthesized by a TEMPO-mediated oxidation of wood pulp.

A9. The method of any one of Paragraphs A1 to A8, wherein the carbon nanotubes:cellulose nanofibrils ratio in the first and second liquid suspensions is independently from about 1:1 to about 10:1 by weight (e.g., about 1:1 to about 5:1, or about 1:1 to about 3:1).

A10. The method of any one of Paragraphs A1 to A9, further comprising collecting unbound cellulose nanofibrils and/or carbon nanotubes after filtering the slurry on the membrane.

A11. The method of Paragraph A10, further comprising introducing the collected free cellulose nanofibrils and/or carbon nanotubes to the first or second liquid suspension, or a combination thereof.

A12. The method of any one of Paragraphs A1 to A12, wherein the anionic surfactant comprises alkali lignin (AL), sodium dodecyl sulfate (SDS), sodium dodecylbenzene sulfonate (SDBS), alkylphenol ethoxylates (APEO), or any combination thereof.

A13. The method of any one of Paragraphs A1 to A12, wherein the cationic surfactant comprises cetyl-trimethylammonium bromide (CTAB), cetylpyridinium chloride (CPC), dodecyltrimethylammonium bromide (DTAB), cationic polycarboxylate (C-PCE), or a combination thereof.

A14. The method of any one of Paragraphs A1 to A13, wherein the first liquid suspension and/or second liquid suspension has a carbon nanotubes content of 1 wt % to 20 wt %, relative to the weight of the first liquid suspension and/or the second liquid suspension.

A15. The method of any one of Paragraphs A1 to A14, wherein the first liquid suspension and/or second liquid suspension has a carbon nanotubes content of 5 wt % at a 2:1 carbon nanotubes: surfactant ratio.

A16. A paper nanocomposite formed by a method of any one of Paragraphs A1 to A15.

A17. A paper nanocomposite, comprising lignocellulosic pulp fibers, cellulose nanofibrils, carbon nanotubes, an anionic surfactant, and a cationic surfactant.

A18. The paper nanocomposite of Paragraph A16 or Paragraph A17, wherein the carbon nanotubes are bound to lignocellulosic pulp fibers via the cellulose nanofibrils.

A19. The paper nanocomposite of any one of Paragraphs A16 to A18, wherein the cellulose nanofibrils and/or the carbon nanotubes are further associated with the cationic surfactant, the anionic surfactant, or both the cationic surfactant and the anionic surfactant.

A20. The paper nanocomposite of any one of Paragraphs A16 to A19, wherein the paper nanocomposite is a single-ply paper nanocomposite with a paper grammage of 40 g/m² to 200 g/m².

A21. The paper nanocomposite of any one of Paragraph A16 to A20, wherein the paper nanocomposite comprises a carbon nanotube loading of from 1 wt % to 20 wt %.

A22. The paper nanocomposite of any one of Paragraphs A16 to A21, wherein less than 3% by weight of the carbon nanotubes leaches from the paper nanocomposite when the paper nanocomposite is submerged into water for a period of 48 hours.

A23. The paper nanocomposite of any one of Paragraphs A16 to A22, wherein less than 2% of an initial electrical conductivity is decreased when the paper nanocomposite is subjected to a dry leaching test.

A24. The paper nanocomposite of any one of Paragraphs A16 to A23, wherein the carbon nanotubes are substantially aligned.

A25. A sensor comprising the paper nanocomposite of any one of Paragraphs A16 to A24, wherein the sensor produces a measurable response upon exposure to an analyte or a stimulus.

A26. A sensor comprising of Paragraph A25, wherein the measurable response comprises an electrical resistance.

A27. The sensor of Paragraph A25 or Paragraph A26, wherein the analyte is water, and the sensor is a water leak detection sensor.

A28. The sensor of any one of Paragraphs A25 to A27, wherein the sensor generates a reproducible response over at least 20 water immersion/drying cycles (e.g., at least 30 water immersion/drying cycles, at least 40 water immersion/drying cycles, or at least 50 water immersion/drying cycles).

A29. The sensor of any one of Paragraph A25 or Paragraph A26, wherein the analyte or stimulus comprises a water impurity, a temperature, an ionic chemical compound, motion in a medium in which the sensor is placed in, and/or a water level.

A30. The sensor of any one of Paragraphs A25 to A29, wherein the sensor is wirelessly coupled to a remote or a cellular device.

A31. The sensor of any one of Paragraphs A25 to A30, wherein the sensor has a resistance change of more than 120 fold between a wet and a dry state.

A32. The sensor of any one of Paragraphs A25 to A31, wherein the paper nanocomposite is in the form of an array.

A33. The sensor of any one of Paragraphs A25 to A32, comprising a plurality of paper nanocomposite, wherein one paper composite is in electrical communication with at least one other paper composite.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for preparing a paper nanocomposite by continuous flow processing, the method comprising:

continuously providing a first liquid suspension comprising a first plurality of lignocellulosic pulp fibers, a first plurality of cellulose nanofibrils, a first plurality of carbon nanotubes, and a cationic surfactant, wherein the first plurality of carbon nanotubes have a positive charge, and wherein the first plurality of carbon nanotubes are adsorbed to the first plurality lignocellulosic pulp fibers via the first plurality of cellulose nanofibrils to form a first cellulosic unit;

continuously adding a second liquid suspension to the first liquid suspension to provide a slurry, the second liquid suspension comprising a second plurality of lignocellulosic pulp fibers, a second plurality of cellulose nanofibrils, a second plurality of carbon nanotubes, and an anionic surfactant, wherein the second plurality of carbon nanotubes have a negative charge, and wherein the second plurality of carbon nanotubes are adsorbed to the second plurality lignocellulosic pulp fibers via the second plurality of cellulose nanofibrils to form a second cellulosic unit;

filtering the slurry comprising the first and second liquid suspensions on a membrane to provide a filtered mat, wherein the filtered mat is an anisotropic sheet comprising alternating layers of the first cellulosic unit and the second cellulosic unit; and removing the liquid from the filtered mat to form the paper nanocomposite.

2. The method of claim 1, wherein the first plurality of carbon nanotubes are functionalized with a group capable of forming hydrogen bonds with the first plurality of lignocellulosic pulp fibers and/or the first plurality of cellulose nanofibrils.

3. The method of claim 1, wherein the first plurality of carbon nanotubes comprise multi-walled carbon nanotubes functionalized with a hydroxy or a carboxy group.

4. The method of claim 1, wherein the first plurality of carbon nanotubes have a length of from 10 μm to 20 μm and/or a mean diameter of from 8 nm to 100 nm.

5. The method of claim 1, wherein the first plurality of lignocellulosic pulp fibers are selected from a group consisting of bleached Kraft softwood (SW) pulp, bleached Kraft hardwood (HW) pulp, and a combination thereof.

6. The method of claim 1, wherein the first plurality of cellulose nanofibrils are synthesized by a TEMPO-mediated oxidation of wood pulp.

7. The method of claim 1, wherein a carbon nanotube to cellulose nanofibrils ratio in the first and second liquid suspensions is independently from about 1:1 to about 10:1 by weight.

8. The method of claim 1, further comprising collecting first and/or second unbound cellulose nanofibrils as collected free cellulose nanofibrils after filtering the slurry on the membrane, and/or collecting first and/or second carbon nanotubes as collected free carbon nanotubes after filtering the slurry on the membrane.

9. The method of claim 8, further comprising introducing the collected free cellulose nanofibrils and/or collected free carbon nanotubes to the first or second liquid suspension, or a combination thereof.

10. The method of claim 1, wherein the anionic surfactant is selected from the group consisting of alkali lignin (AL), sodium dodecyl sulfate (SDS), sodium dodecylbenzene sulfonate (SDBS), alkylphenol ethoxylates (APEO), or any combination thereof.

11. The method of claim 1, wherein the cationic surfactant is selected from the group consisting of cetyl-trimethylammonium bromide (CTAB), cetylpyridinium chloride (CPC), dodecyltrimethylammonium bromide (DTAB), cationic polycarboxylate (C-PCE), or a combination thereof.

12. The method of claim 1, wherein the first liquid suspension and/or second liquid suspension independently have a carbon nanotubes content of 1 wt % to 20 wt %, relative to the weight of the first liquid suspension and/or the second liquid suspension, respectively.

13. The method of claim 1, wherein the first liquid suspension and/or second liquid suspension independently have a carbon nanotubes content of 5 wt % at a 2:1 carbon nanotubes: surfactant ratio.

14. A paper nanocomposite formed by a method of claim 1.

15. The paper nanocomposite of claim 14, wherein the carbon nanotubes are bound to lignocellulosic pulp fibers via the cellulose nanofibrils.

16. The paper nanocomposite of claim 14, wherein the cellulose nanofibrils and/or the carbon nanotubes are further associated with the cationic surfactant, the anionic surfactant, or both the cationic surfactant and the anionic surfactant.

17. The method of claim 1, wherein cellulose nanofibrils of the first plurality of cellulose nanofibrils and of the second plurality of cellulose nanofibrils have a mean length of about 650 nm and a mean diameter of about 2 nm.

18. A paper nanocomposite, comprising lignocellulosic pulp fibers, cellulose nanofibrils, carbon nanotubes, an anionic surfactant, and a cationic surfactant, wherein the paper nanocomposite is an anisotropic sheet comprising alternating layers of a first cellulosic unit and a second cellulosic unit, wherein the first cellulosic unit comprises a first plurality of positively charged carbon nanotubes adsorbed to a first plurality of lignocellulosic pulp fibers via a first plurality of cellulose nanofibrils, and wherein the second cellulosic unit comprises a second plurality of negatively carbon nanotubes adsorbed to the second plurality of lignocellulosic pulp fibers via a second plurality of cellulose nanofibrils.

* * * * *